Dec. 17, 1968 L. J. HASBROUCK ET AL 3,417,380

INSTRUCTION SELECTION APPARATUS

Filed Jan. 13, 1967 63 Sheets-Sheet 1

Dec. 17, 1968 L. J. HASBROUCK ET AL 3,417,380

INSTRUCTION SELECTION APPARATUS

Filed Jan. 13, 1967 63 Sheets-Sheet 5

SELECTION CIRCUITS

Dec. 17, 1968 L. J. HASBROUCK ET AL 3,417,380

INSTRUCTION SELECTION APPARATUS

Filed Jan. 13, 1967 63 Sheets-Sheet 6

STORAGE INPUT CIRCUITS

CHECK STOP TIMING

Dec. 17, 1968 L. J. HASBROUCK ET AL 3,417,380

INSTRUCTION SELECTION APPARATUS

Filed Jan. 13, 1967 63 Sheets-Sheet 11

FIG. 68 I UNIT SCAN

FIG. 70

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

FIG. 71

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

FIG. 73 E UNIT DATA FLOW (2)

Dec. 17, 1968 L. J. HASBROUCK ET AL 3,417,380

INSTRUCTION SELECTION APPARATUS

Filed Jan. 13, 1967 63 Sheets-Sheet 16

I UNIT

Dec. 17, 1968 L. J. HASBROUCK ET AL 3,417,380

INSTRUCTION SELECTION APPARATUS

Filed Jan. 13, 1967 63 Sheets-Sheet 17

SEL A/B

A/B INV KEY

FIG. 81

THRU

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

FIG. 139

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

INCREMENTER

FIG. 141 INCR IN GATING CTRLS
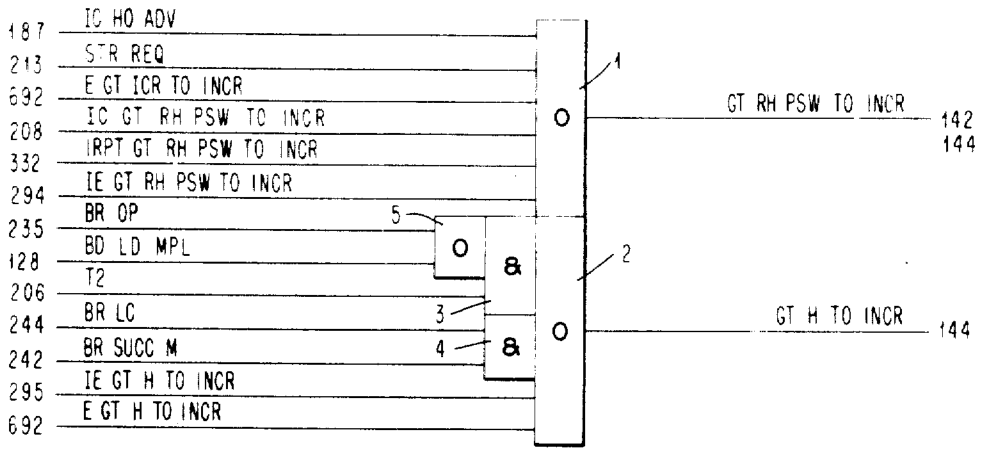
FIG. 142 INCR EXT
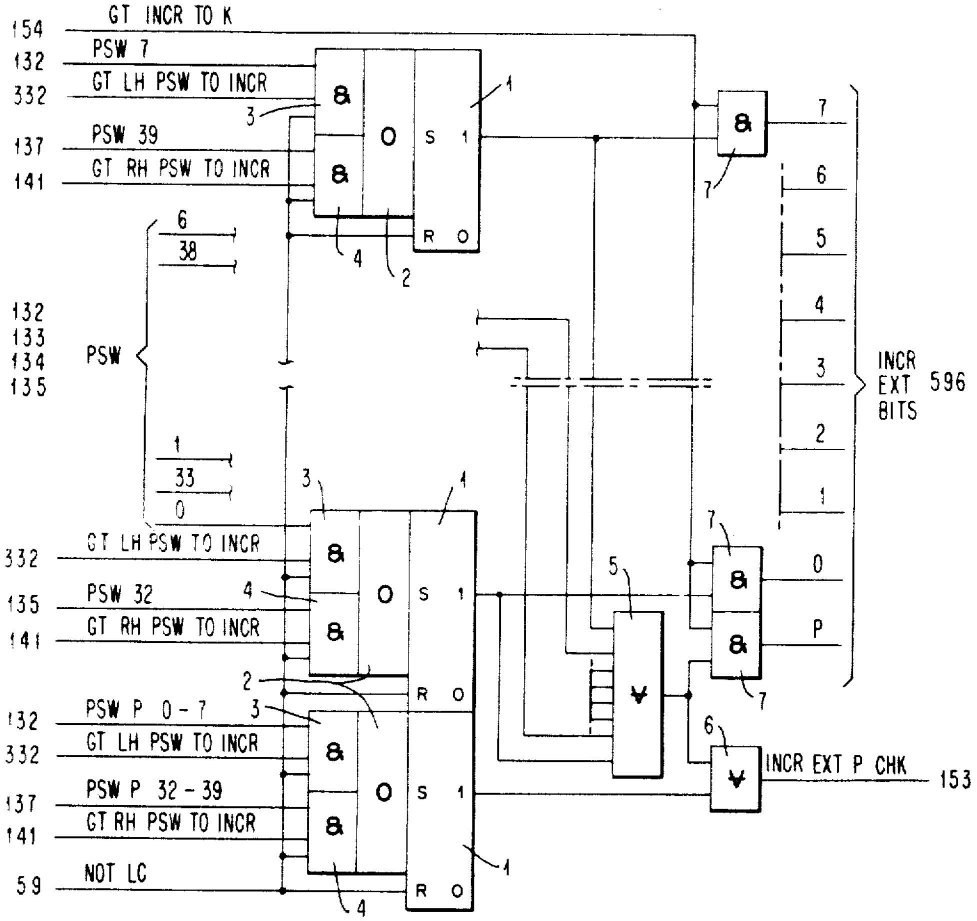

INCR ADD ONE/TWO

INCR IN

INCR-1

PARTIAL INVRT P

INVRT P

INCR P-1

INCR P-2

GS ADDER

AA OUT-GATING CTRLS

PGM STR COMP

IC HO ADV

SET IOP

VFL ENDING

HALT LCH

COND BLK T1 OFF

BLK T1M LCH

Dec. 17, 1968 L. J. HASBROUCK ET AL 3,417,380

INSTRUCTION SELECTION APPARATUS

Filed Jan. 13, 1967 63 Sheets-Sheet 46

FTCH PRIORITY

IC FE LCHS

IC RTN AB

IC FM LCHS

TON IC RCVY

A/B LOADED

EN IC FTCH

BLK ICM & NOT TSTS CMPLT

IRPT BLK

NO IRPTS

TSTS CMPLT & BR OP

BR + 1 M

TSTS CMPLT & BR UNSUCC

BR + 1 FTCH

BR SUCC M

TON RCVY

FIG. 246

THRU

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1937

FIG. 876

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

United States Patent Office

3,417,380
Patented Dec. 17, 1968

3,417,380

INSTRUCTION SELECTION APPARATUS

Leo J. Hasbrouck, Saratoga, Calif., and Edward J. Ossolinski and Gordon L. Smith, Poughkeepsie, N.Y., assignors to International Business Machines Corporation, Armonk, N.Y., a corporation of New York

Continuation-in-part of application Ser. No. 445,324, Apr. 5, 1965. This application Jan. 13, 1967, Ser. No. 609,248

6 Claims. (Cl. 340—172.5)

ABSTRACT OF THE DISCLOSURE

The specification discloses an illustrative embodiment for the invention comprising a large scale data processing system of the type which is composed of a plurality of quasi-independent units. The environmental data processing system includes a central processing unit or portion, which is herein referred to as a CPU, a plurality of storage units, a plurality of input/output control devices referred to herein as channels, as well as control and maintenance facilities which are found in a power distribution unit, herein referred to as a PDU. The CPU of the environmental system includes a control or instruction unit hereinafter referred to as an I unit, and an arithmetic and logic or execution unit, hereinafter referred to as an E unit. The I unit includes controls for instruction fetching, branching, interruption handling, communication with the input/output channels, and other related functions. The E unit of the environmental system can perform algebraic and logical operations, moving, shifting, and other functions. Instruction buffers and an instruction operand register are also provided. The instruction operand register is of a size which is greater than the smallest instruction but less than the longest instruction of a variable length instruction set. However, the instruction operand register is capable of manifesting the full length of instructions, including the operand portion and the address portion, and other portions thereof.

Figure 1:
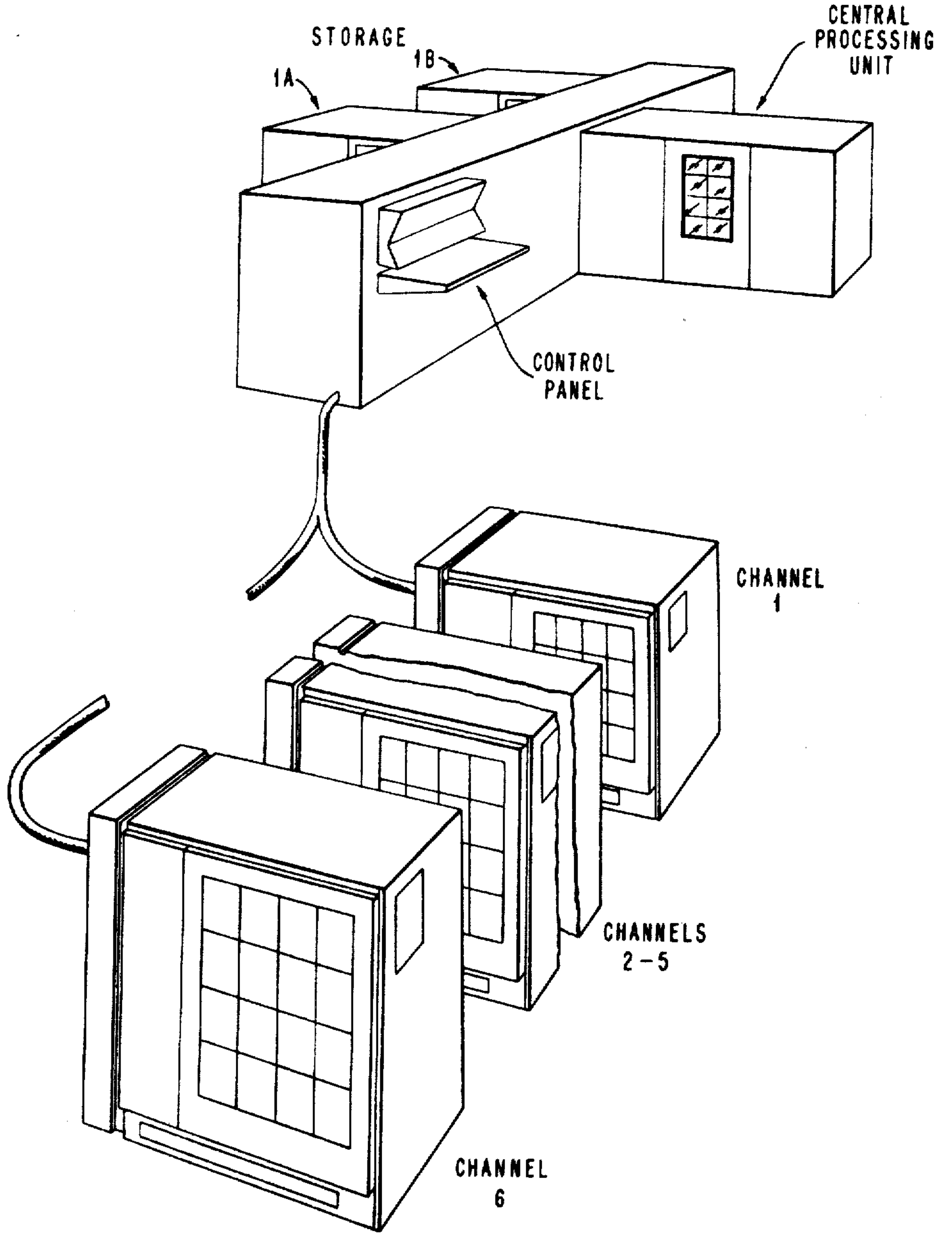

This application is a continuation-in-part of application Ser. No. 445,324, filed Apr. 5, 1965, now abandoned, entitled "Instruction Selection Apparatus."

TABLE OF CONTENTS

| | Column |
|---|---|
| (1.0) Background of the Invention | 2 |
| (2.0) References | 5 |
| (3.0) Nomenclature | 6 |
| (4.0) Brief Description of Environmental System (FIG. 2) | 7 |
| (5.0) Component Circuits (FIG. 3 through FIG. 8) | 8-9 |
| (6.0) Basic Bus Control Unit | 10 |
| (7.0) Clock Circuit | 11 |
| (7.4) Clock Circuit | 11 |
| (8.0) Scan | 11 |
| (8.1) Scanning Into the I Unit (FIG. 68) | 11 |
| (8.2) Scanning Into the E Unit (FIG. 69) | 12 |
| (9.0) Instruction Unit Data Flow | 12 |
| (9.1) General Introduction to I Unit data Flow | 13 |
| (9.1.1) Instruction Selection (FIG. 72) | 13 |
| (9.1.2) Instruction Input Paths (FIG. 73) | 14 |
| (9.1.3) Instruction Decoding (FIG. 74) | 14 |
| (9.1.4) Instruction Utilization (FIG. 75) | 15 |
| (9.B) Incrementer (FIG. 140) | 15 |
| (9.B.1) Controls | 17 |
| (9.B.1.1) Incrementer in Gating Controls (FIG. 141) | 17 |
| (9.B.1.2) Incrementer Input (FIG. 144) | 17 |
| (9.B.1,3) ADD One/Two Circuits (FIG. 143) | 17 |
| (9.B.1.4) Incrementer Carries Into Groups (FIG. 145) | 17 |
| (9.B.2) Incrementing Circuit (FIG. 146 and FIG. 147) | 18 |
| (9.B.2.1) Incrementer Bits 0–15 Parity (FIG. 148 and FIG. 150) | 20 |
| (9.B.2.2) Incrementer Bits 16–23 Parity (FIG. 149 and FIG. 151) | 21 |
| (9.B.2.3) Incrementer Parity Check (FIG. 152) | 22 |
| (9.B.3) Incrementer Extender (FIG. 142) | 23 |
| (9.B.4) Incrementer Check Circuit (FIG. 153) | 23 |
| (9.B.5) Incrementer Out-Gating Control (FIG. 154) | 23 |
| (9.C) Gate Select Mechanism | 24 |
| (9.C.1) Gate Select Prelatch (FIG. 156) | 24 |
| (9.C.2) Gate Select Advance (FIG. 157) | 24 |
| (9.C.3) Gate Select Adder (FIG. 158) | 25 |
| (9.C.4) GS Gate Controls (FIG. 159 and FIG. 160) | 26 |
| (9.C.5) Gate Select Register (FIG. 161) | 26 |

TABLE OF CONTENTS—Continued

| | Column |
|---|---|
| (9.C.6) Gate Select Decode Circuit (FIG. 161*a*) | 27 |
| (9.C.7) Gate Select Parity Circuit (FIG. 162) | 27 |
| (6.1.2) Channel Selection, Generally (FIG. 9) | 28 |
| (6.1.2.1) Channel Request Circuit (FIG. 17) | 28 |
| (6.1.2,2) Channel Even/Odd Selection (FIG. 18) | 29 |
| (11.0) Instruction Counter Controls (FIG. 72 through FIG. 75) | 29 |
| (11.1) Introduction | 29 |
| (11.2) Physical Description of Data Flow | 30 |
| (11.2.1) ICR and Incrementer | 30 |
| (11.2.2) A, B and J Registers | 30 |
| (11.2.3) Checking | 31 |
| (11.2.4) Gate Select Mechanism | 31 |
| (11.2.5) Addressing of Instructions | 32 |
| (11.4) Instruction Counter Advancing | 32 |
| (11.4.1) Interruption Effect on IC Advancing | 34 |
| (11.4.2) Effect of SS Instructions on IC Advancing | 34 |
| (11.4.3) The Repeat Instruction Function | 35 |
| (11.5.3) Instruction Fetching | 36 |
| (11.5.1) General | 36 |
| (11.5.2 Rule 1) ICP Loaded Rule | 36 |
| (11.5.3 Rule 2) Empty Rule | 37 |
| (11.5.4 Rule 3) IC Fetch Rule | 37 |
| (11.5.5) Chart of IC Fetch Address Generation | 39 |
| (11.5.6 Rule 4) IC Address Rule | 39 |
| (11.5.7 Rule 5) Block IC Rule | 41 |
| (11.5.8 Rule 6) Pre Block IC Rule | 42 |
| (11.5.9 Rule 7) IC Fetch Priority Rule | 42 |
| (11.6) Instruction Fetching—Special Cases | 43 |
| (11.6.1) Program Store Compare | 43 |
| (11.6.2) Interruption Entry | 44 |
| (11.6.3) IC Recoveries | 44 |
| (11.8) Instruction Counter Fetch Control Circuits | 45 |
| (11.8.1) E and IE Busy Latches (FIG. 212) | 45 |
| (11.8.2) Storage Request Circuits (FIG. 213 and FIG. 214) | 46 |
| (11.8.3) Operand Fetch Latch (FIG. 215) | 46 |
| (11.8.4) CPU Return To AB/J (FIG. 216 and FIG. 155) | 46 |
| (11.8.5) Instruction Fetch Requests (FIG. 217) | 47 |
| (11.8.6) IC Fetch Executions to A B | 47 |
| (11.8.6.1) Turn On of IC AFE and BFE (FIG. 218) | 47 |
| (11.8.6.2) IC Fetch Execution Latches (FIG. 219) | 48 |
| (11.8.6.3) IC Fetch Execution Usage (FIG. 220) | 49 |
| (11.8.6.4) IC Fetch Memorized Latches (FIG. 221) | 49 |
| (11.8.6.5) IC Fetch as a Function Of IC (FIG. 226) | 49 |
| (11.8.6.6) AE Register Empty Circuit (FIG. 225) | 49 |
| (11.8.7) IC Recovery (FIG. 222 and FIG. 223) | 50 |
| (11.8.8) ICP Loaded (FIG. 224) | 50 |
| (11.8.9) A–B Loaded (FIG. 227) | 51 |
| (11.8.10) J Loaded Circuit (FIG. 191) | 52 |
| (11.8.11) AB Fetch, Load and Decode at 1, 2 (FIG. 228 and FIG. 229) | 52 |
| (11.8.12) Operand Fetch Latch (FIG. 215) | 53 |
| (11.8.13) GSR and PSW Length Gates (FIG. 230) | 53 |
| (11.8.14) IC High Order Advance Latch (FIG. 187) | 54 |
| (11.8.15) Blocking of IC Fetches (BLK ICM LCH) (FIG. 208) | 54 |
| (11.8.16) IOP Setting Control (FIG. 199) | 55 |
| (11.8.17) Enable IC Fetch (FIG. 231) | 55 |
| (11.8.18) Turn On of Program Store | 56 |
| (11.8.19) AB Fetch Latch (FIG. 194) | 56 |

(1.0) BACKGROUND OF THE INVENTION

This invention relates to data processing, and more particularly to apparatus for selecting a particular instruction from among a plurality of instructions available thereto.

In the data processing art, computers are frequently provided with instruction buffer registers which permit prefetching of instructions, whereby said instructions are immediately available when needed for selection for use within said system. It is also known in the art that means may be provided for selecting a particular instruction from the buffer registers, said selected instruction being applied to the instruction operand register, or other use register, whereby control of the system may be based, at least in part, on the content of said register. In earlier computing machines, instructions were each of a fixed size, and the provision of an instruction operand register was therefore related to the size of the instruction; in some cases, the operand portion of the instruction register was inserted in an operand register, and other portions of the instruction were inserted in operand address registers or other related registers. This sort of registering is straightforward, but requires as many register positions as there are bit positions in the instruction. In other cases, instructions are handled more as sub-instructions, one portion being completed, and then another portion being completed, so that, insofar as selecting of instructions for application to instruction operand registers is concerned, the handling of instructions is essentially the same as if a sequence of independent instructions were being handled.

Recent advancement in computer technology has provided for a set of variable-length instructions, the contents of the instructions having different uses in dependence upon the particular class of instruction which is involved. This provides for additional complexities in the selection of prefetched instructions for use by a computing system.

Accordingly, a primary object of the present invention is to provide a more flexible instruction selection apparatus.

Another object of the present invention is to provide an instruction selection apparatus which is adapted for handling instructions of various lengths.

Another object of the present invention is to provide for instruction selection which may be based on other than repetitive sequential selection of subsequent prefetched instructions.

In accordance with the present invention, there is provided instruction buffering means together with an instruction operand register, said operand register including both an operand part and an address part, said address part having functions additional to storing address portions of instructions. The instruction operand register is given a size which is greater than the smallest instruction but less than the longest instruction of a variable length instruction set. Provision is made for causing said selection means to repetitively select the same instruction, over and over, for repeating operations, as well as for ultimately selecting different portions of the contents of said instruction buffering means, such as, for instance, selecting different portions of the same instruction for application to said operand register. Additionally, means for effecting a variable selection of instruments from instruction buffering registers for application to an instruction operand register on a repetitive basis is provided.

This invention permits use of normal instruction buffers for cyclically repeating an instruction. The invention also permits use of an instruction operand register having a length which is less than the length of the instruction buffer, said operand register however being capable of manifesting the full length of the instruction including both the operand portions and address and other portions thereof.

Other objects, features and advantages of the present invention will become more apparent in the light of the following detailed description of a particular embodiment thereof, as illustrated in the drawings.

The drawings are illustrative block diagrams, schematic block diagrams, timing diagrams, charts and illustrations of an embodiment of the present improvement, as set forth in a Large Scale Data Processing System which is referred to as "said environmental system," as set forth in the following list:

TABLE OF FIGURES

Figure 76:
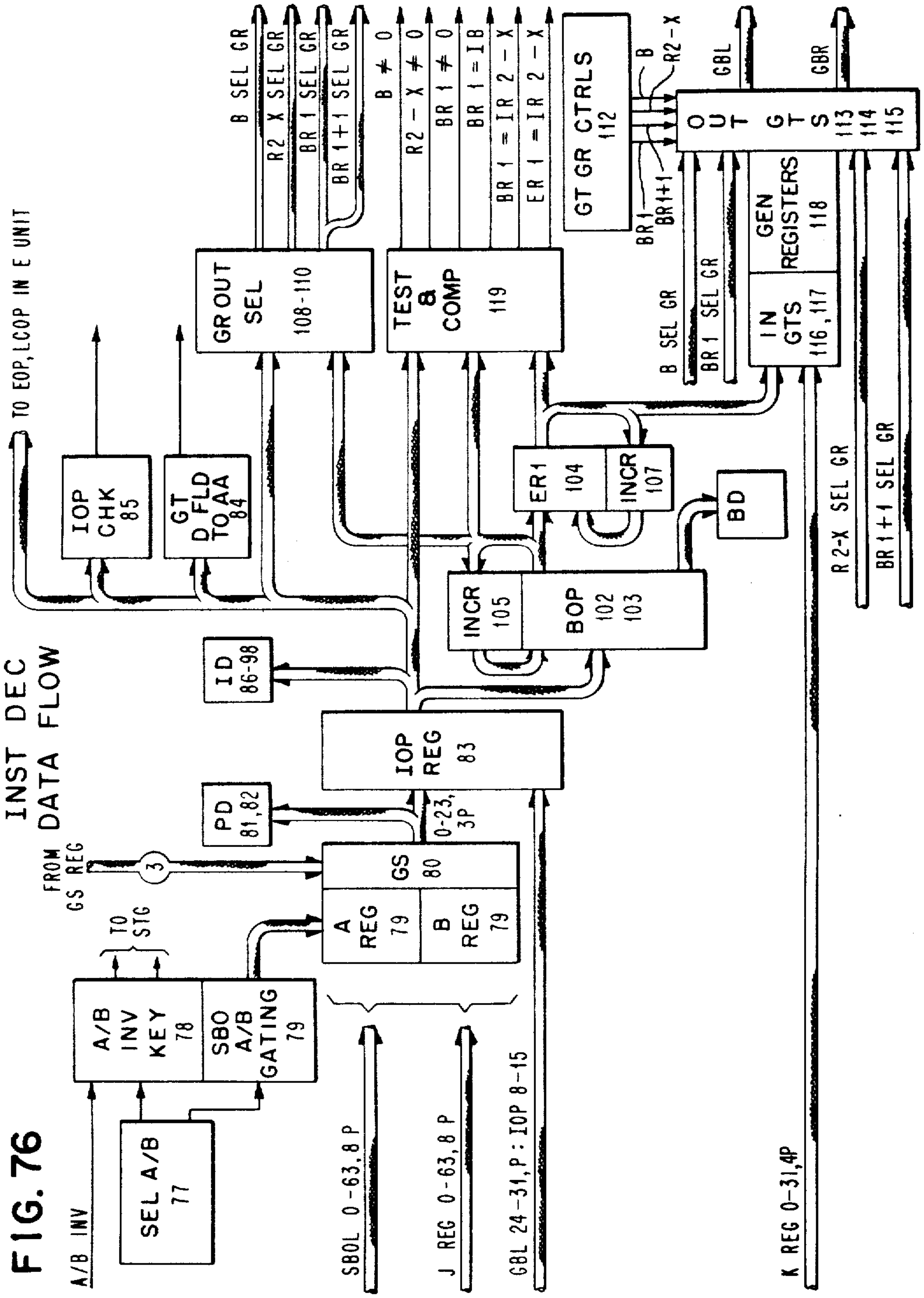
Figure 77:
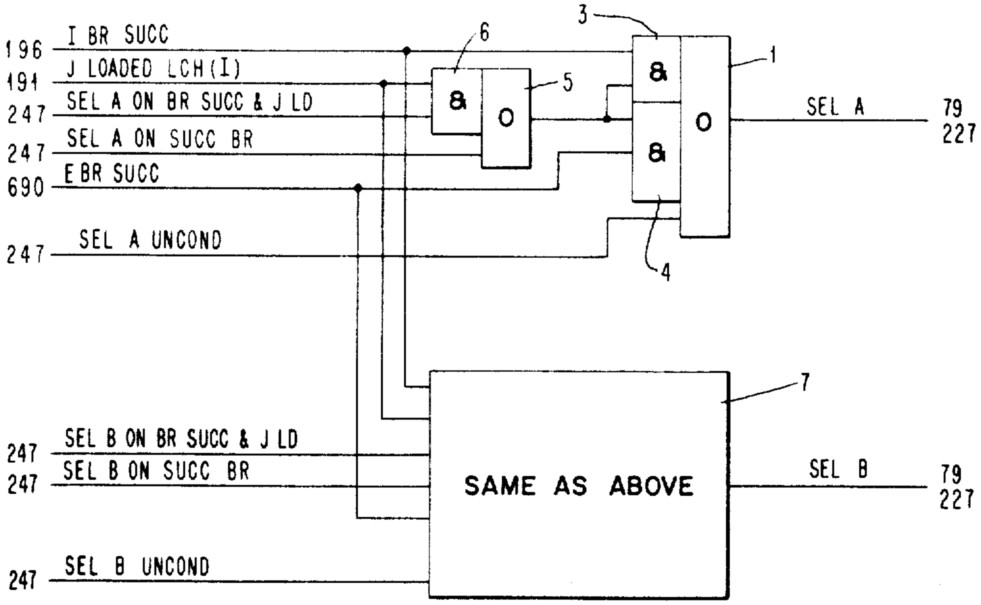
Figure 78:
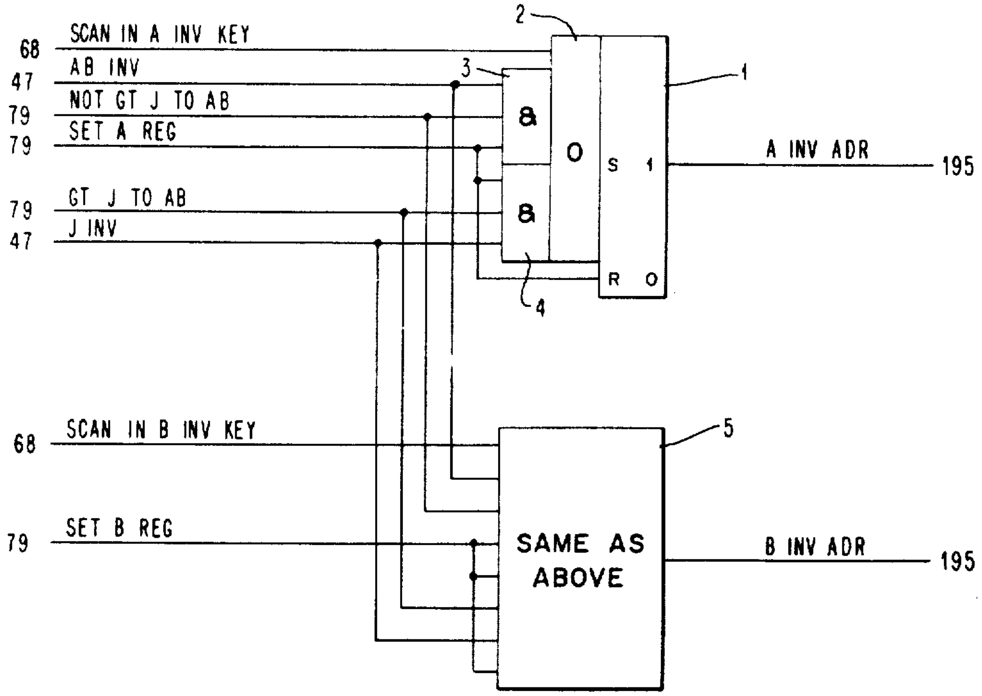
Figure 79:
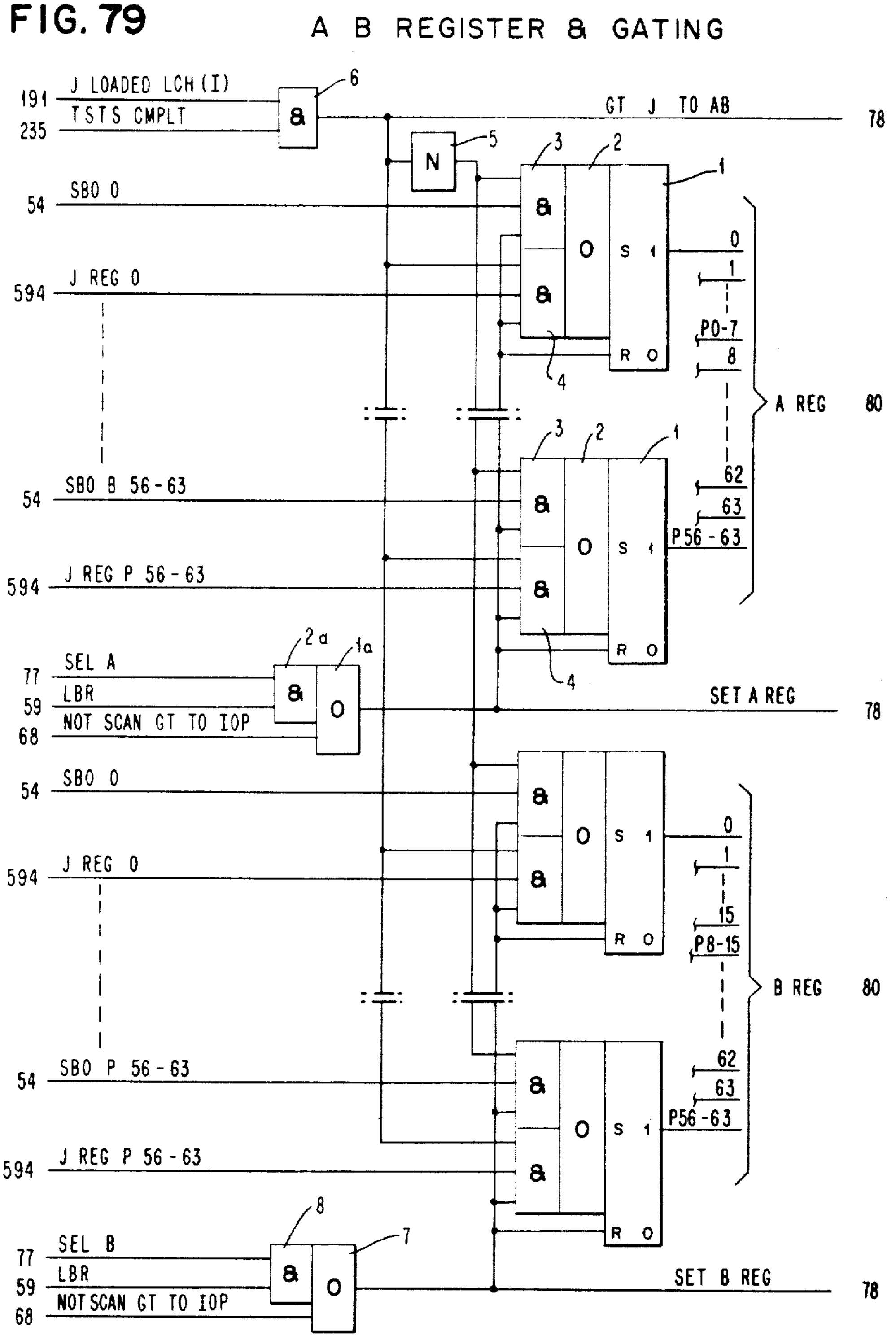
Figure 80:
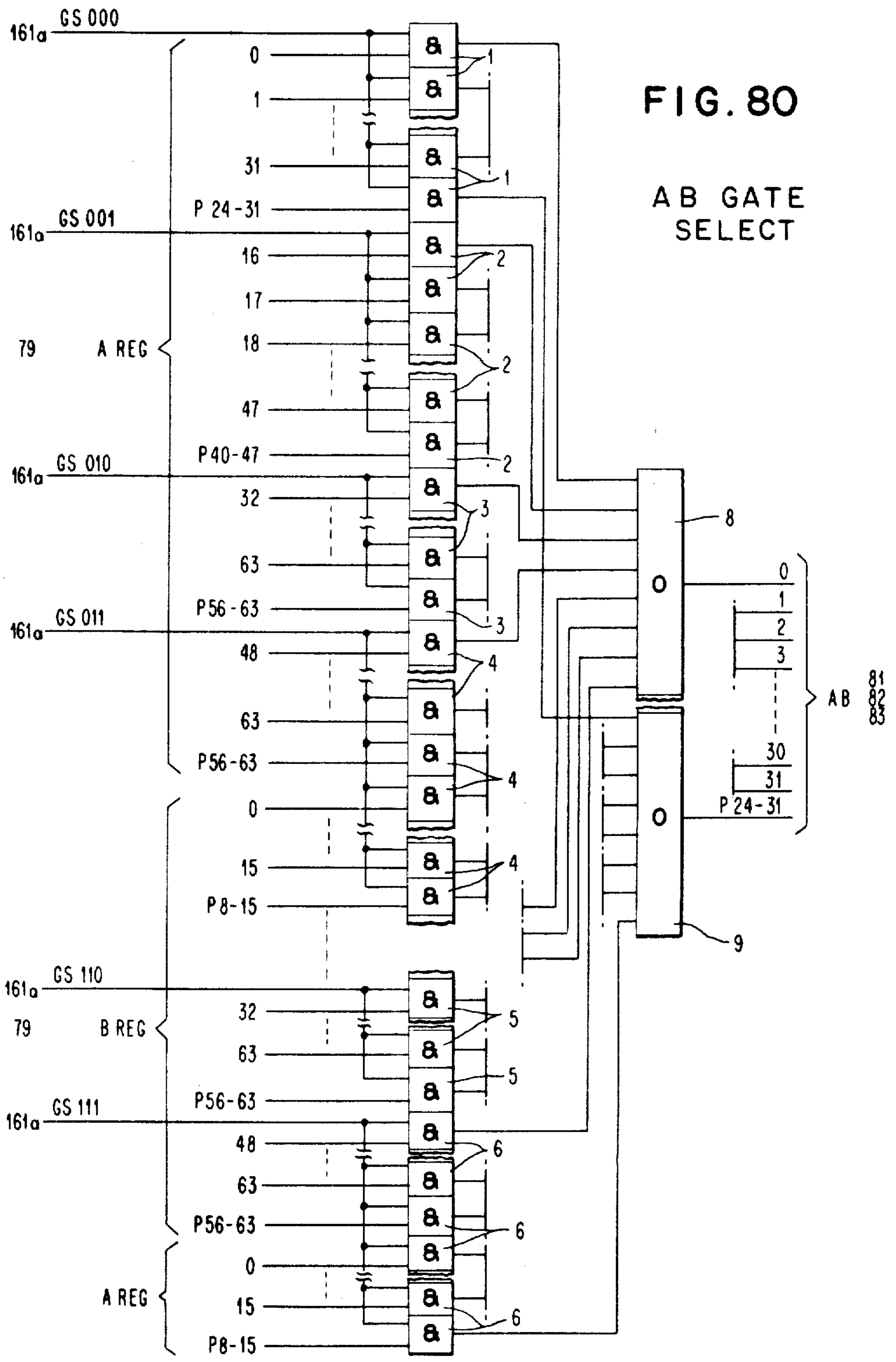
Figure 184:
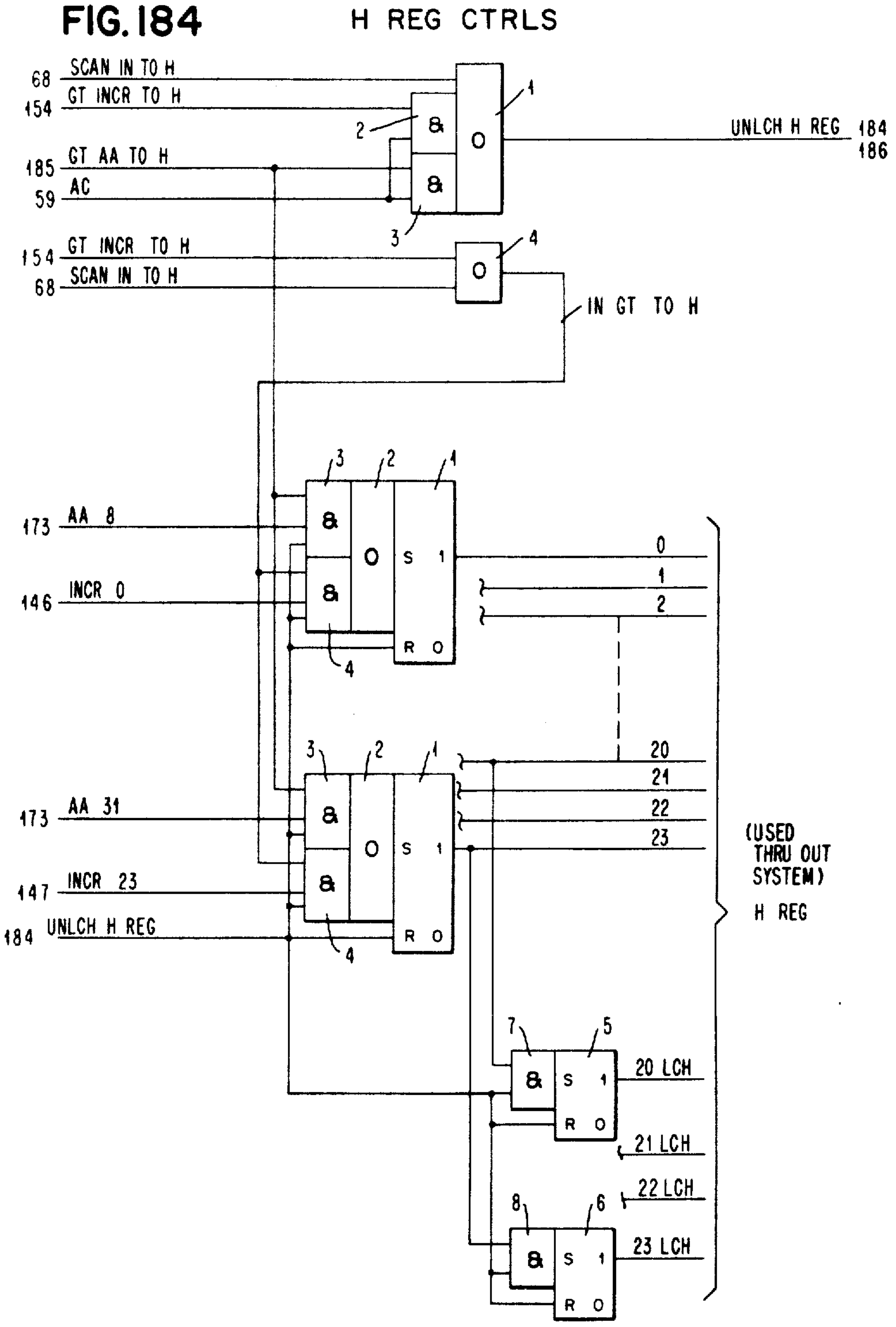
Figure 185:
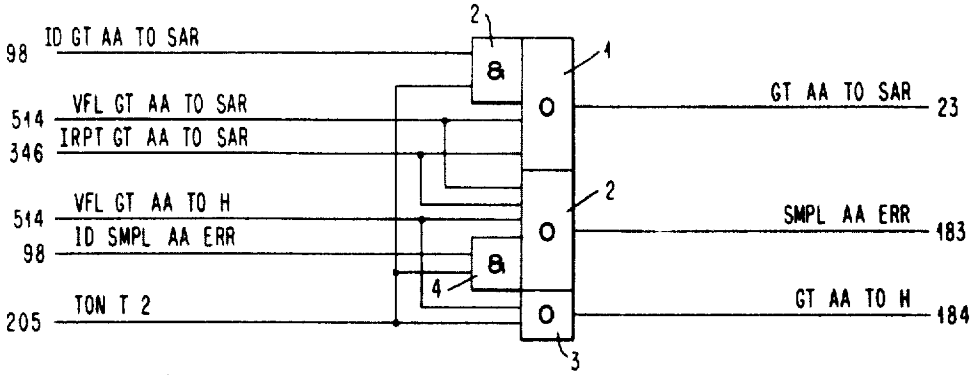
Figure 186:
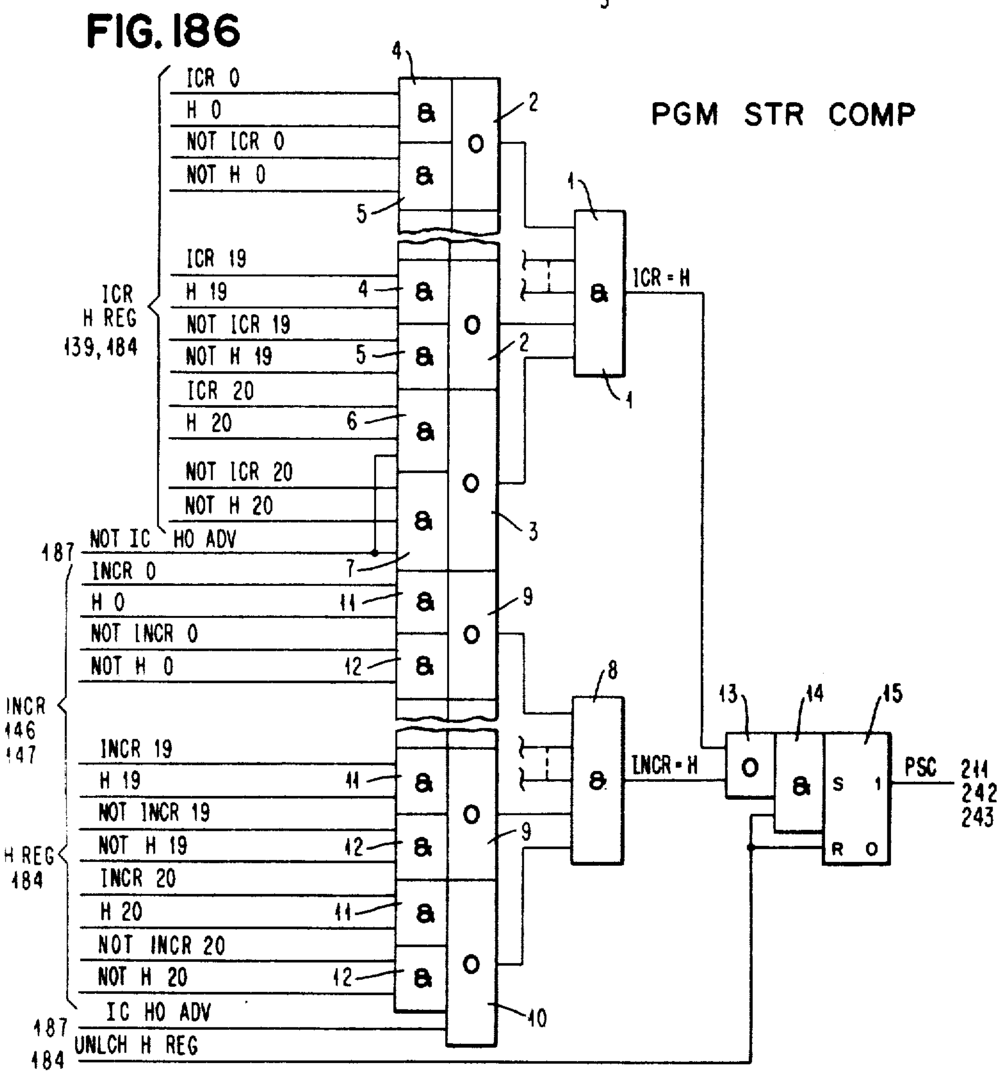
Figure 192:
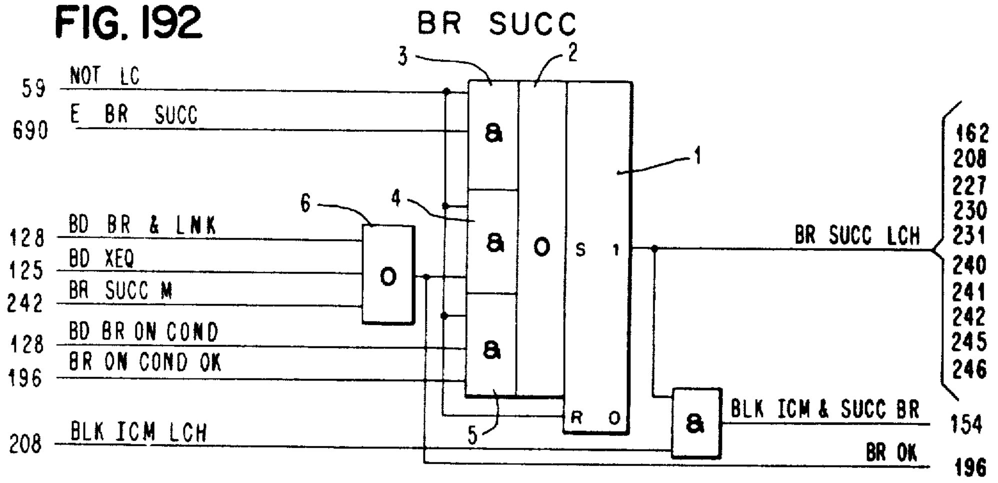
Figure 193:
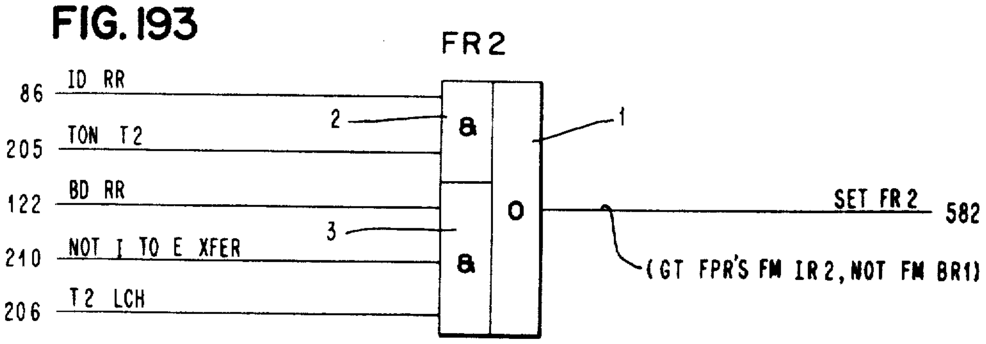
Figure 195:
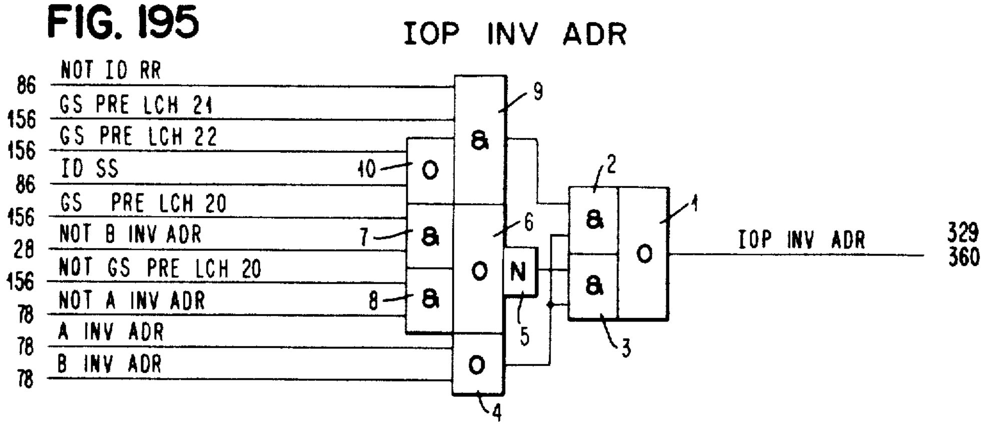
Figure 196:
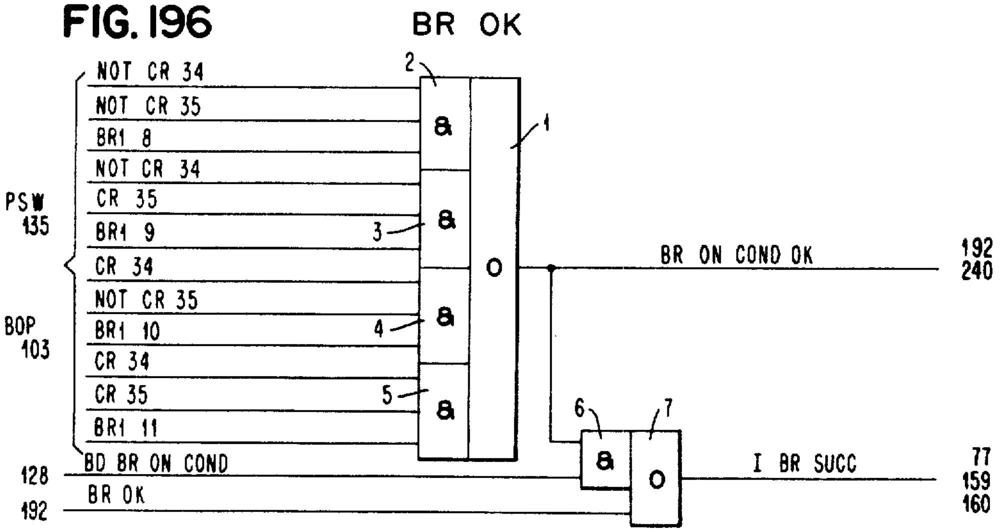
Figures 197, 198:
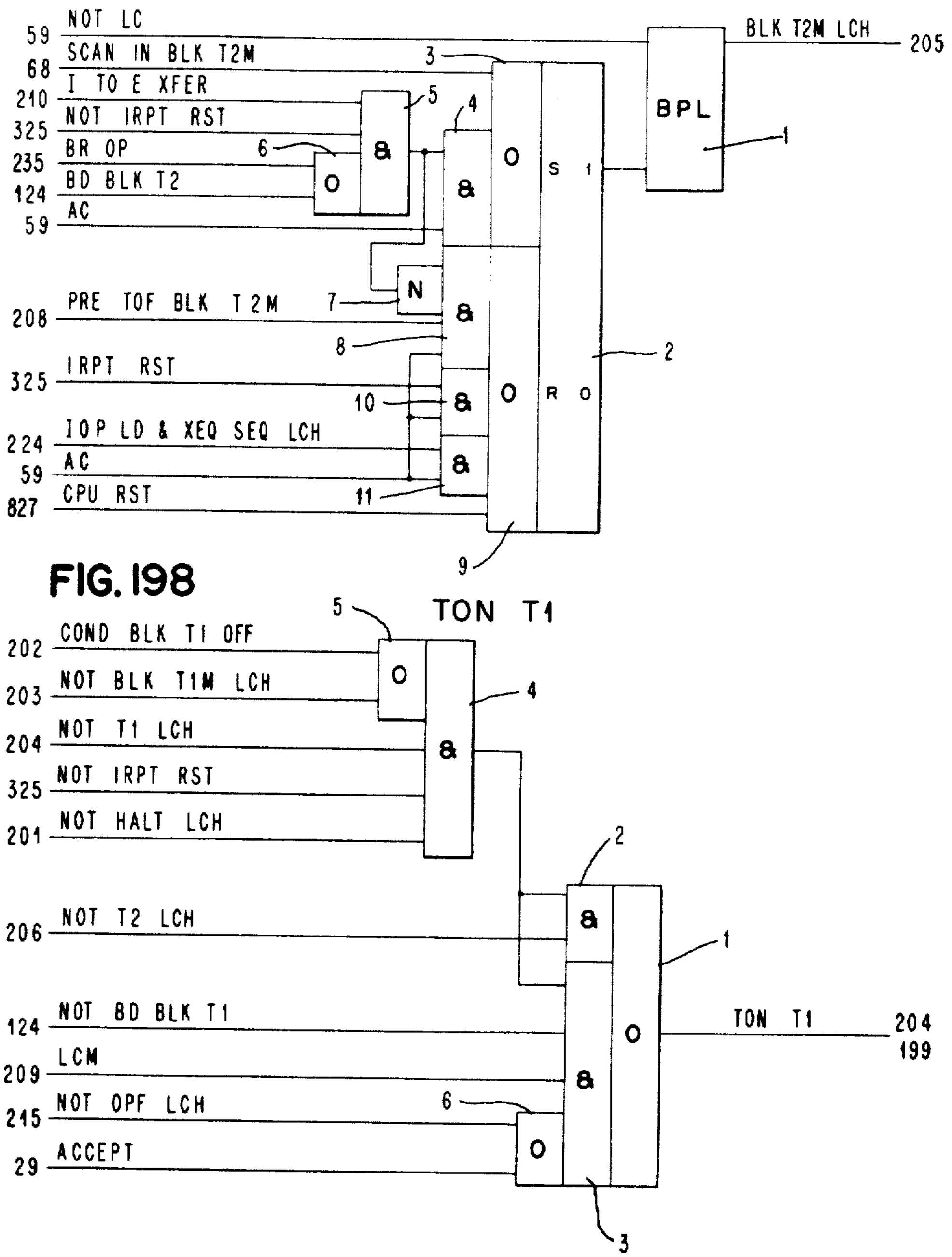
Figure 204:
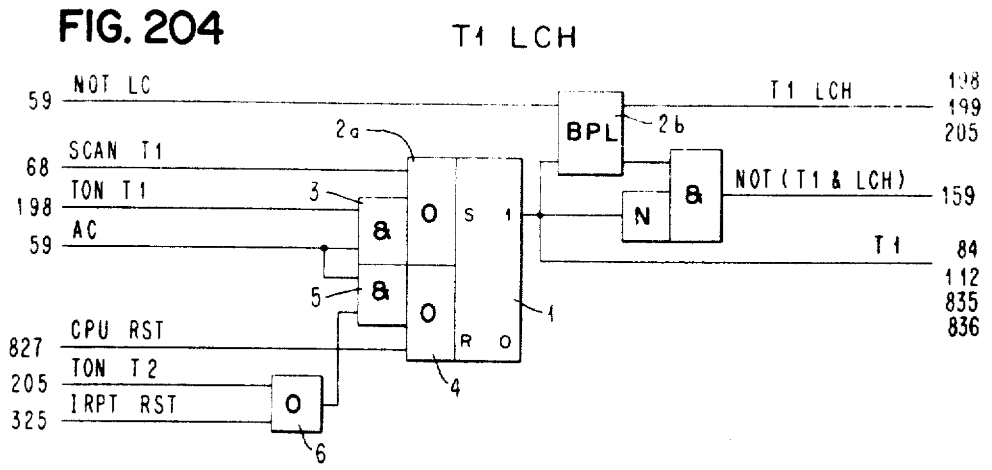
Figure 205:
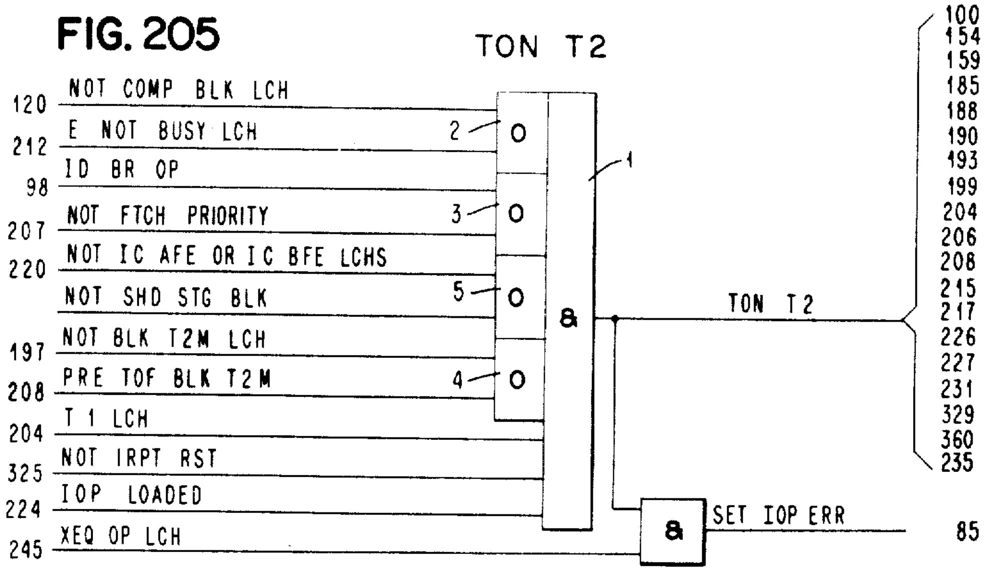
Figure 206:
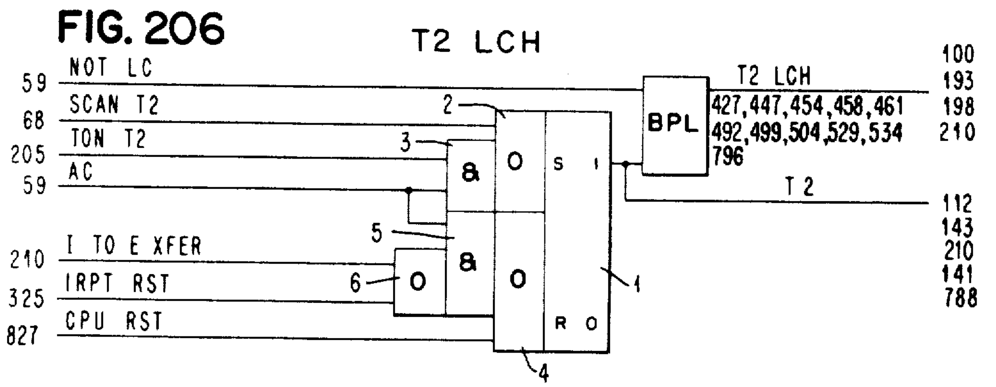
Figure 207:
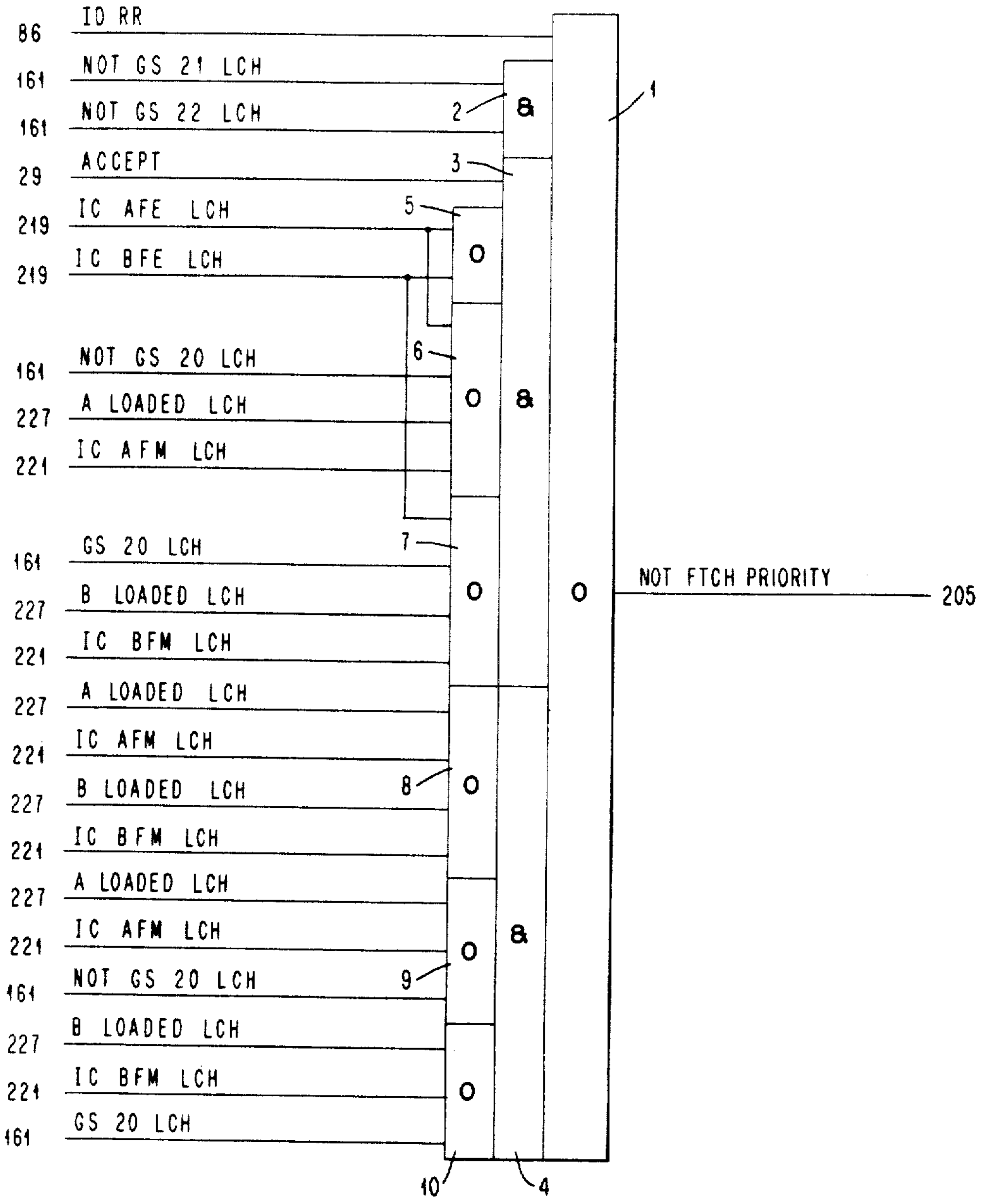
Figure 209:
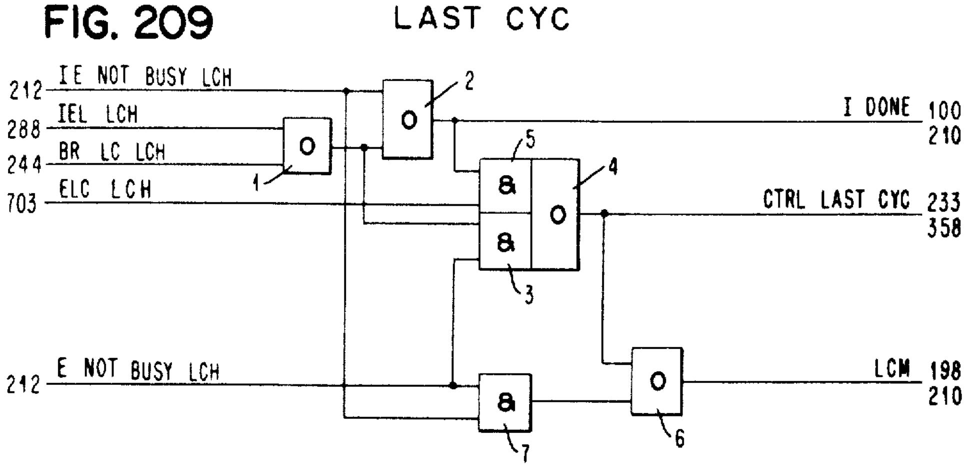
Figure 210:
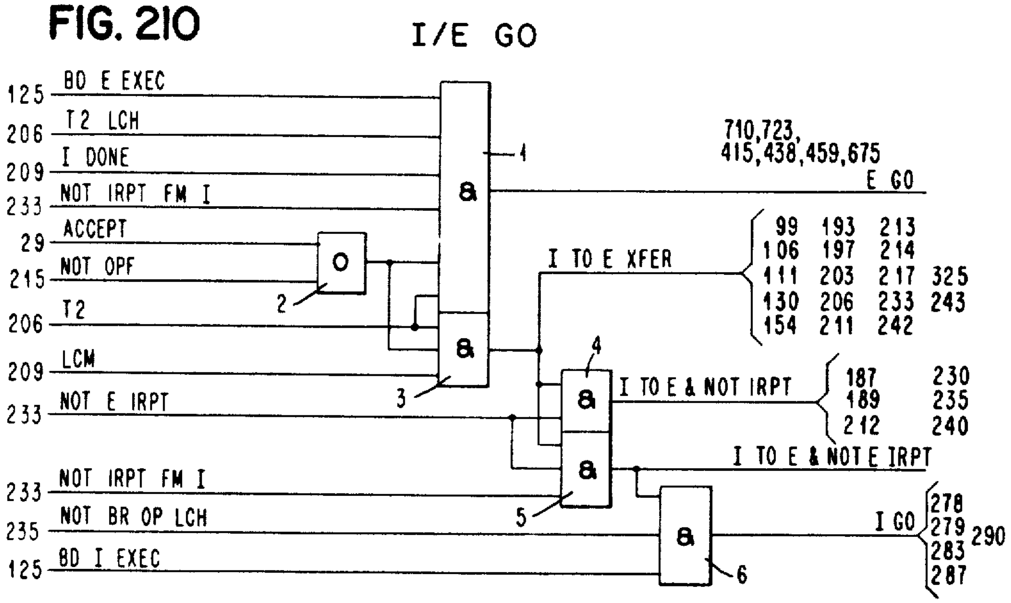

| | Sheet |
|---|---|
| (FIG. 1) System Illustration | 1 |
| (FIG. 2) Environmental System | 2 |
| (FIGS. 3a–5b) Component Circuits | 3 |
| (FIGS. 6a–8b) Component Circuits | 4 |
| (FIG. 9) Selection Circuits | 5 |
| (FIG. 10) Storage Input Circuits | 6 |
| (FIG. 11) Storage Output Circuits | 7 |
| FIGS. 12–59 are illustrative of said environmental system | 8–38 |
| (FIG. 60) Check Stop Timing | 39 |
| FIGS. 61–67 are illustrative of said environmental system | 40–43 |
| (FIG. 68) I Unit Scan | 44 |
| (FIG. 69) E Unit Scan | 45 |
| FIGS. 70–71 are illustrative of said environmental system | 46–47 |
| (FIG. 72) E Unit Data Flow (1) | 48 |
| (FIG. 73) E Unit Data Flow (2) | 49 |
| (FIG. 74) I Unit | 50 |
| (FIG. 75) GR+ADR | 51 |
| (FIG. 76) Inst Dec Data Flow | 52 |
| (FIG. 77) Sel A/B | 53 |
| (FIG. 78) A/B Inv Key | 53 |
| (FIG. 79) A B Register & Gating | 54 |
| (FIG. 80) A B Gate Select | 55 |
| FIGS. 81–139 are illustrative of said environmental system | 56–97 |
| (FIG. 140) Incrementer | 98 |
| (FIG. 141) Incr in Gating Ctrls | 99 |
| (FIG. 142) Incr Ext | 99 |
| (FIG. 143) Incr Add One/Two | 100 |
| (FIG. 144) Incr In | 100 |
| (FIG. 145) Incr C In | 101 |
| (FIG. 146) Incr–1 | 102 |
| (FIG. 147) Incr–2 | 103 |
| (FIG. 148) Partial Invrt P | 104 |
| (FIG. 149) Incrt P | 104 |
| (FIG. 150) Incr P–1 | 105 |
| (FIG. 151) Incr P–2 | 105 |
| (FIG. 152) Incr P Chk | 106 |
| (FIG. 153) Incr Chk | 106 |
| (FIG. 154) Incr Out Gating Ctrls | 107 |
| (FIG. 155) CPU RTN J | 108 |
| (FIG. 156) GS PRE LCH | 108 |
| (FIG. 157) ADV HLF WDS | 108 |
| (FIG. 158) GS Adder | 109 |
| (FIGS. 159–161) GS Gate | 110 |
| (FIG. 161a) GS Decode | 111 |
| (FIG. 162) GS Parity | 111 |
| FIGS. 163–183 are illustrative of said environmental system | 112–126 |
| (FIG. 184) H Reg Ctrls | 127 |
| (FIG. 185) AA Out-gating Ctrls | 128 |
| (FIG. 186) PGM STR Comp | 128 |
| (FIGS. 187–190) IC HO ADV, SS OP, VFL ADR, GT FPR | 129 |
| (FIG. 191) J Loaded | 130 |
| (FIG. 192) BR SUCC | 130 |
| (FIG. 193) FR2 | 130 |
| (FIG. 194) AB FTCH LCH | 131 |
| (FIG. 195) IOP INV ADR | 131 |
| (FIG. 196) BR OK | 131 |
| (FIG. 197) BLK T2M | 132 |
| (FIG. 198) Ton T1 | 132 |
| (FIGS. 199–203) Set IOP | 133 |
| (FIG. 204) T1 LCH | 134 |
| (FIG. 205) Ton T2 | 134 |
| (FIG. 206) T2 LCH | 134 |
| (FIG. 207) FTCH Priority | 135 |
| (FIG. 208) Blk ICM | 136 |
| (FIG. 209) Last CYC | 137 |
| (FIG. 210) I/E GO | 137 |
| (FIG. 211) PSC | 137 |
| (FIG. 212) E/IE Busy | 138 |
| (FIG. 213) STR REQ | 138 |
| (FIGS. 214–217) I STR, OPF, CPU RET AB, I FTCH | 139 |
| (FIG. 218) IC FE CTRL | 140 |
| (FIG. 219) IC FE LCHS | 141 |
| (FIG. 220) IC RTN AB | 141 |
| (FIG. 221) IC FM LCHS | 142 |
| (FIG. 222) Ton IC RCVY | 142 |
| (FIG. 223) IC RCVY LCH | 142 |
| (FIG. 224) IOP Loaded | 143 |
| (FIG. 225) ID AB REG Empty | 143 |
| (FIG. 226) FTCH Functions | 143 |
| (FIG. 227) A/B Loaded | 144 |
| (FIG. 228) IC FM OR LD | 145 |
| (FIG. 229) Add One/Two | 145 |
| (FIG. 230) GT GSR | 145 |
| (FIGS. 231–234) EN IC ETCH | 146 |

Figure 235:
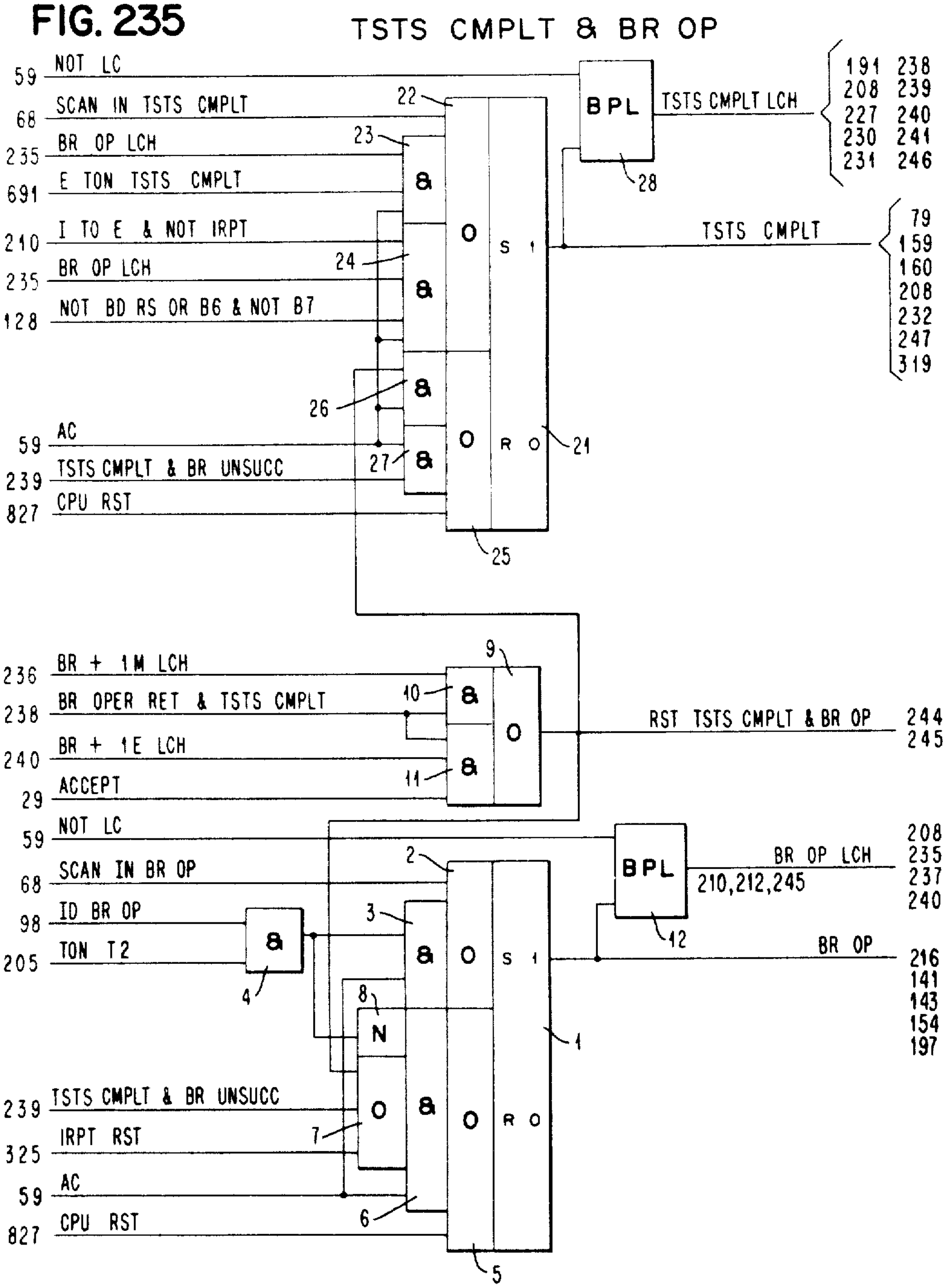
Figure 236:
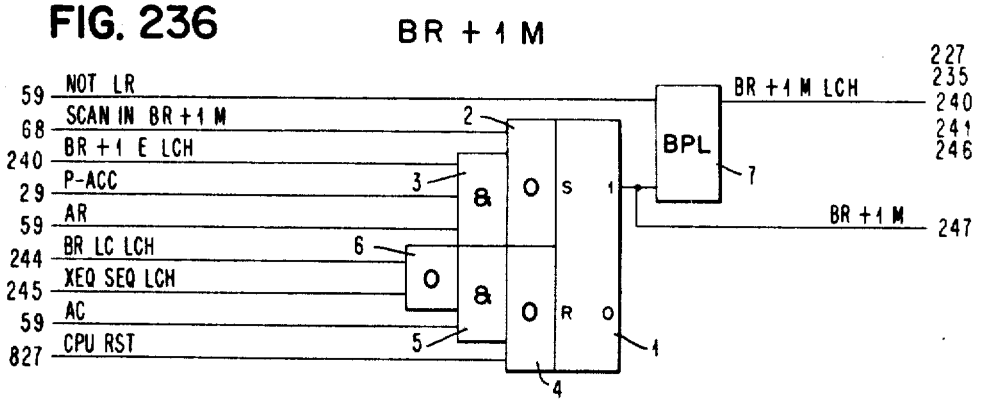
Figures 237, 238:
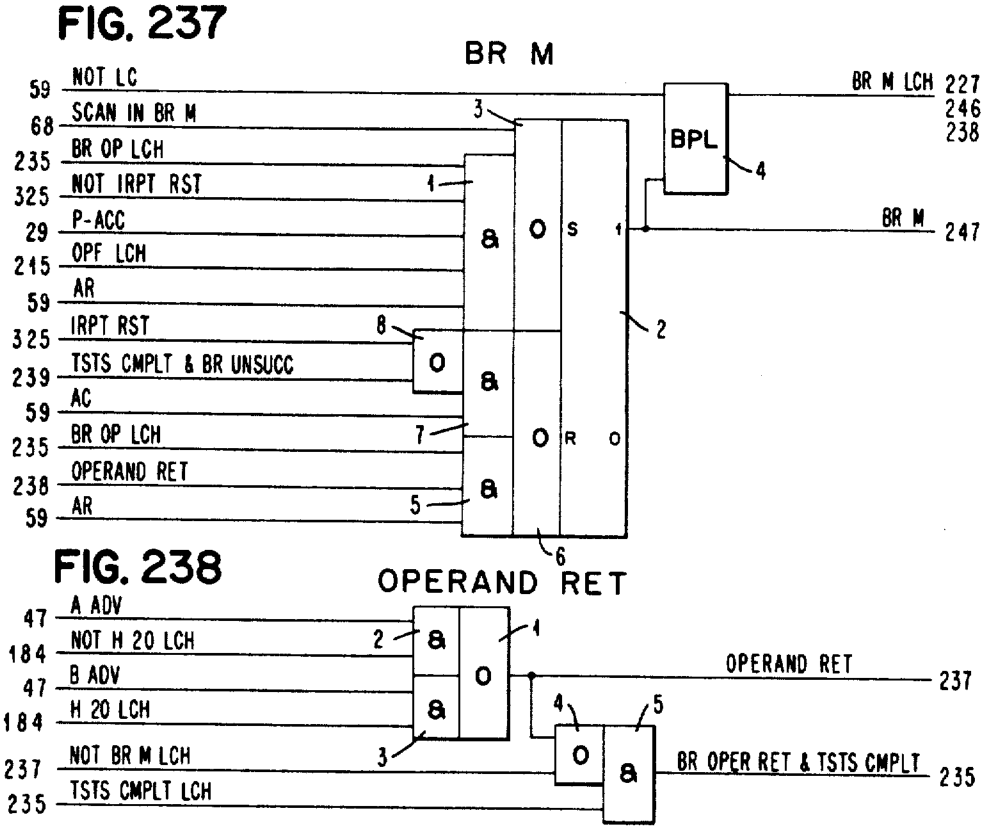
Figure 239:
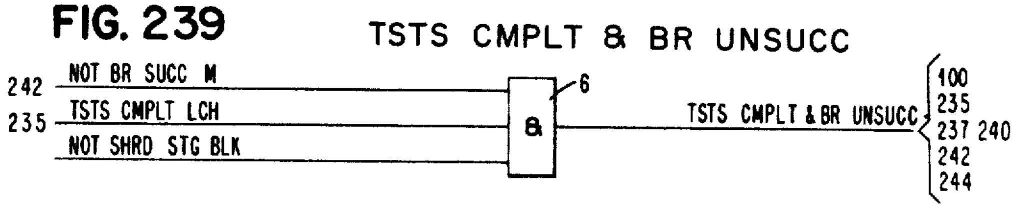
Figure 240:
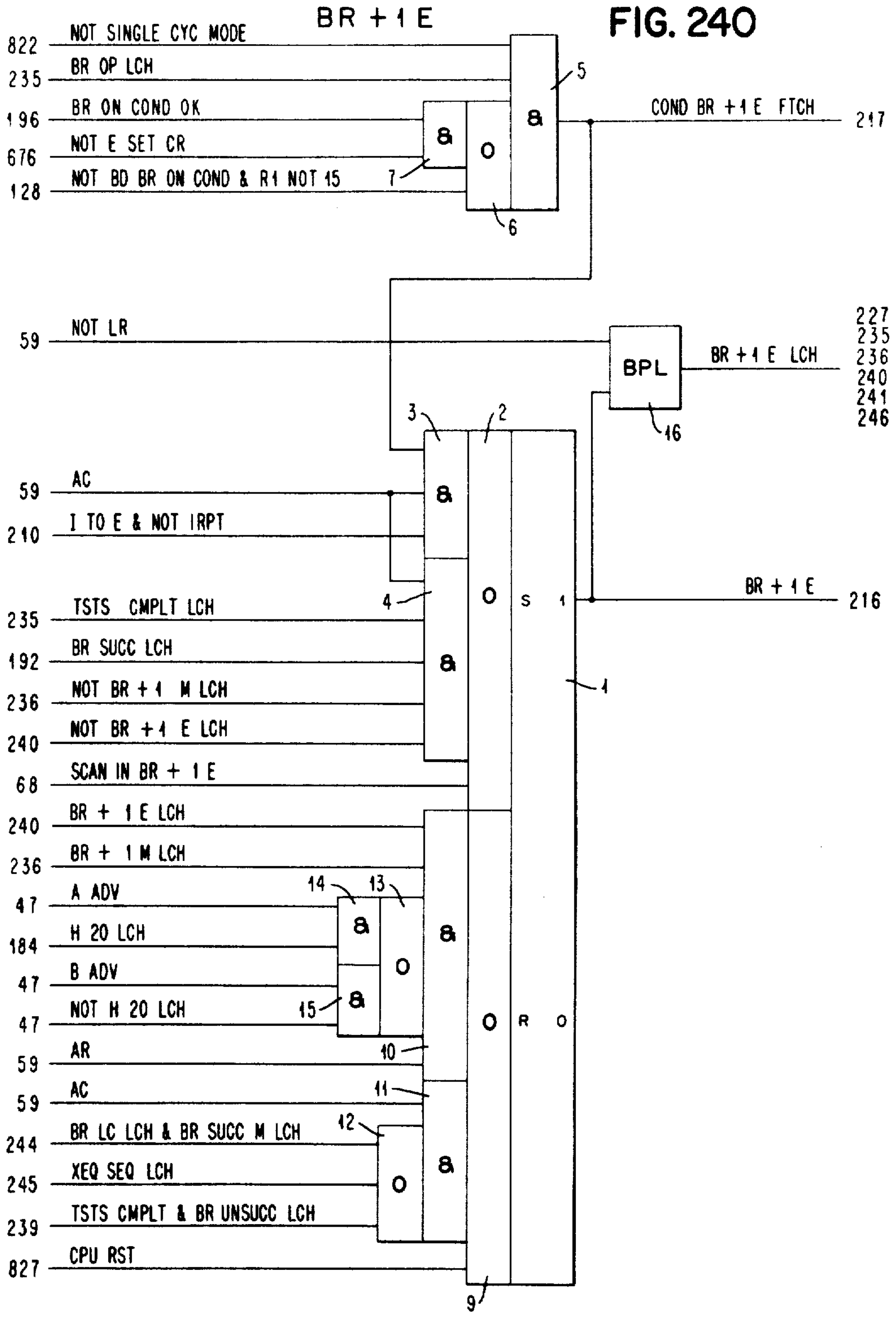
Figure 241:
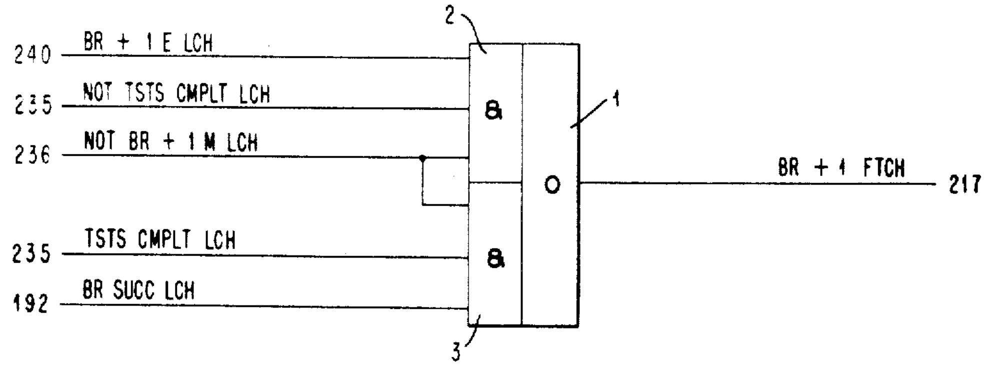
Figure 242:
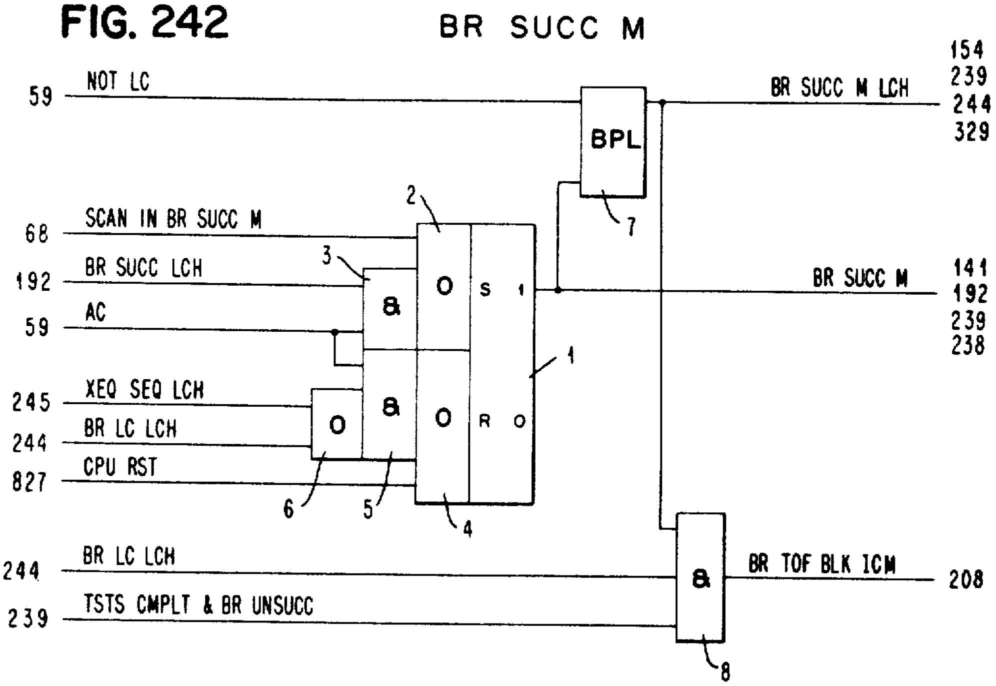
Figure 243:
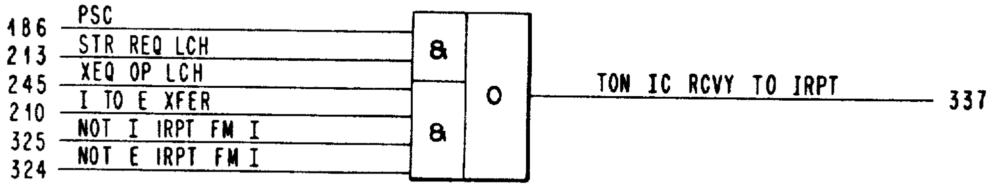
Figures 244, 245:
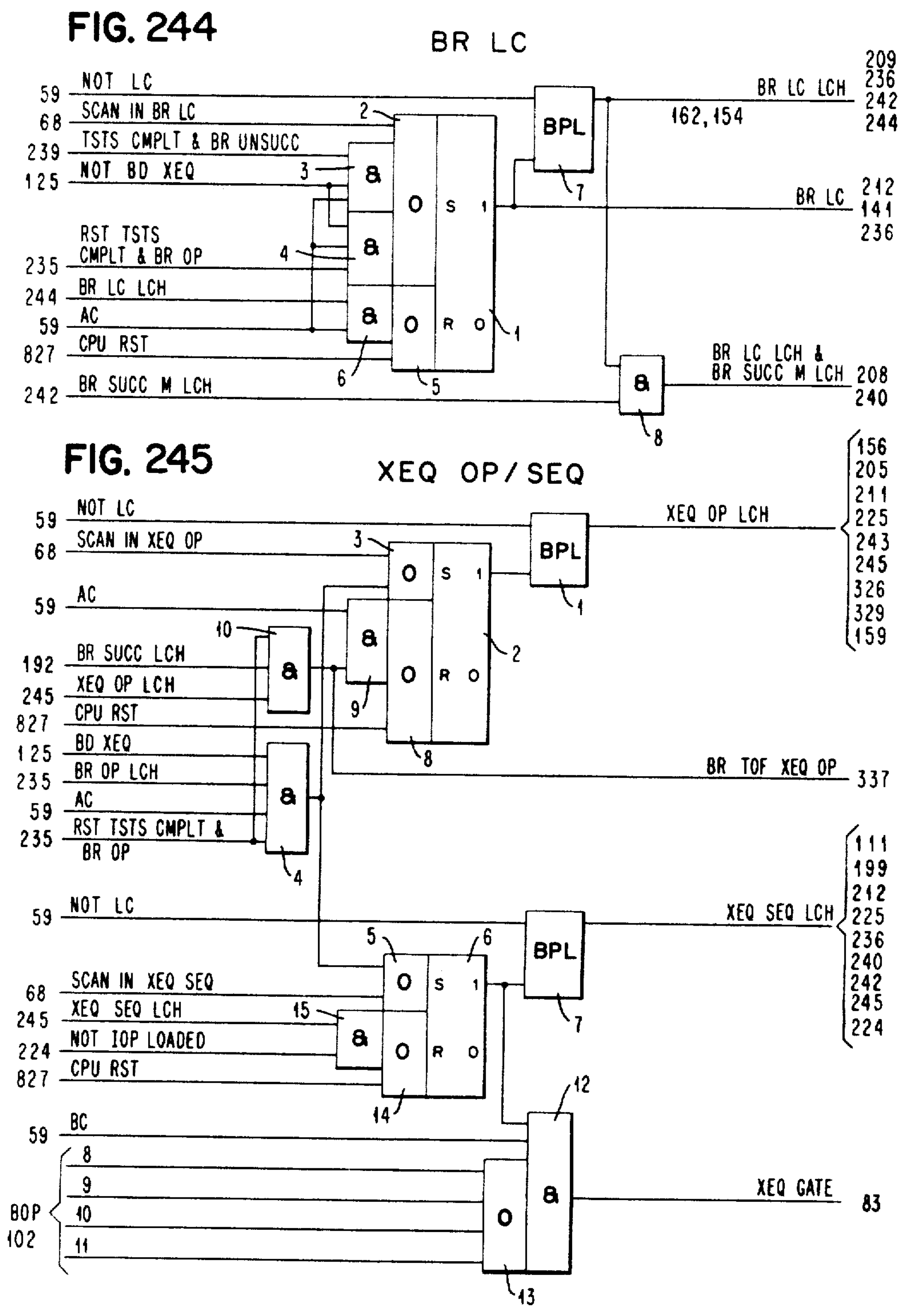

| | Sheet |
|---|---|
| (FIG. 235) TSTS CMPLT & BR OP | 147 |
| (FIGS. 236–239) BR+1M | 148 |
| (FIG. 240) BR+1E | 149 |
| (FIG. 241) BR+1FTCH | 150 |
| (FIG. 242) BR SUCC M | 150 |
| (FIG. 243) Ton RCVY | 150 |
| (FIG. 244) BR LC | 151 |
| (FIG. 245) XEQ OP/SEQ | 151 |
| FIGS. 246–876 are illustrative of said environmental system | 152–643 |

(2.0) REFERENCES

A primary reference in understanding the full environment of the present invention is an architectural description, or definition, of a system in which the present invention is embodied. This comprises a manual entitled "IBM System/360 Principles of Operation," a copy of which is available in the Scientific Library of the U.S. Patent Office, "IBM Form No. A22-6821."

Another reference, which discloses a small system in accordance with the architecture of said System/360 Manual is found in a copending application of the same assignee entitled, Data Processing System, Ser. No. 357, 372, filed Apr. 6, 1964, by G. M. Amdahl et al.

An input/output channel device which is adapted for use in said environmental system is disclosed in a copending application of the same assignee entitled, Automatic Channel Apparatus, Ser. No. 357,369, filed Apr. 6, 1964, by L. E. King et al.

A core storage device is shown in a copending application of the same assignee entitled Storage Drive Sense System, Ser. No. 445,306, filed Apr. 5, 1965, by Anatol Furman.

A bipolar latch, used throughout said environmental system, is described in detail in an article by O. J. Bedrij, entitled, Gated Trigger With Bipolar Set, IBM Technical Disclosure Bulletin, vol. 2, No. 6, April 1960, p. 50 (a copy of which is available in the Scientific Library of the U.S. Patent Office).

A binary trigger is referred to in particular in section 5. This trigger is described in detail in section 11*b* of a copending application of the same assignee entitled, Parallel Memory, Multiple Processing, Variable Word Length Computer, Ser. No. 332,648, filed Dec. 23, 1963, now Patent No. 3,270,325, issued Aug. 30, 1966, by R. S. Carter and W. W. Welz.

Binary-decimal addition is described in a copending application of the same assignee, Ser. No. 223,431, entitled, Byte Processing Unit, filed Sept. 13, 1962, by Robert Keslin. A shifter is described in a copending application of the same assignee, Ser. No. 162,477, Proportional Space Matrix Printer, filed Dec. 27, 1961 by Richard L. Taylor, now Patent No. 3,174,427, issued on Mar. 23, 1965.

Additional references include the following copending applications of the same assignee as in this case, each of which forms a part of, and is illustrated in, the environmental system, which is entitled, Large Scale Data Processing System:

Large Scale Data Processing System, Ser. No. 445,326, filed Apr. 5, 1965, by O. L. MacSorley et al., now abandoned.

Large Scale Data Processing System Ser. No. 609,238, filed on Jan. 13, 1967, said application being a continuation-in-part of Ser. No. 445,326.

Storage Reference Priority in a Data Processing System, Ser. No. 445,316, filed Apr. 5, 1965, by L. J. Hasbrouck et al., now abandoned.

Storage Reference Priority in a Data Processing System, Ser. No. 609,239 filed Jan. 13, 1967, by L. J. Hasbrouck et al., said application being a continuation-in-part of Ser. No. 445,316, now Patent No. 3,376,556, issued on Apr. 2, 1968.

Unit Unavailability Detector for a Data Processing System, Ser. No. 445,318, filed Apr. 5, 1965, by W. P. Wissick et al., now Patent No. 3,341,824, issued Sept. 12, 1967.

Rate Control in an Asynchronous Device Storage Accessing Apparatus, Ser. No. 445,319, filed Apr. 5, 1965, by W. P. Wissick et al., now abandoned.

Rate Control in an Asynchronous Device Storage Accessing Apparatus, Ser. No. 609,254, filed Jan. 13, 1967, by W. P. Wissick et al., said application being a continuation-in-part of application Ser. No. 445,319, filed Apr. 5, 1965, now Patent No. 3,377,579, issued on Apr. 9, 1968.

Storage Cancellation and Panel Data Key Fetching in a Data Processing System, Ser. No. 445,311, filed Apr. 5, 1965, by W. P. Wissick et al., now abandoned.

Storage Cancellation and Panel Data Key Fetching in a Data Processing System, Ser. No. 609,252, filed on Jan. 13, 1967, by W. P. Wissick et al., said application being a continuation-in-part of application Ser. No. 445,311, filed Apr. 5, 1965, now Patent No. 3,374,472, issued on Mar. 19, 1968.

(3.0) NOMENCLATURE

The nomenclature of the present embodiment is almost entirely consistent with that shown in said System/360 Manual. A few exceptions do exist however. One of these is the instruction Execute and is herein referred to in abbreviated form as XEQ, whereas said Manual refers to this instruction in abbreviated form as EX. Another example is the instruction Edit; it is referred to in abbreviated form herein as EDT whereas said Manual refers to same as ED. In order to avoid confusion with "execution," "E decode," and other similar functions in the present embodiment, these changes have been made. However, a good definition of each of the instructions which may be performed by the present embodiment is found in said Manual. Additionally, the functions of a data processing system in accordance with the architectural definition within said Manual are applicable to this embodiment, with the exception of the fact that the present embodiment does not provide for: sharing of storage by more than one system, a multiplex channel, direct coupling between computers, large capacity storage, and certain other features which could be available on an embodiment of the system described in said Manual. However, said environmental system is readily adapted for the achievement of these functions.

In the present embodiment, a bit means a binary unit of intelligence, which can be either a one or a zero. A byte comprises eight bits, two bytes comprise a syllable or a half-word. Two syllables, or two half-words comprise a word, which includes thirty-two bits. A storage word is two words or sixty-four bits in the environmental system of the present embodiment. In storage, and within the data flow of the environmental system, there is one parity bit for each eight bits of data; at certain points in a data flow this is altered; for instance, at the output of an adder, it is possible that parity may be carried to several stages of logic on a four bit basis, and then combined on an eight bit basis.

In the detailed descriptions herein, the signals which propagate between various figures are all identified by unique lines which are referred to in the upper case (such as SAR meaning the output of the storage address register, CPU RST being the line that causes a computer reset of a particular type). As is discussed more fully in section 5, hereinafter, the use of positive and negative signals as inputs to positive and negative-type circuits is so customary, that it no longer has any significance to consider signals in actual circuitry as being either the true or the complement of an event; for instance, if a signal is generated in a positive sense when the event occurs, a minus signal may nonetheless be required to indicate that event due to the fact that the circuit which is utilizing the signal requires a negative input. For that reason, complementary functions (such as NOT LC, meaning the complement of the LC signal) are referred to as inputs even though they may not be explicitly generated in the circuit where the event is manifested by the true signal.

In block diagrams which comprise a plurality of blocks, each block being represented by one or more figures, the figure or figures within which the details of the particular block are shown may be identified in that block by figure number only, without the word "FIG." actually being printed within that block. This allows a simple block configuration which is easier to read.

In the description of the detail figures, the various circuit elements are referred to by reference numerals, the reference numerals being applicable only in the particular figure number. However, in any case where a particular item is referred to in more than one place, it would have the same reference numeral wherever it is referred to. On the other hand, reference numerals between 1 and 30 are used repetitively throughout the environmental system due to the fact that the size of the environmental system would require reference numerals having four or five digits if completely sequential reference numerals were used for the entire environmental system. Therefore, any possible tendency toward confusion is alleviated by also specifying the figure number along with the reference numeral; additionally, the description itself is patently clear insofar as the precise element to which reference is being made.

When terms such as "storage cycle" or "last E cycle" are used, machine cycles as such are not necessarily involved. For instance, a storage cycle requires five machine cycles in the embodiment of said environmental system; last cycle triggers may be set from the start of NOT L time to the start of the following NOT L time, a period equal to a 200 nanosecond machine cycle, but displaced therefrom by approximately 65 nanoseconds since the basic machine cycle is defined to be from the start of A time to the end of A time, as is described in section 7. The duration or phase of any specially-referred to cycle often differs from a basic machine cycle. The terms, when used, refer to the latched condition or event being described, as is apparent in the context where used.

In order to facilitate cross referencing between the various copending applications, and most particularly, to facilitate cross referencing of embodiments in said copending applications of portions of said environmental system with the embodiment of a full environmental system, constant sequential figure numbers are used in all of said copending applications, whereby all figure numbers are identical in all of the cases. In order to reduce the cost of printing, figure numbers which relate to circuits not required in smaller embodiments are shown in an illustrative manner only. Any reference to a figure which is shown in an examplary form in one of said copending applications should be interpreted as a reference to that same figure in the embodiment of said environmental system.

In certain instances, control lines comprising a particular combination of operational decoding or other status indications may not be shown in detail; that is, a line called "BR OR STATUS SWX" may be utilized, as an input to a circuit, but may not be generated, as an output from a circuit. However, there are innumerable examples of generated decode lines such that the generation of any other one would be well within the skill of the art. As an example, a line called "VFL T1 or Y≠0" could be generated by the OR of "VFL T1" with "Y≠0," or with "NOT Y EQ 0," or by ORing the bits of the Y REG to see that Y does indeed equal other than zero.

(4.0) BRIEF DESCRIPTION OF ENVIRONMENTAL SYSTEM (FIG. 2)

Figure 2:
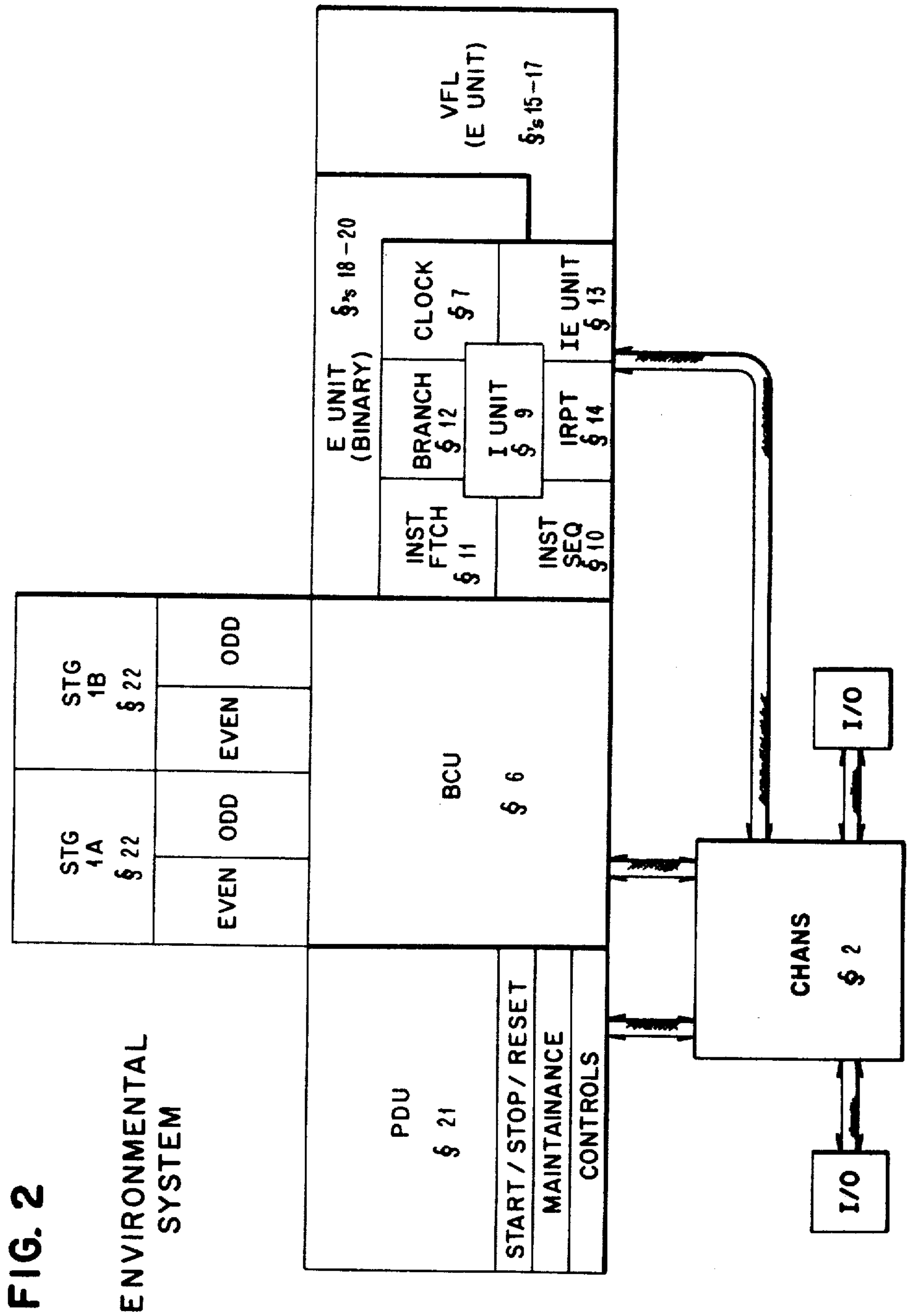

In FIG. 2, a block representation of said environmental system is shown to include a bus control unit (BCU) which is described in section 6, and which provides data flow communication between the various units of the system, and provides controls for the storage devices. The operator controls, certain maintenance controls, and basic stop start and reset controls are provided in the power distribution unit (PDU) described in section 21. The system also includes an I unit, the data flow portion of which is described in section 9, the main other functions of the unit being described in separate sections. The clock is shown in section 7, and includes the main timing pulses which are utilized throughout the system so as to synchronize operations. In section 10, instruction sequencing is described, and instruction fetching is described in section 11. Branching operations, and their effect on the remainder of the system are all described in section 12. Communication with channels, and performance of certain supervisory type instructions, inter alia, are described with respect to an I execution unit (IE UNIT) in section 13. Interruption handling, and functions which, although not interruptions, are handled by the interruption circuitry, are described in section 14 of said environmental system. The E unit of said environmental system includes a binary portion and a VFL portion, which are referred to in a compound fashion; both the binary and VFL portion are considered part of the E unit, and E unit controls can come from either portion. However, the binary portion is generally not referred to as such, but is referred to merely as the E unit, and the VFL (variable field length) portion is usually referred to as the "VFL." Storage devices are not completely described herein, but the logical control thereover as it relates to the bus control unit is described in section 22.

(5.0) COMPONENT CIRCUITS (FIG. 3 THROUGH FIG. 8)

In FIG. 3 through FIG. 8, component circuits of the type which may be utilized in said environmental system are illustrated. These are not exhaustive, and merely illustrate types of circuits which might be utilized, and the manner in which they are illustrated in the detailed description of said environmental system.

Figure 3A:
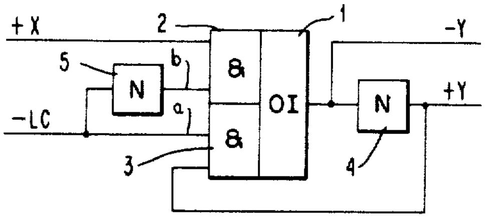

In FIG. 3*a*, a simple latch is shown. This comprises an "AND-OR-INVERTER" combination which includes an OR-INVERT circuit 1 and two AND circuits 2, 3 as well as two inverters 4, 5. In normal operation, whenever the LC line is positive, the inverter 5 will provide a signal "*b*" to the AND circuit 2 so that a +X signal, whenever it may arrive, will cause the AND circuit 2 to activate the OR-INVERT circuit 1 thereby generating a −Y signal. If the +X signal is removed, then the −Y signal will disappear. The −Y signal causes the inverter 4 to generate the +Y signal which is fed back to an AND circuit 3; however, so long as the −LC pulse is present, the AND circuit 3 will not operate, so that the circuit of FIG. 3*a* is essentially an AND circuit whereby a +X signal and the signal from the inverter 5 pass through the AND circuit 2, becomes inverted in the OR circuit, and no latching takes place.

When the LC signal turns positive (at NOT L time) then any +X signal will cause a +Y signal to be gated through the AND circuit 3 thereby causing the circuit of FIG. 3*a* to become latched for the duration of the +LC signal. When the LC signal returns to a negative condition (at L time) then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 3*d*) when the circuit of FIG. 3*a* will have no output whatever. This is of too short a duration to be illustrated in FIG. 3*c* which shows the operation of the latch of FIG. 3*a* in general terms.

The circuit of FIG. 3*a* is illustrated herein as shown in

Figure 3B:
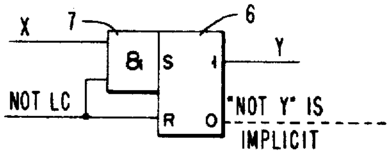
Figure 3C:
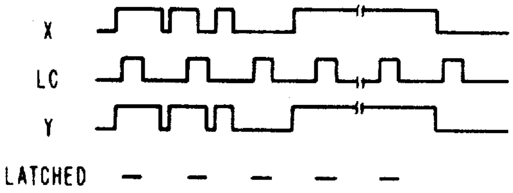
Figure 3D:
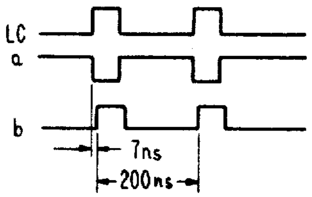

FIG. 3*b*. Thus, the circuit of FIG. 3*a* can be considered to be a latch circuit 6 settable by an AND circuit 7 at NOT L time, to be reset at L time.

Figures 4A, 4B, 5A:
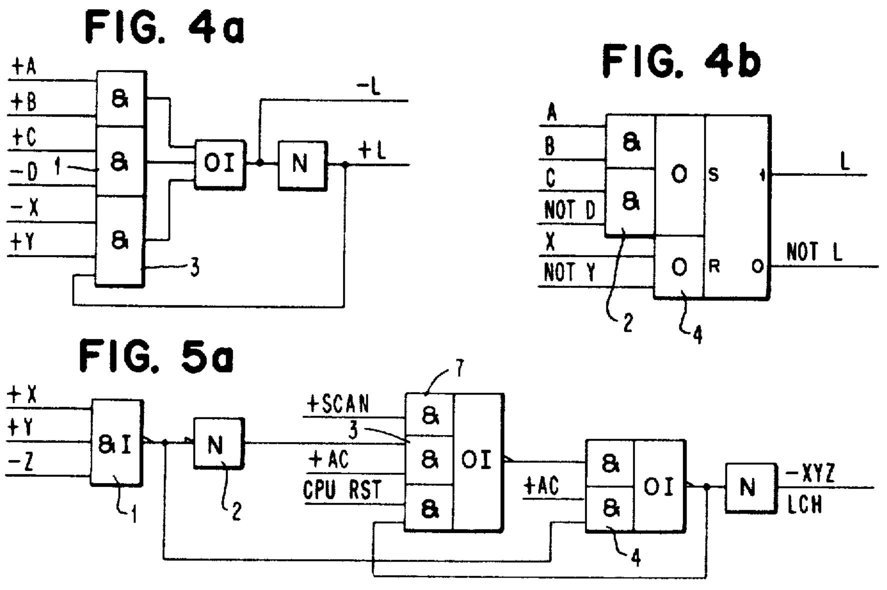

In FIG. 4*a* is shown a variation of a latch having a combined reset condition which, as shown in FIG. 4*b* includes X or NOT Y. Notice that the AND circuit 1 in FIG. 4*a* has a minus D signal applied thereto which represents a NOT D as illustrated by the AND circuit 2 in FIG. 4*b*. Also notice that the AND circuit 3 in FIG. 4*a* has both −X and applied Y signals thereto so that the latched effect will be ended by the disappearance of −X or by the disappearance of +Y. This is illustrated as resetting in response to either X or NOT Y by the OR circuit 4 in FIG. 4*b*. A still further complicated latch is illustrated in FIG. 5*a*. This includes an AND-INVERT circuit 1 which passes a signal through an inverter 2 (the output of which then would be positive when the conditions to the AND invert circuit 1 are met) so as to cause an AND circuit 3 to operate when the +AC signal appears. +AC means a positive controlled clock signal having the A time duration. The "C" within "AC" stands for "controlled," in contrast with "running," as is the case when an AR signal is involved. The AR signal would be of the same duration and timing as the AC signal, but could run even through single cycle operations, whereas the AC signal would be stopped during single cycle operations.

Figure 5B:
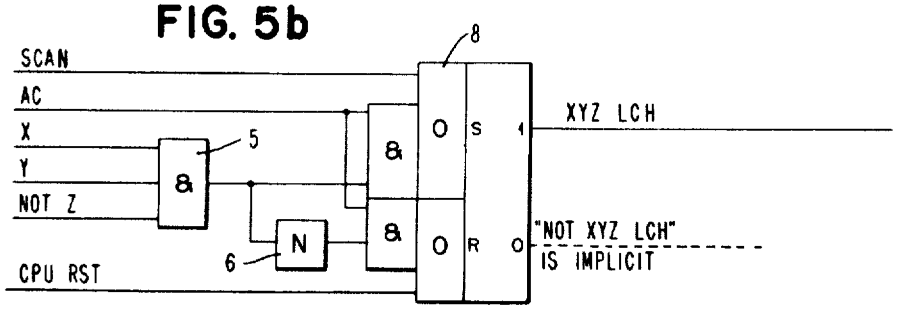

The latch of FIG. 5*a* can be reset by the CPU RST signal, or by the raw output of the AND INVERT circuit 1 as applied to an AND circuit 4. The circuit of FIG. 5*a* would be illustrated herein as shown in FIG. 5*b*, wherein an AND circuit 5 will either set or reset the latch in dependence upon whether the conditions are met, due to the assistance of an inverter 6. Notice also that single-input AND circuits such as the AND circuit 7 in FIG. 5*a* actually represent merely an input to the OR INVERT circuit, as illustrated by the direct application of the scan signal to the OR circuit 8 in FIG. 5*b*.

Figure 6A:
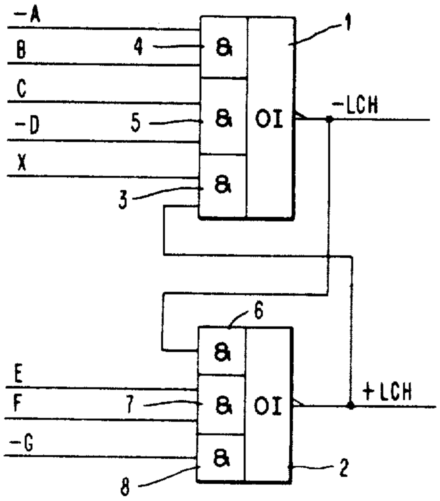
Figure 6B:
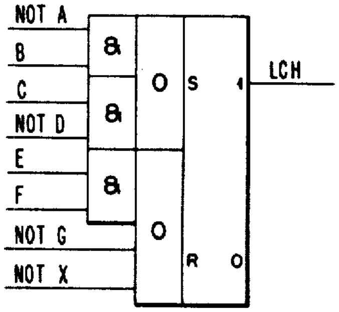

A variation in the circuit of FIG. 5*a* is shown in FIG. 6*a*, wherein a first or INVERT circuit 1 operates when the latch is in the on condition, and a second OR INVERT circuit 2 operates when the latch is in the reset condition. When the OR circuit 2 operates, it has a negative output, thereby locking an AND circuit 3. However, a negative output from the OR circuit 2 does not preclude an output from the latch inasmuch as either one of two AND circuits 4, 5 could supply an input to the OR circuit 1. If either of the AND circuits 4, 5 do operate, then there will be a minus signal out of the OR circuit 1 which will block a single-input AND circuit 6 at the input to the OR circuit 2 so that the OR circuit 2 will normally have no output unless inputs are applied to either an AND circuit 7 or a single input AND circuit 8, with the OR circuit 2 locked, its positive output will be applied to an AND circuit 3, and if there is an X signal at the AND circuit 3, then the latch will remain on even though either of the OR circuits 4, 5 which turn the latch on in the first place no longer has inputs thereto. This is illustrated more clearly in the circuit shown in FIG. 6*b*, which represents the manner of illustrating this circuit herein. As seen in FIG. 6*b*, the latch can be turned on by NOT A and B, or by C and NOT D. If turned on, it will latch up provided that E and F are not both present, and provided that G and X are both present. If the latch turns on and becomes latched in an on condition, then the appearance of E and F together or the appearance of NOT G or NOT X will cause the latch to turn off.

Figure 7A:
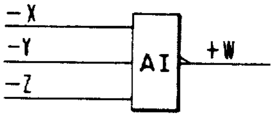
Figure 7B:
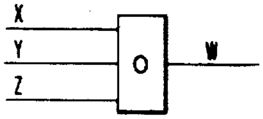

In FIG. 7*a*, an AND INVERT circuit with minus inputs is shown to create a +W signal. This is fully equivalent to the circuit of FIG. 7*b* wherein a positive, non-inverting OR circuit responds to positive XYZ signals to generate a positive W signal.

Figure 8A:
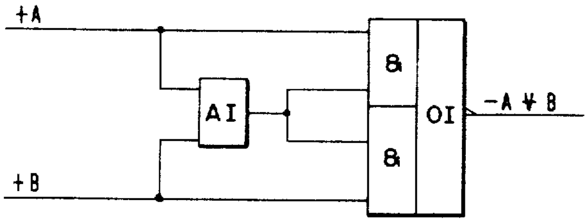
Figure 8B:
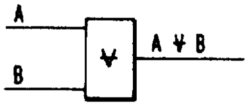

FIG. 8*a* is a simple illustration of a two input EXCLUSIVE OR circuit, which is represented herein as shown in FIG. 8*b*. It should be understood that the EXCLUSIVE OR function with only two inputs is a test for oddness: that is, one and only one input must be present; if no inputs or two inputs are present, then there will be no output. Thus, an odd number of inputs are are required. In the embodiment described herein, a term "EXCLUSIVE OR circuit" is utilized to mean a complex of EXCLUSIVE OR circuits which test for oddness and evenness of the inputs thereto. These may be actually manifested in two input EXCLUSIVE OR circuits as shown in FIG. 8*a*, or may be represented with EXCLUSIVE OR circuits actually responding to more inputs. To the extent that more than two inputs are shown, it can be assumed that a three input EXCLUSIVE OR circuit or a two input EXCLUSIVE OR circuit or combinations thereof are utilized in a well-known "tree" fashion so as to provide an EXCLUSIVE OR complex which gives an output whenever the inputs thereto are odd in number.

From the foregoing description, it can be seen that the presence of a plus or a minus signal has no significance in and of itself, due to the way in which a plus or a minus signal may be utilized. For instance, when applied to a +AND circuit of a reset side of a latch as shown in FIG. 6*a*, it may be a NOT signal, as illustrated by the NOT G signal shown in FIG. 6*b*. Similarly, when applied to a resetting AND circuit such as the AND circuit 3 in FIG. 4*a*, a −X signal really becomes an X signal in terms of its logical connotation as illustrated in FIG. 4*b*. Also, the minus signals applied to the circuit of FIG. 7*a* in fact are plus signals when the function of that circuit is considered to be an OR circuit. For that reason, the simplified showing of the present embodiment (such as illustrated in FIGS. 3*b*, 4*b*, 5*b*, 6*b*, 7*b*, and 8*b*) do not consider whether a plus or minus signal may be generated at the source of a signal, or whether that signal may be generated in true or complement form, since such considerations have no bearing on the way in which the signal may be utilized. However, at the input to any particular circuit (such as the input to FIG. 6*b*) the affirmative or negative function which the signal represents does have logical connotation and is shown. To the extent that a "NOT SIGNAL" is required but not generated, it is implied that one with ordinary skill in the art could obtain the opposite phase thereof from the source of the "SIGNAL." This is illustrated, for instance, in FIGS. 3*a* and 3*b* where both phases are generated in 3*a*, and only the affirmative phase is generated in 3*b*, the complement thereto being implied.

(6.0) BASIC BUS CONTROL UNIT

The BCU (bus control unit) acts as a buffering traffic control for data, address, control, and checking signals between the storage devices and the rest of the system. In this embodiment, the CPU (including the I unit, the IE unit, the BE unit, and the E unit) is considered to be a single device with respect to the accessing of storage, and it must share storage with the channels. Each of the I/O channels 1–6 has a priority rating corresponding to its number (1–6), and the MC (maintenance channel, including panel keys and panel indicators) comprises a seventh, lowest-priority channel for storage reference purpose. In accessing storage, priority is determined as between channels, and then priority is determined between the selected channel and the CPU. Stated alternatively, the CPU may reference storage unless it is prevented from doing so by a prior outstanding request for an avialable storage device initiated from one of the channels; which one of the channels will be permitted to reference storage is determined independently by a channel priority circuit. For purposes of completeness and simplicity, the embodiment of a bus control unit described in this section does not include provisions for handling a large capacity storage, nor for the sharing of a single storage device by more than one data processing system. The BCU comprises three general portions, shown in FIG. 9, FIG. 10 and FIG. 11, and described in sections 6.1, 6.2 and 6.3, respectively of previously referred to application Ser. No. 609,238.

(7.0) CLOCK CIRCUIT

(7.4) *Clock circuit*

Figures 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59:
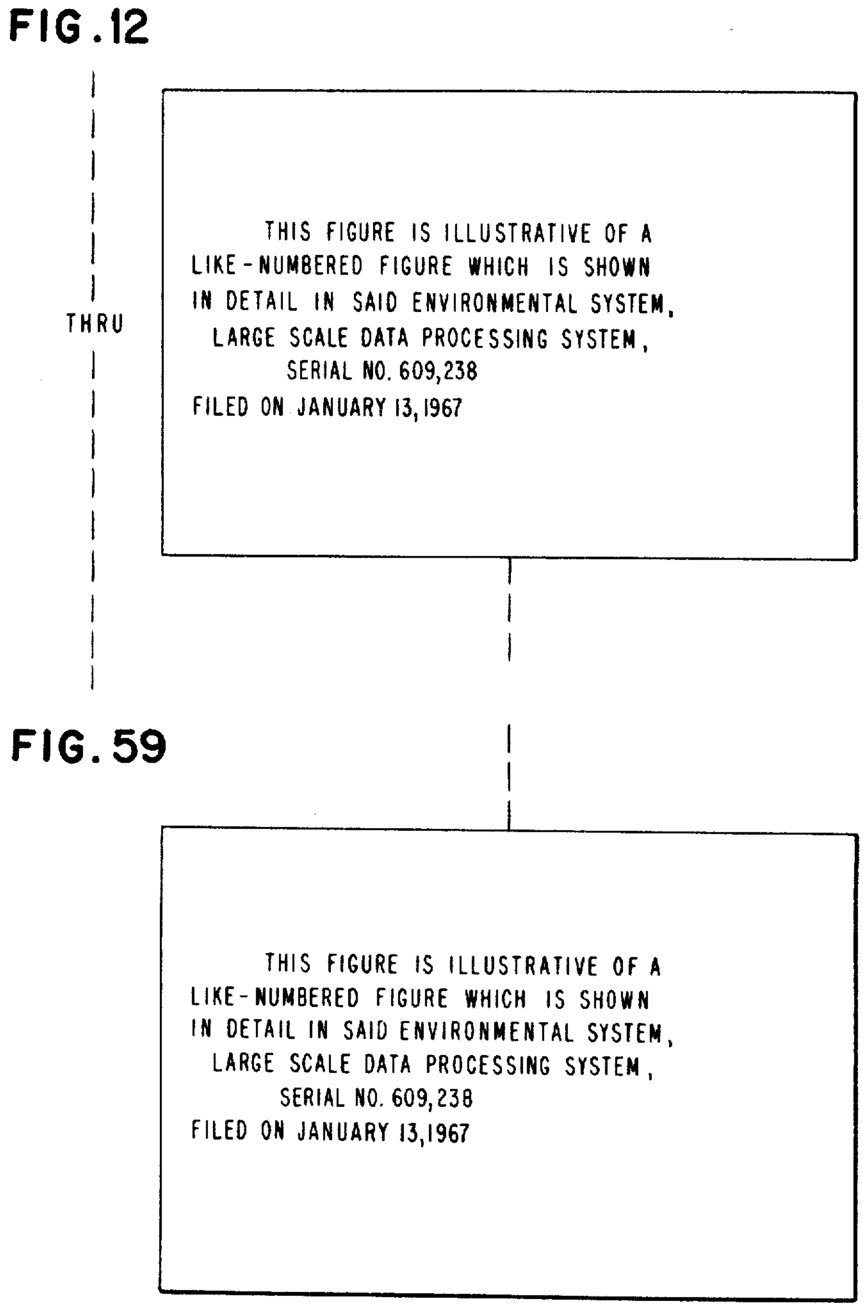
Figure 60:
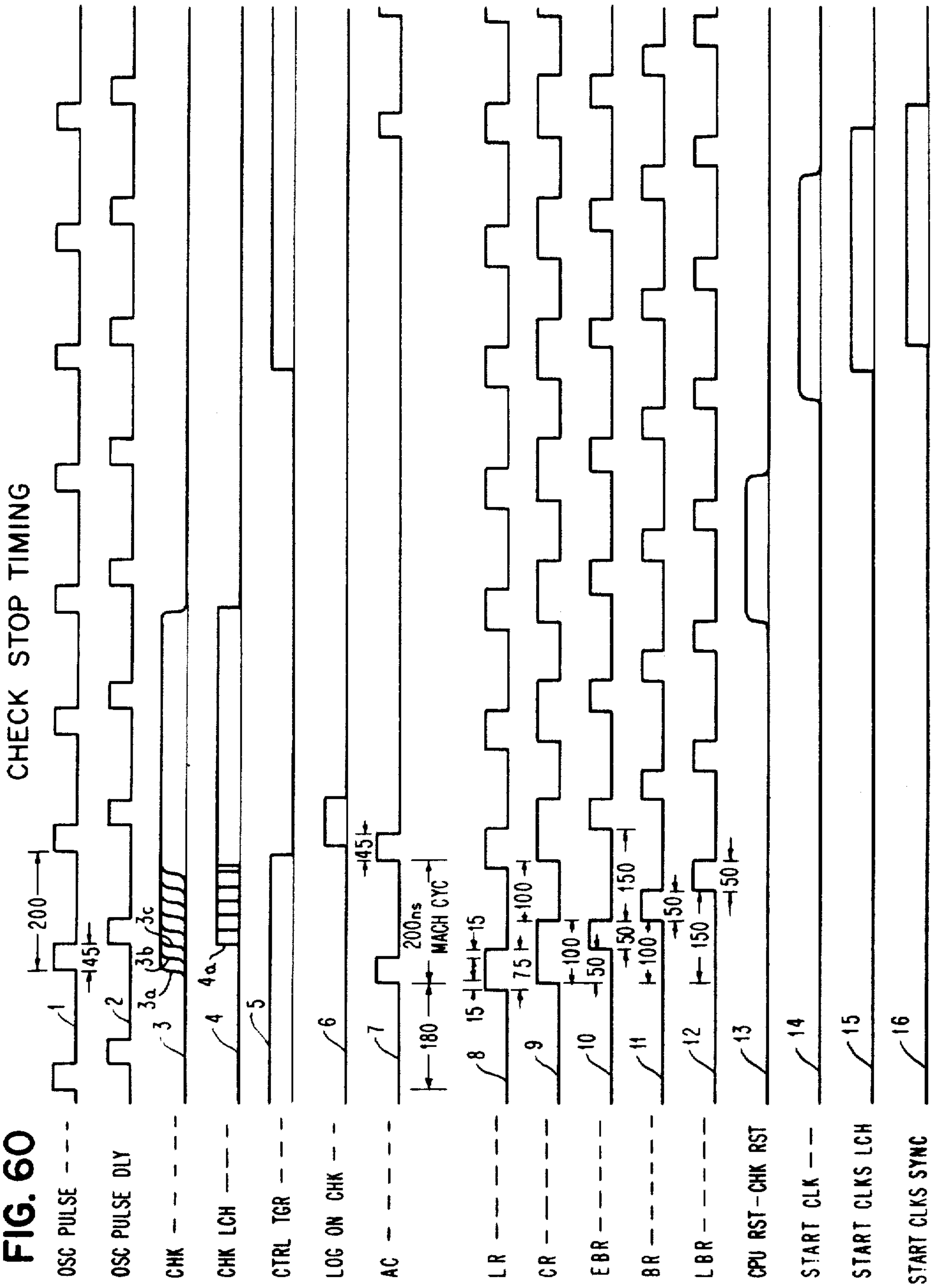
Figures 61, 67:
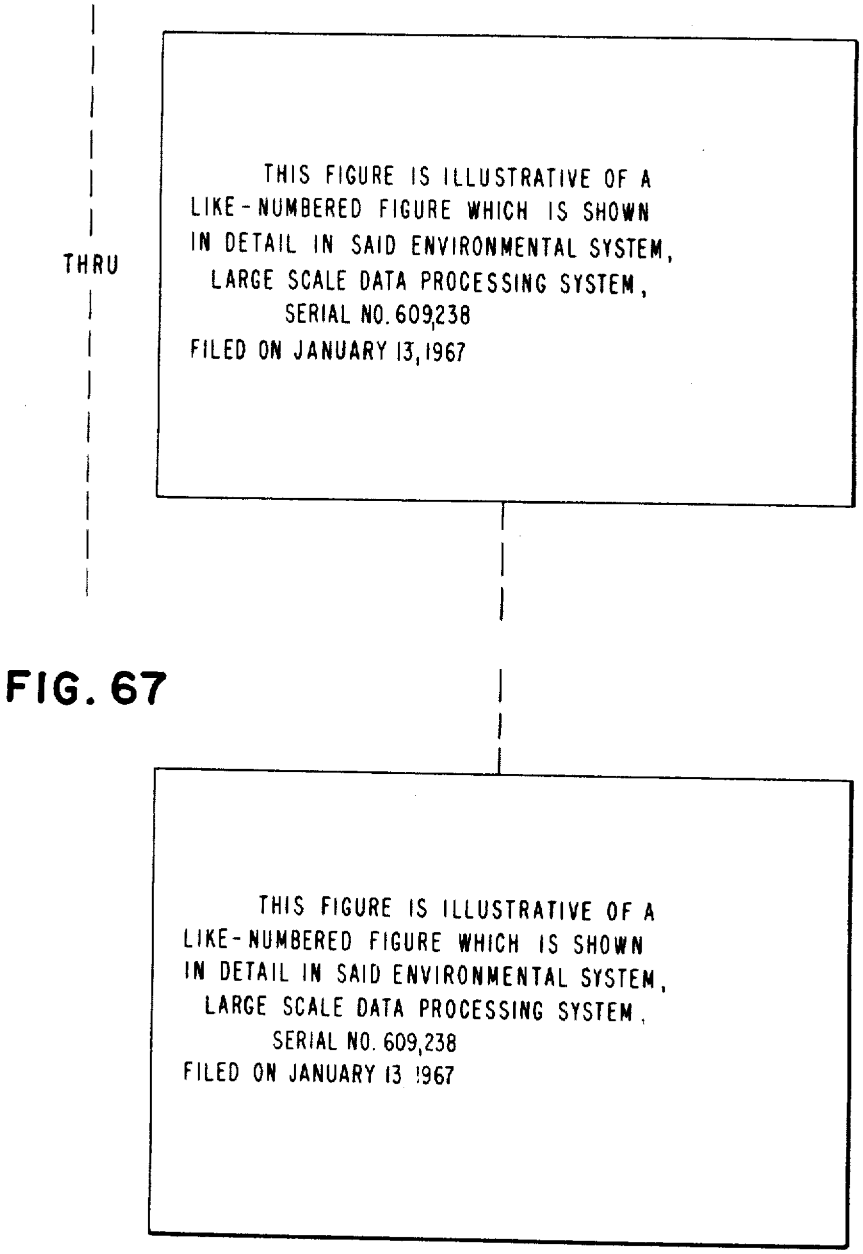

References herein to FIGS. 56–59, 61 and 62, refer to figures in said application ser. No. 609,238. The actual timing signals used throughout the system are generated by the clock circuits shown in FIG. 59, the upper portion of which comprises the control clock, and the lower portion of which is identical to the upper portion and comprises the running clock; the only difference between them being that the control clock is operated by the gated control pulse signal from FIG. 58, whereas the running clock is operated by the gated running pulse signal from FIG. 58. The operation of the clock generating circuits is illustrated in FIG. 60 through FIG. 62. In FIG. 60 through FIG. 62, an OSC PULSE (illustration 1) comprises the signal on the OSC line. It is to be noted that this signal is about 45 nanoseconds in width, and the beginning of each pulse is separated from the beginning of the following pulse by 200 nanoseconds, which comprises a machine cycle. The delayed oscillator pulse (OSC PULSE DLY, illustration 2) comprises the output of the delay unit 7 in FIG. 58. This is the signal which gates the signals on the GATED CTRL PULSE line and on the GATED RUNNING PULSE line. These signals are utilized to generate the actual timing signals as shown in FIG. 59.

Whenever the clock has to be stopped because of error signals which give rise to a check condition, it is desirable to always know that the clock will stop at a definite time in relation to the time at which the error condition was sensed. Therefore, the clock circuits of FIG. 56 through FIG. 59 are arranged so that the clock will always stop within a machine cycle following the cycle within which an error could be sensed. Referring to illustration 3 of the check signal (CHK) in FIG. 60, it will be seen that check signals can appear at a number of different times within a machine cycle. It is therefore desirable to establish that these check signals will fall within a single defined machine cycle. For this reason, the final timing of the various clock signals (as shown in illustrations 7–12 in FIG. 60), is set up so that A time begins prior to the time when any of these check signals could occur and the next A described in section 7.5) only during the nonoscillator pulse time. Thus, either of the first two check setting times (3*a*, 3*b*) will cause the check latch to be set at time 4*a*, all other occurrences of a check condition causing the check latch to be set at a corresponding time, approximately 20 nanoseconds after the check condition has occurred, due to the time delays inherent in logic circuits used for setting the check latch. Thus, the establishment of a signal from the check latch is related to the timing of the oscillator in such a fashion that the basic timing signal which defines a machine cycle, which is A time, must occur approximately 180 nanoseconds after the oscillator pulse output on the OSC line in FIG. 56.

(8.0) SCAN

Within the embodiment of said environmental system, the word "scan" means the forcing of conditions in bistable devices throughout the system, so as to cause the system to establish a particular state. This is accomplished by a network of circuitry which is complex in its size, but is conceptually very simple. The process includes defining a scan mode, identifying a particular cycle within the scan mode, and utilizing certain bits of a storage word fetched from storage as data bits to force particular bistable devices.

Figure 68:
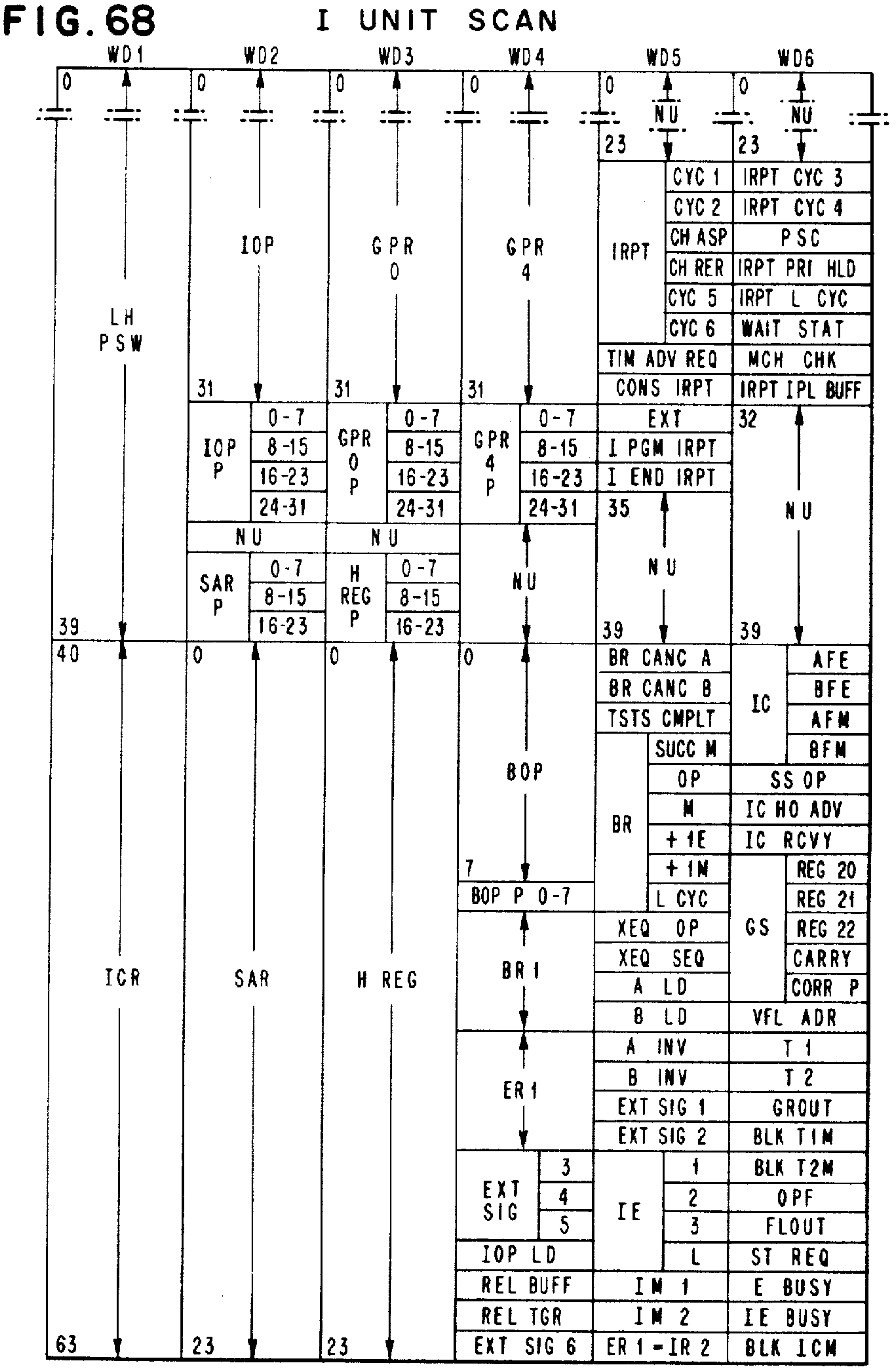

(*8.1*) *Scanning into the I unit* (*FIG. 68*)

I unit scanning is illustrated in FIG. 68. Scanning into the I unit is controlled by six scan word cycles, each one of which causes a 63-bit word to be set into various latches and triggers of the machine. The first scan cycle is defined as word 1 (WD1), which causes all 63 bits of the J register to be loaded into the PSW register, bit for bit, as shown in FIG. 68. In word 2 of the scan, bits 0–31 are loaded into the IOP register, and IOP parity bits themselves are forced by bits 32–36 of the J register. During this same cycle, the storage address register is loaded with bits 40–63 of the J register, and the parity bits of the storage address register are forced by bits 37–39 of the J register. In a similar fashion, the other words are applied to the various circuits as shown in the chart of FIG. 68. The manner of providing this gating is twofold: as in the case of the PSW register, scan gates are provided as shown at the top of FIG. 70 of application Ser. No. 609,238. When status triggers and registers are being scanned into (as in the case of word 5 and word 6, FIG. 68) actual signals are generated by scan gate signals in combination with bits of the J register as shown in FIG. 71 of application Ser. No. 609,238. But the circuits of FIGS. 70 and 71 are merely illustrative of the manner in which scanning signals may be applied to the circuits of this embodiment.

Figure 69:
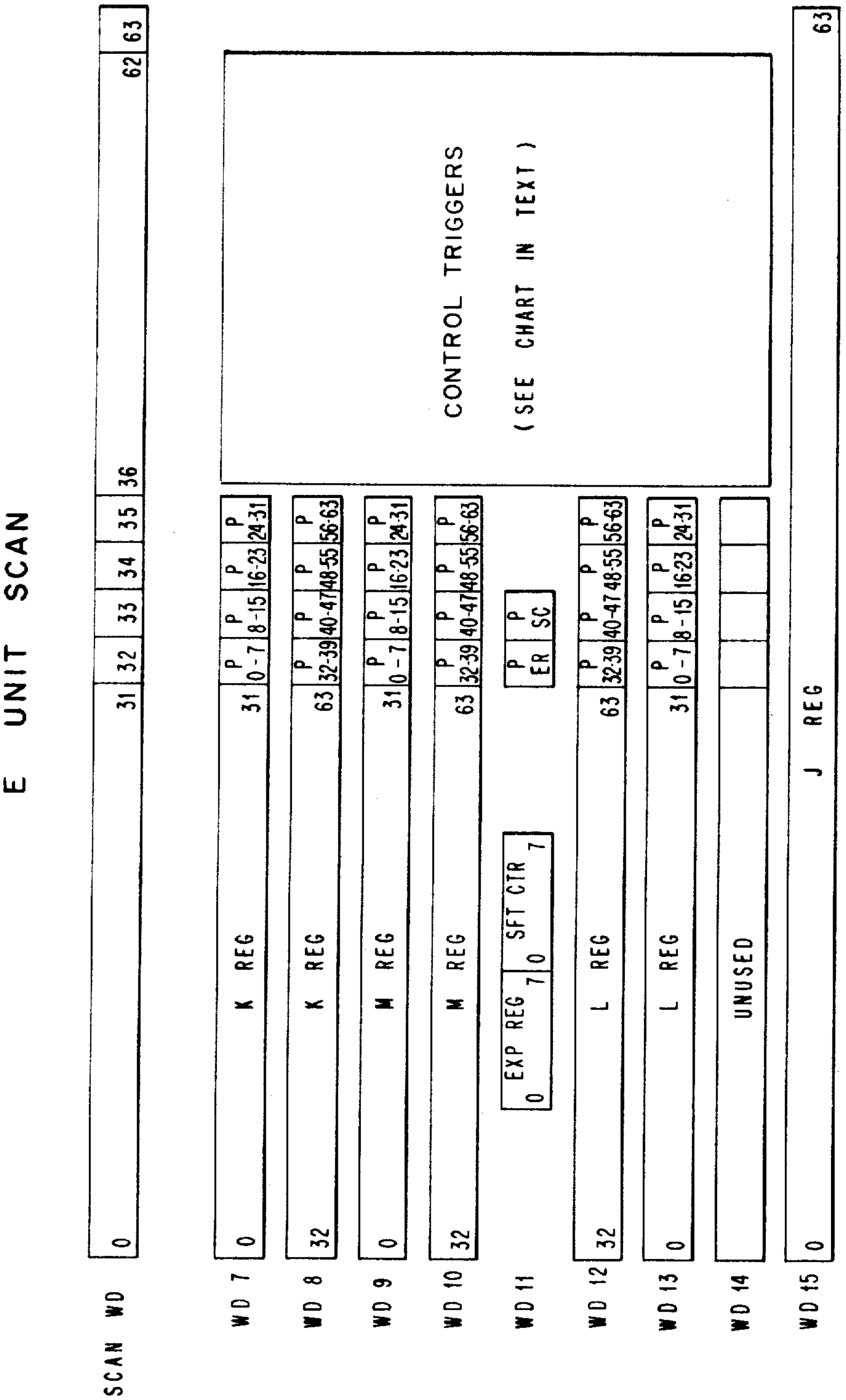

(*8.2*) *Scanning into the E unit* (*FIG. 69*)

A chart which is illustrated somewhat differently than FIG. 68, but which contains the same information, is shown in FIG. 69. E unit scanning commences after I unit scanning, and includes word 7 through word 15 of a scan operation. The chart of FIG. 69 is not complete as shown therein, bits 36–62 thereof for words 7 through 14 being illustrated in the following chart:

E SCAN-IN CHART—WORD 7

| Bit | Trigger: |
|---|---|
| 36 | J0–7 EA |
| 37 | J0–63 MA T/C |
| 38 | J0–31 MA T/C |
| 39 | J32–39 EA |
| 40 | JL32 MA T/C |
| 41 | J For Parity MA T/C |
| 42 | K0–63 MA |
| 43 | KR4 MA |
| 44 | KL2 MA |
| 45 | DC8 |
| 46 | DC4 |
| 47 | DC2 |
| 48 | DC1 |
| 49 | DB0 |
| 50 | DB1 |
| 51 | DB2 |
| 52 | DB3 |
| 53 | DBP |
| 54 | QUOT OVFLO |
| 55 | QUOT SIGN OVFLO |
| 56 | QUOT INSRT Z VALID |
| 57 | QUOT INSRT Z QUOT |
| 58 | QUOT INSRT DIV TRUE |

(9.0) INSTRUCTION UNIT DATA FLOW

As is well known in the data processing art, every computer, or data processing system, utilizes instructions which include an operation portion that defines the actual data handling steps which the computer is to perform as well as an address portion which defines a location in storage of the data, or operands, upon which the operation is to be performed. Traditionally, a computer will have a section of the machine set aside for the purpose of handling the instruction, which section may have a variety of names such as control unit, instruction sequencing unit, or instruction unit. This portion of the machine is referred to herein as the I unit, the I unit selects instructions, handles branch and interrupt functions, communicates with the channels, and performs other related control functions.

The description of the I unit herein is divided into "data flow" and controls. "Data flow" refers to the main registers, adders, incrementers, and decoders among which the manifestations of instructions, or portions of instructions, are routed, so as to perform the registering, testing, incrementing, and decoding of their instruction manifestations so as to derive a useful result therefrom.

The description of the I unit data flow is covered in two different ways herein: first, a complete look at the data flow will be given in sections 9.1 et seq., followed by individual descriptions of main portions thereof. The block diagrams of the first section show the same matter as the block diagrams of the second section, but the purpose and approach of the drawings differ. In studying the circuitry in detail, the second section should be utilized; to get an idea of how instructions are handled in this system, the drawings of the first section should be utilized.

*(9.1) General introduction to I unit data flow*

Figure 72:
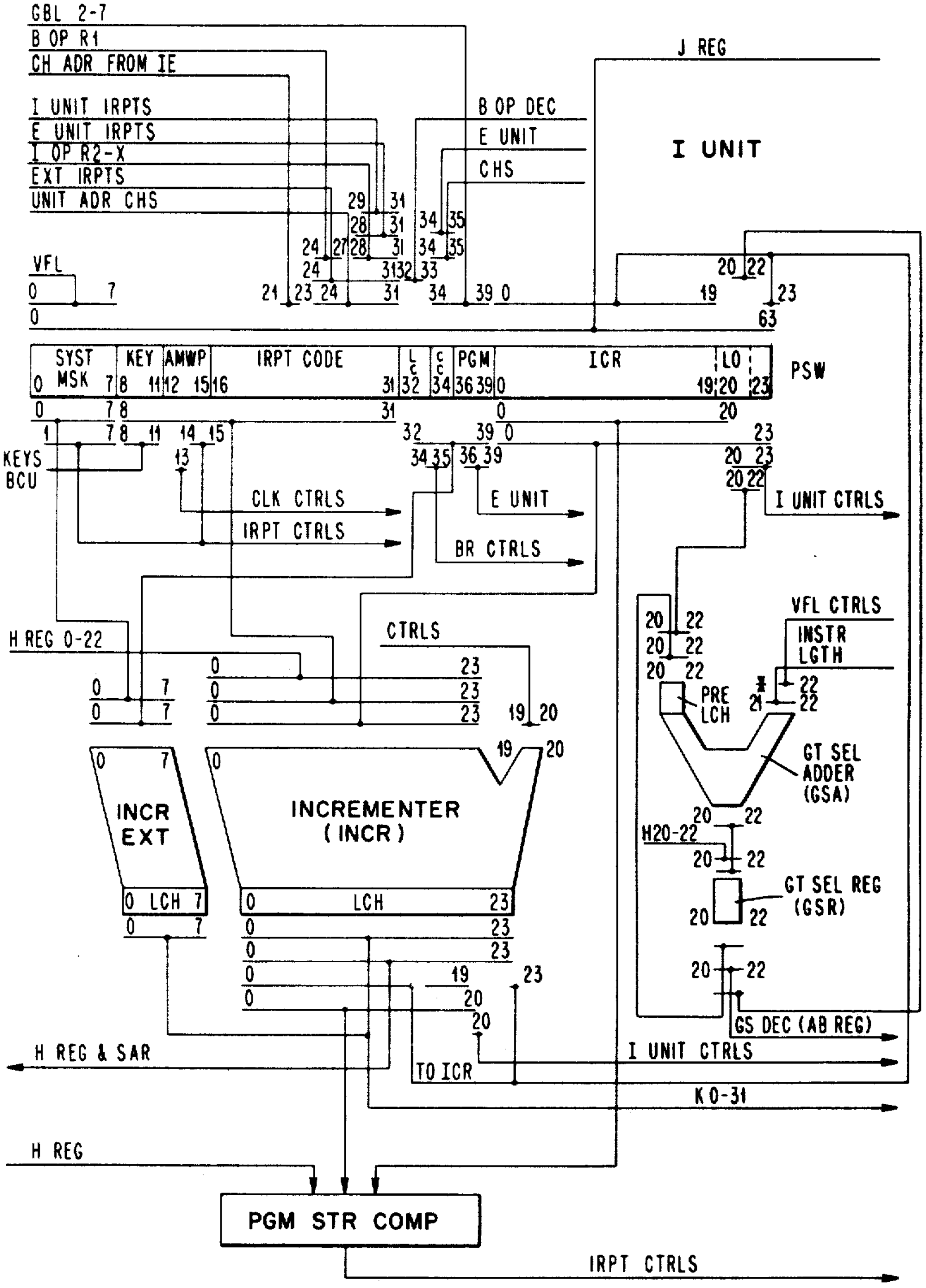
Figure 73:
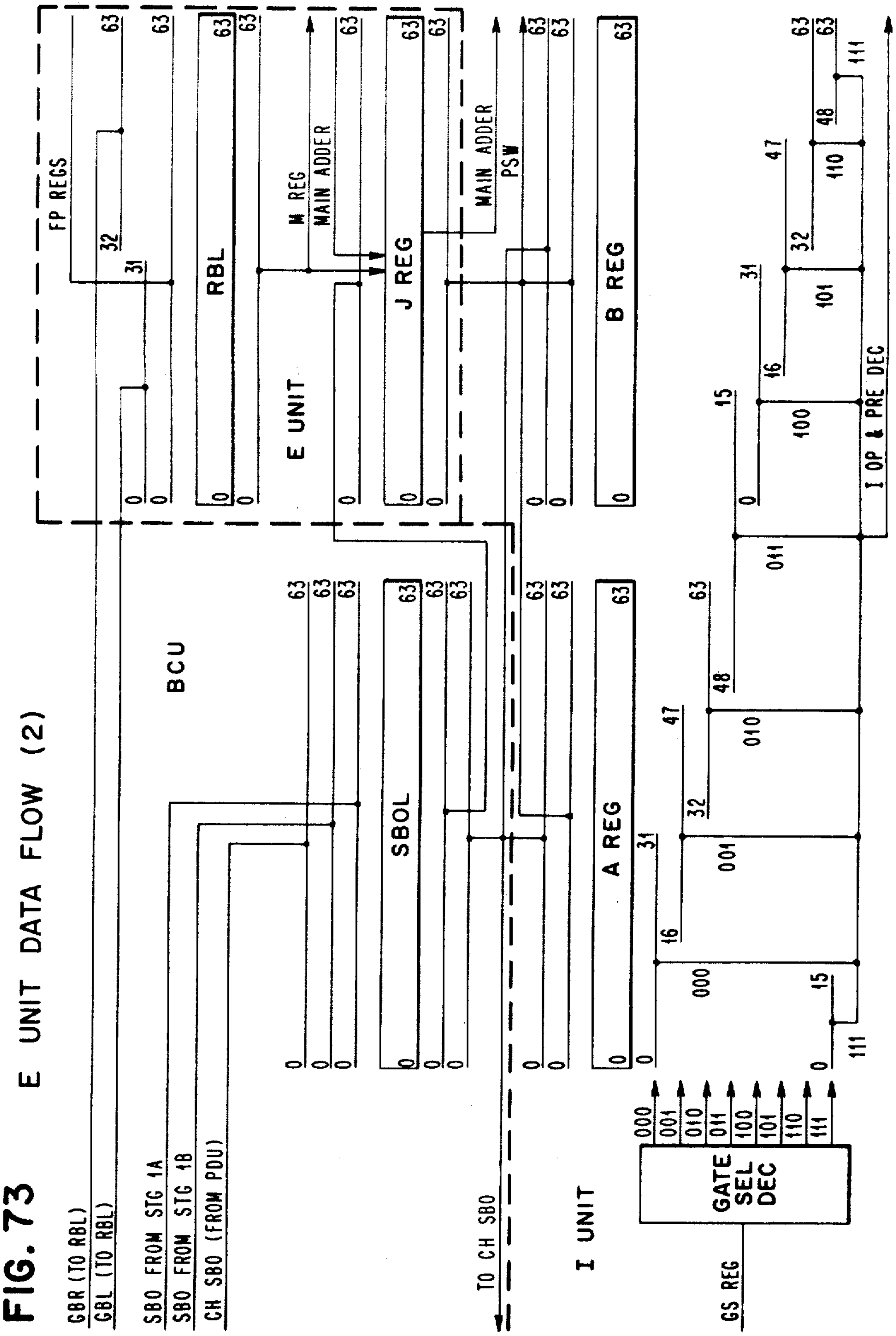
Figure 74:
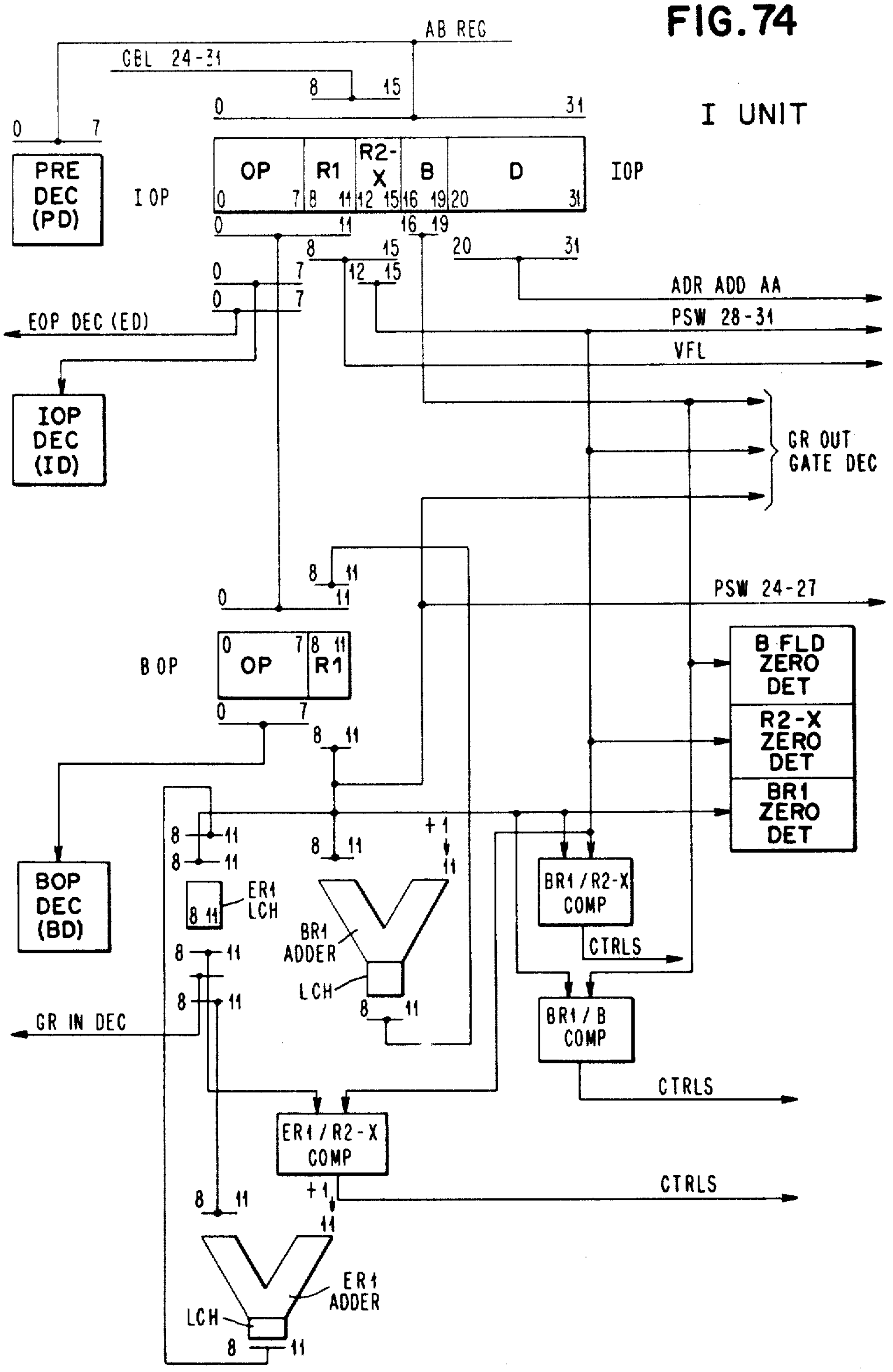
Figure 75:
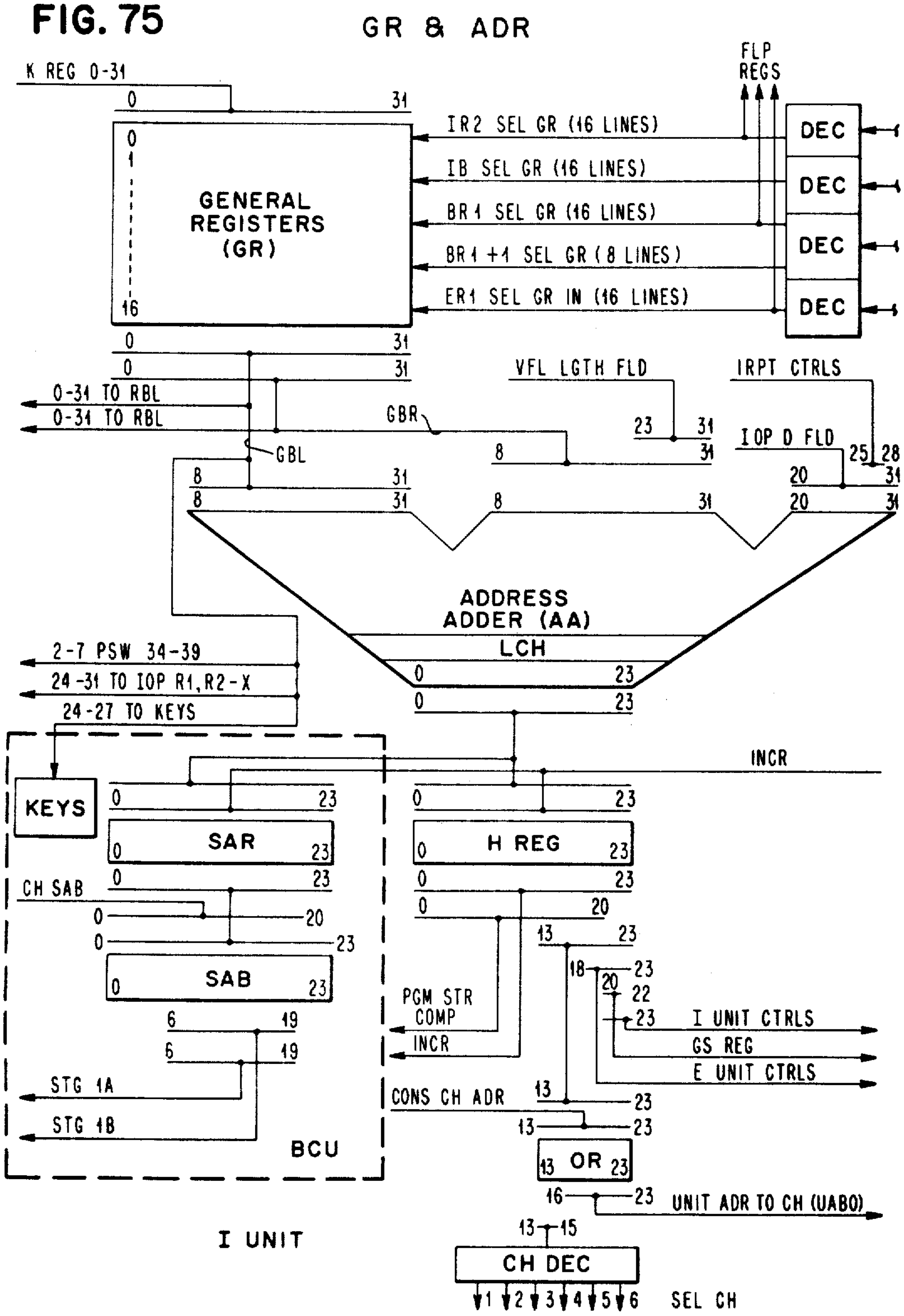

The I unit data flow is described in conjunction with portions of the E unit (which performs the arithmetic and logic operations upon operands, thereby executing the instructions), and the BCU (bus control unit, which controls the flow of data to and from storage units). The I unit data flow may be considered to comprise four portions:

Instruction selection shown in FIG. 72 and described in section 9.1.1;

Instruction input paths shown in FIG. 73 and described in section 9.1.2;

Instruction decoding shown in FIG. 74 and described in section 9.1.3;

AND instruction utilization shown in FIG. 75 and described in section 9.1.4.

(9.1.1) INSTRUCTION SELECTION (FIG. 72)

In the upper central section of FIG. 72 is shown the program status word register (PSW). This register is shown in detail in FIG. 131 through FIG. 139 of Application Ser. No. 609,238. The PSW contains the system mask, storage protection keys, status bits indicating that the machine is utilizing ASCII code (A), the machine check mask (M), a WAIT bit (W), a PROBLEM bit (P), the INTERRUPTION CODE (IRPT CODE), the instruction LENGTH CODE (LC), the CONDITION CODE (CC), the PROGRAM MASK (PGM), and the instruction counter register (ICR), including a low order portion thereof (LC). It is the ICR which determines the address of the next instruction in a sequence of instructions which comprise a program.

The ICR feeds an incrementer (INCR) which increments the instruction address each time that an instruction buffer register is to be loaded from storage; the ICR also feeds a gate select adder (GSA) which updates the instruction count each time an instruction is performed so as to generate a correct address for the next instruction in a sequence. The INCR is shown in detail in FIG. 140 through FIG. 154. The output of the INCR may be returned to the ICR and may also be applied to the SAR (storage address register) and the H REG (H register, a backup for the storage address register), as well as to a PGM STR COMP (program store compare circuit) and to the high order half (K0–31) of the K register. The INCR is sometimes used merely as a data path to pass 32 bits from one portion of the PSW register to the K register, and is sometimes used to check (for correct parity) the two halves of the PSW. In order to provide a 32 bit data path, the INCR is provided with an INCR EXT (incrementer extender) which provides the low order 8 bits (0–7) of the data path when the INCR is so utilized. The INCR may also receive inputs from the H REG.

The illustrative diagram of FIG. 72 also shows a gate select adder and gate select register (GSA, GSR) which control the selection of a particular group of instruction bytes from among 8-byte storage words as described in section 9.1.2. Since each instruction has at least two bytes, any addressing of storage is on a byte basis, the lowest ordered bit (23) of the ICR is not utilized in selecting instructions from the AB REG; thus, only bits 20–22 are involved in the gate select mechanism. The GS mechanism is shown in FIG. 156 through FIG. 162.

(9.1.2) INSTRUCTION INPUT PATHS (FIG. 73)

The output of the gate select register (GSR) in FIG. 72 is applied to a gate select decode circuit GS DEC (AB REG) so as to select the correct 32 bits at one time out of the AB register (A REG, B REG). The AB register is utilized as a buffer register for instructions which are fetched from storage so as to insure that there is always one instruction available for processing in addition to the instruction which is currently being processed in the I unit. Since the I unit generally processes each instruction concurrently with the execution of a previous instruction by the E unit, this means that the contents of the AB register may be as much as two instructions ahead of that which is being executed. Instructions are received from one of the storage units (STG 1A, STG 1E) over the storage bus out (SBO), or on the channel storage bus out (CH SBO) including data from the power distribution unit (PDU), which includes the maintenance channel). All data so received are stored in the storage bus out latch (SBOL), instructions being transferrable directly to the AB register, and all data, including instructions, being transferrable to the channel storage bus out or to the J register (J REG). Instructions may be temporarily placed in the J REG if they have not been fetched by a certain time in an instruction fetch cycle, and will thereafter be transferred to the AB register provided that a branch has not occurred. In all other cases, timely received instructions are transferred directly from SBOL to the AB register. The contents of the AB register is transferred to the IOP register and to the PRE DEC or TP (predecode) circuit by means of the gate select mechanism, 32 bits at a time. The choice of the 32 bit group to be selected from the AB register is made by the GATE SEL DEC (gate select decode) circuit which is controlled by the gate select circuitry of FIG. 72 so that the extraction of each instruction will result in extracting the next sequential instruction on a following operation. The AB register, and GS output gating therefor, are shown in FIG. 76 through FIG. 80.

(9.1.3) INSTRUCTION DECODING (FIG. 74)

The 32 bits from the AB register are applied to the IOP register as shown in FIG. 74. This register includes an operation portion (OP), an R1 field, an R2–X field, a B field, and a D field. At the time an instruction (or a portion of an instruction) is loaded into the IOP register, preliminary information about the instruction is also being derived from the PRE DEC. The contents of the IOP register are transferred to various circuits which perform different functions in the handling of an instruction. The OP portion is applied to the IOP DEC (ID), where the operation portion is decoded for I unit use. The same portion is transferred along with the R1 portion to the BOP register; in turn, the OP portion of the BOP register is applied to the BOP DEC (BD), for backup operation decoding. It is the IOP and BOP decoders which perform a major portion of the operand and branch decoding in the system. Each of the fields R1, R2–X, and B are used to specify general purpose registers, the contents of which are involved in the execution of the instruction. The R1 field, however, is utilized from the BOP register rather than from the IOP register controlling selection of the general registers. Each of these fields is also tested for zero in order to determine special situations where no general register is to be utilized in accordance with the architectural definition of a data processing system in said System/360 Manual. The B field of the IOP register is applied to the addressing adder (AA) as a component of a storage address for all instructions which reference storage, the addressing adder being shown in FIG. 79 which the R1 portion of the BOP register also applies to an ER1 register which provides R1 information later in a cycle. The ER1 register is so called because it provides R1 information to the E cycle rather than to the I cycle.

In FIG. 74 various comparison circuits are shown which compare ER1 with R2–X, BR1 with R2–X, and BR1 with B. The purposes of the various comparisons are described in conjunction with the circuits which utilize them. The instruction decoding circuits are shown in detail in FIG. 76 et seq.

(9.1.4) INSTRUCTION UTILIZATION (FIG. 75)

In FIG. 75, a plurality of general purpose registers (GR) receive information from the K REG under control of the ER1 SEL GR IN lines. The output of a general register selected by one of the lines: IR2 SEL GR, IB SEL GR, BR1 SEL GR, BR1+1 SEL GR lines will be applied to the general bus left or general bus right (GBL, GBR) for application to the register bus latch (RBL) shown in FIG. 73, and to the address adder (AA). The general registers, the GBL and GBR, and the controls therefor are shown in FIG. 114 et seq. of application Ser. No. 609,238. Other inputs to the address adder include a VFL LGTH FLD (VFL length field), the interrupt controls (IRPT CTRLS), and the IOP D field. The output of the address adder is applied to the SAR, and thence to the SAB (storage address bus) which applies address bits to storage. The address adder is also applied to the H register which serves as a sort of backup register for the SAR; addresses which are to be manipulated or compared are derived through the H register whereas utilization of address manifestations is through the SAR.

Also illustrated in FIG. 75 are the channel and unit selection circuits which respond to the H REG. Specifically, either the H REG or channel address signals from the console may be utilized to form a unit address on the UABO as well as channel selecting signals.

It should be borne in mind that FIG. 72 through FIG. 75 are intended as illustrative figures for reference, rather than being descriptive of the hardware as such. All of the hardware illustrated in FIG. 72 through FIG. 75 is illustrated, both in block diagram form, and in detail, in figures relating thereto, described hereinafter.

(9.B) INCREMENTER (FIG. 40)

As illustrated in the center of FIG. 72, an incrementer is provided for incrementing the instruction count as normal processing proceeds. This incrementer is also utilized as a data path between the H register, the PSW register, the instruction counter register, and other related circuits as illustrated in FIG. 72. The incrementer actually serves as an incrementer in two different ways; the first way is that the incrementer is used as the high order portion of an instruction counter, of which the low order portion is a gate select adder; the second way is that the incrementer is utilized to generate an "on the fly" address for storage to fetch a storage word which is necessary to replenish either the A or the B register, notwithstanding whether one or both of them are empty, and without regard to the particular instruction count which the gate select register is utilizing to gate an actual instruction out of the AB register. As each instruction is gated into the IOP and related operational circuits, and is analyzed during T1 and T2, the next following instruction will of course be found in the AB register at a position therein which is displaced from the position of the current instruction by an amount which is equal to the length of the current instruction. At the I to E transfer of a current instruction, the gate select adder responds to the then current setting of the ICR LO (the low order portion of the instruction counter register, which comprises bits 20, 21, and 22 thereof) and adds the length of the current instruction to the current setting of the ICR LO. The incrementer itself may or may not be involved in the operation, in dependence upon whether bit 20 of the ICR is advanced from a 1 to a 0, causing a GSA carry; the GSA carry must be reflected in bit 19 of the ICR, and therefore must cause bit 19 of the ICR to be incremented within the incrementer. However, this does not take place until one cycle following the I to E transfer within which the GSA carry is generated. The reflecting of the GSA carry into bit 19 of the ICR is called an IC HO ADV (IC high order advance). When the INCR is so used, bits 0–19, and bit 23 are returned to the ICR. However, when the INCR is used to generate "on the fly" addresses for referencing storage word within which instructions to be used in the future are contained, the output of the INCR is applied to the H REG and to SAR, but it is not applied to the ICR. In this case, the setting of the ICR is used as a base, and the conditions which obtain, including whether A or B is empty or may be considered to be empty, and the setting of the ICR are combined to generate an input to the incrementer which will cause the incrementer to generate an address which is a full 23 bits long, which will specify a storage word containing instructions, the storage word being required either to reach the next instruction, in the case of both the A and B registers being exhausted, or merely to replenish the A or the B register. In this case, all 23 bits of the ICR are read into the INCR, and either bit 19 or bit 20, but not both, may be added to the setting of the ICR in order to generate the proper address. This is described in detail in relation to the charts shown in section 5.3.4.5. In the case of an IC HC ADV which is a carry from the gate select adder into the incrementer, the only possible control input into the incrementer is bit 19.

Figure 144:
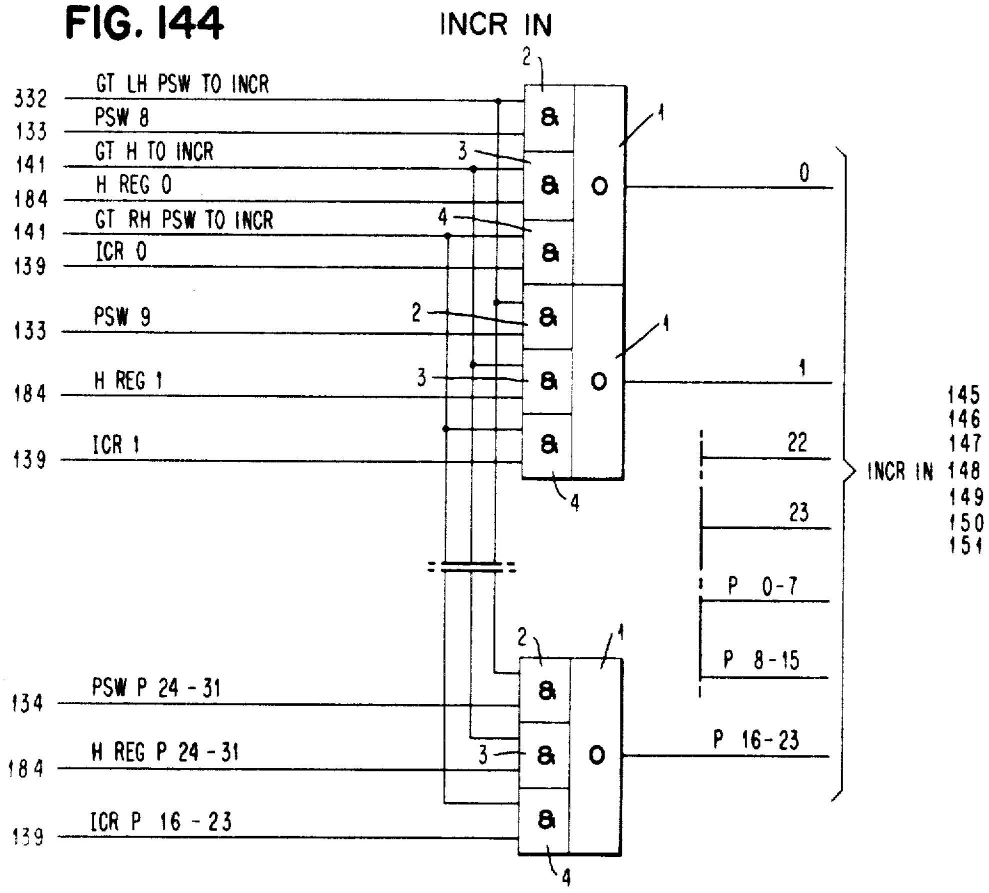
Figure 145:
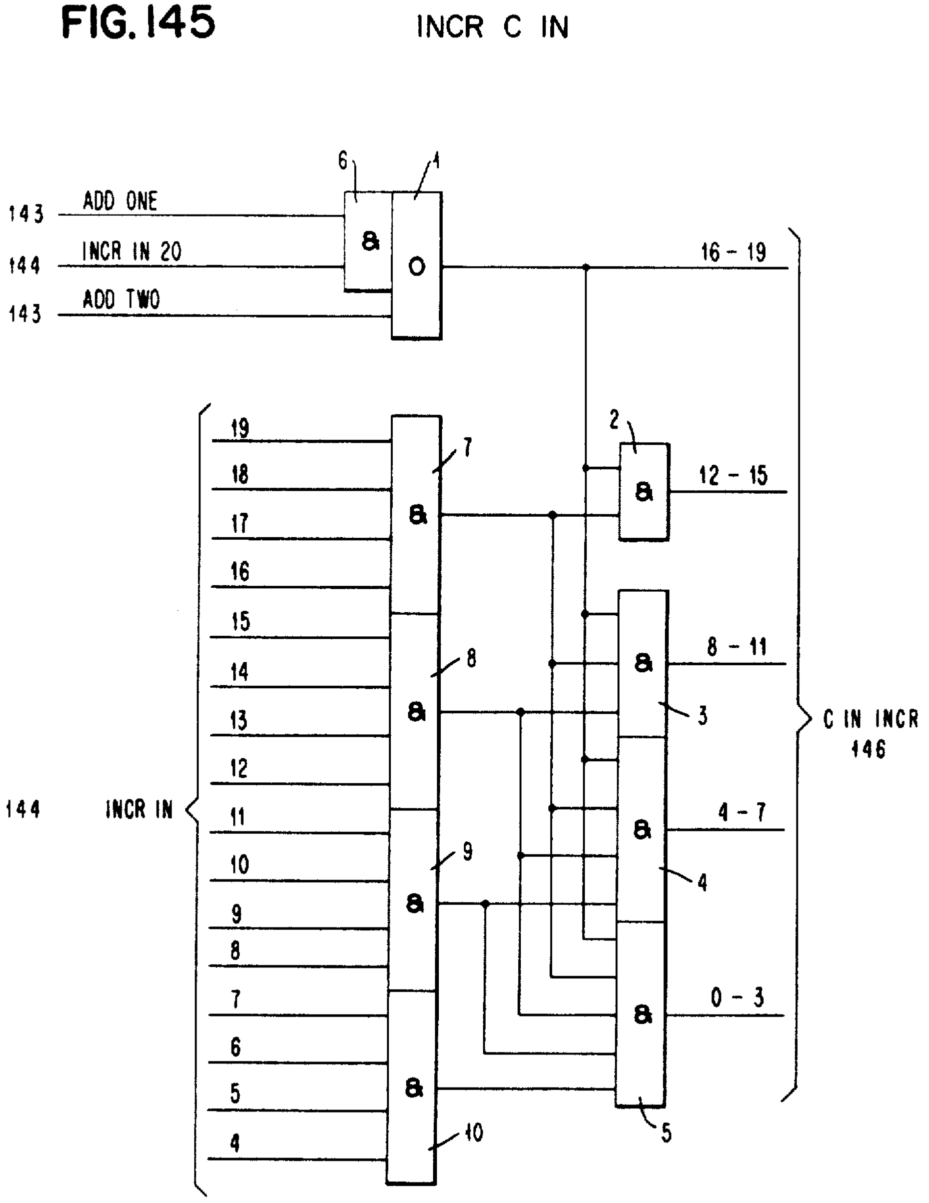
Figure 146:
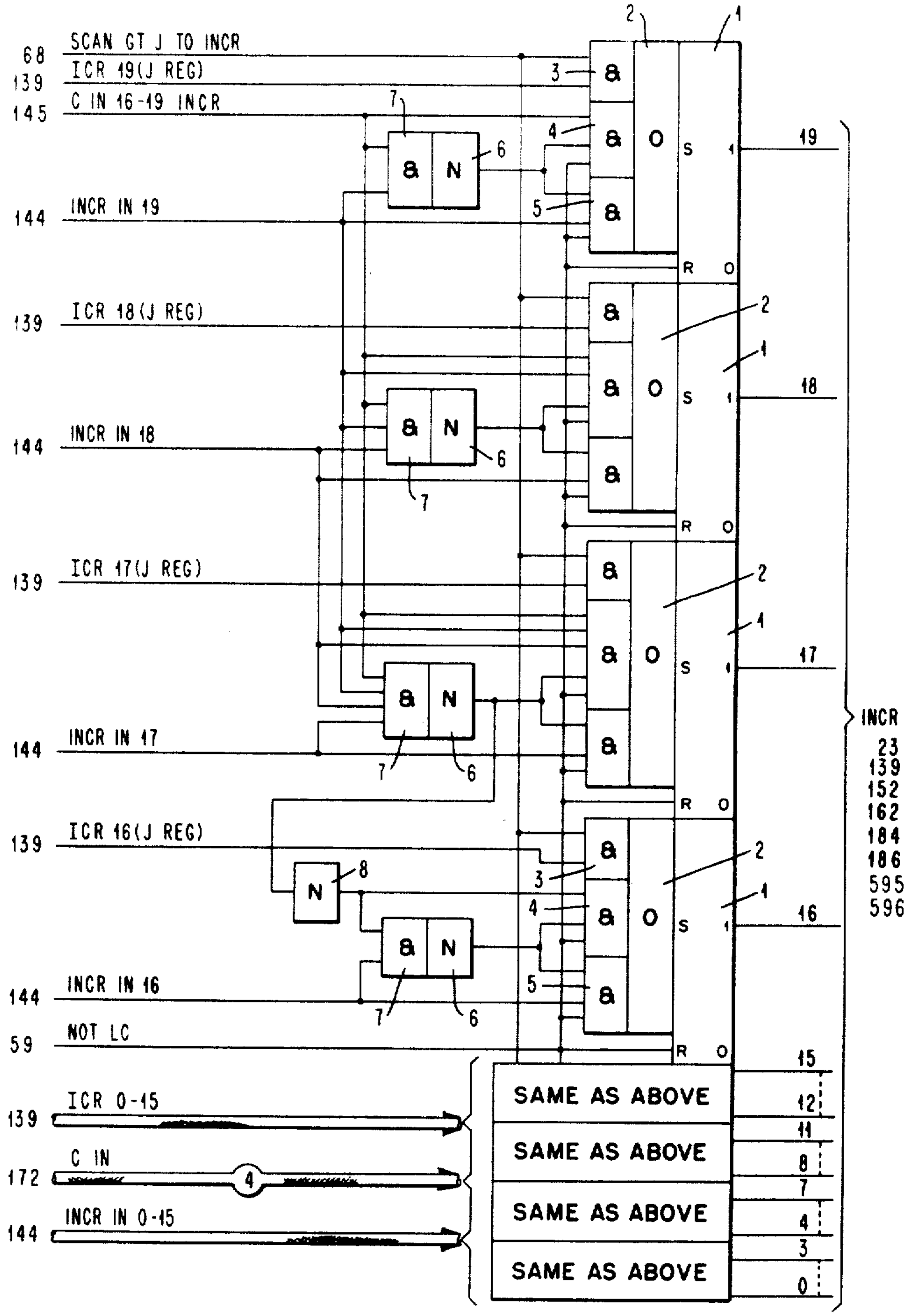
Figure 147:
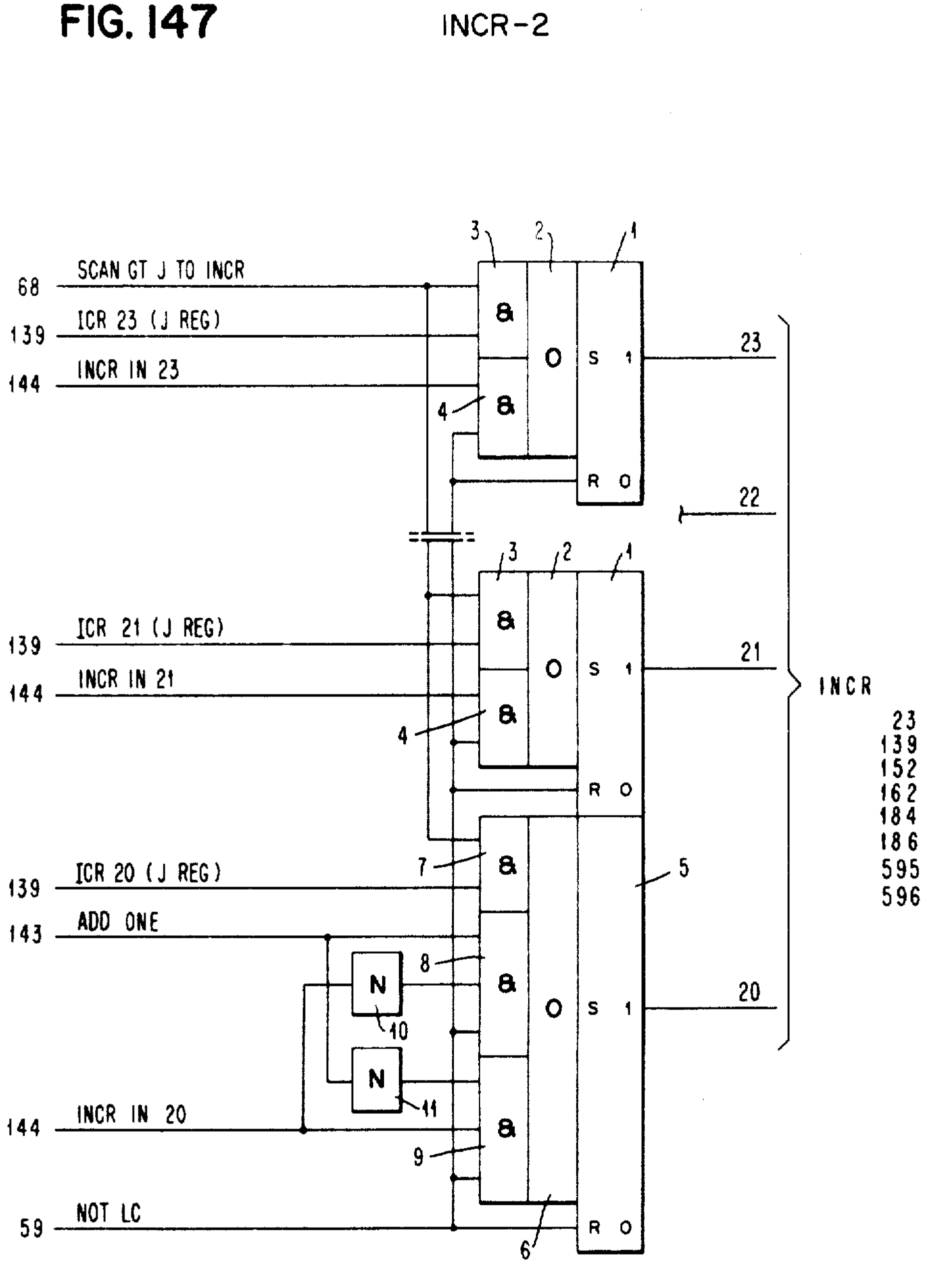
Figure 150:
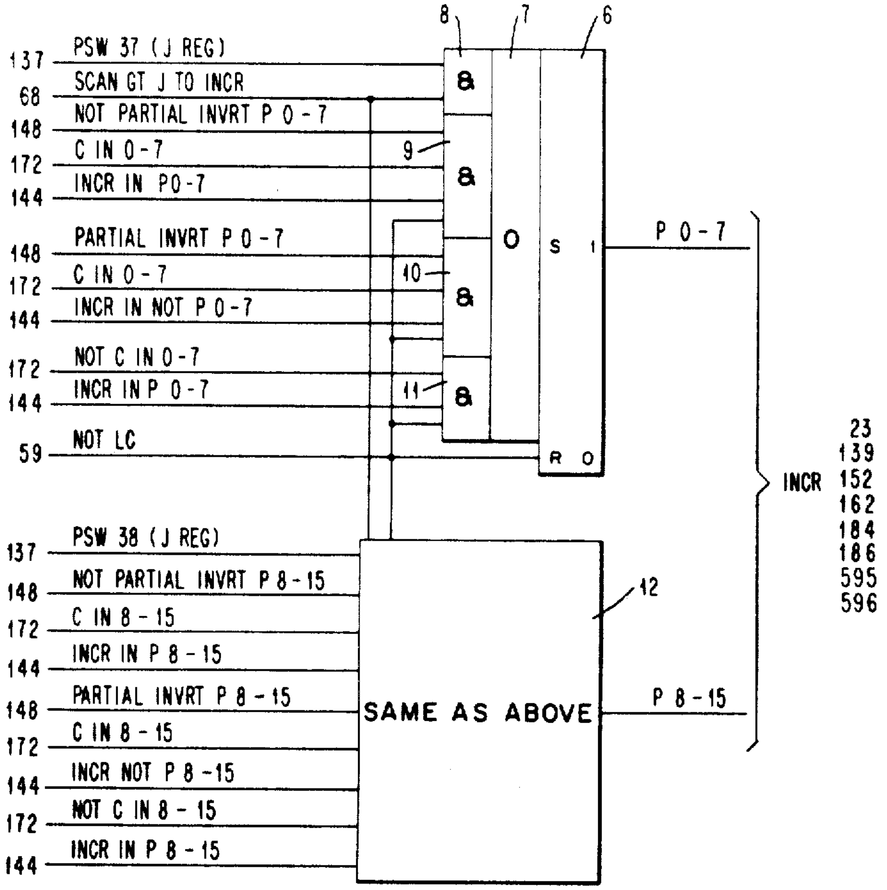
Figure 151:
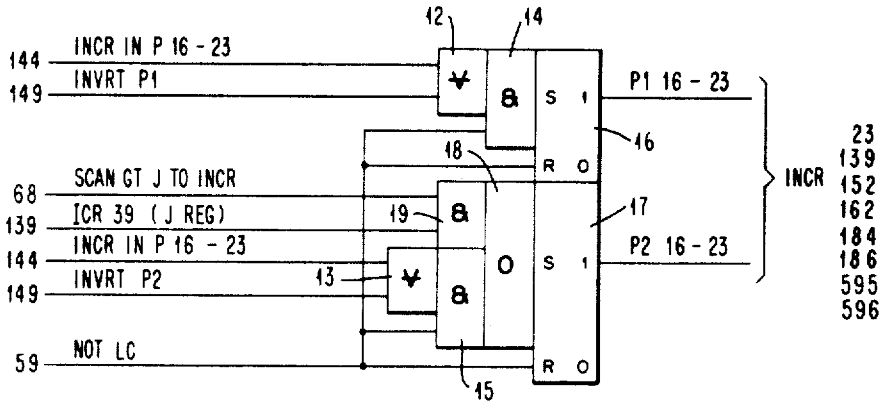

The incrementer itself is illustrated in FIG. 72. The incrementer itself is shown in block diagram form in FIG. 140, wherein input selection is provided by an incrementer input circuit (INCR IN), FIG. 144, under the control of an incrementer input gating control circuit (INCR IN GATING CTRLS), FIG. 141. The INCR in FIG. 144 is responsive to bits 8–31 of the low order half of the PSW#, bits 0–23 of the ICR (which comprise bits 40–63 of the PSW register), or to bits 0–23 of the H register (which bits comprise an indication of a working address), since the H register is in effect a backup register for the SAR (storage address register). The INCR in FIG. 144 provides signals to a circuit which generates input carries for groups within the incrementer (C IN GROUP), FIG. 145. This circuit in turn feeds the actual incrementing circuits, FIG. 146 and FIG. 147, together with the parity predicting circuits, FIG. 150 and FIG. 151. These latter circuits and the C IN GROUP circuit of FIG. 145 are controlled by the ADD ONE/TWO circuit, FIG. 143. The incrementing circuits are also responsive to the INCR IN circuit, FIG. 144, as is the parity invert function generating circuit INVRT P1/P2, FIG. 148 and FIG. 149. The output of the parity stages of the incrementing circuit, FIG. 150 and FIG. 151, are applied to an incrementer parity check circuit INCR P CHK, FIG. 152, which, together with a parity output of the incrementer extender, FIG. 142, control an incrementer check circuit INCR CHK, FIG. 153. The numerical output of the incrementing circuits, FIG. 146 and FIG. 147, is distributed under control of an incrementer output gating control circuit INCR OUT GATING CTRLS, FIG. 154.

Figure 140:
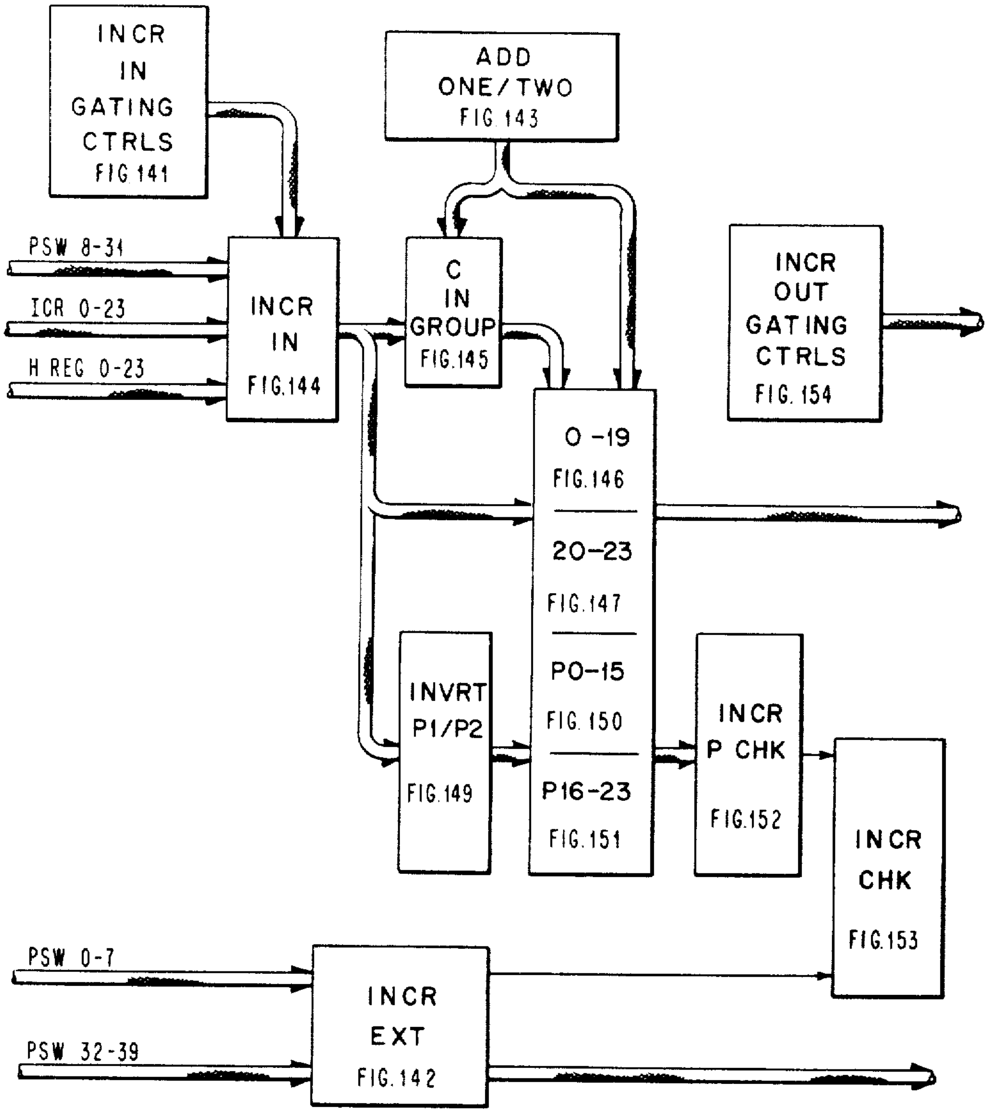

At the bottom of FIG. 140 is shown the incrementer extender INCR EXT, FIG. 142, which provides an additional 8-bit data path for use with the incrementer when the incrementer is being used only as a data path. The incrementer extender can respond to either bits 0–7 of the PSW (which would accompany bit 8–31 of the PSW as they are applied to the INCR IN circuit of FIG. 144, or the INCR EXT FIG. 142 may respond to PSW bits 32–39 which it will do when the INCR IN, FIG. 144, is responding to the ICR bits 0–23.

(9.B.1) controls

(9.B.1.1) INCREMENTER IN GATING CONTROLS (FIG. 141)

In FIG. 141, an OR circuit 1 will generate a signal on a GT RH PSW to INCR line under I unit control in response to a signal on any one of the following lines: IC HO ADV, STR REQ, IC GT RH PSW TO INCR, IRPT GT RH PSW TO INCR, or IE GT RH PSW TO INCR. As described in the PSW section, the right hand of the PSW actually refers to the ICR (instruction counter register) portion of the PSW, which is hereinafter referred to as ICR, for the most part.

Another OR circuit 2 in FIG. 141 generates a signal on a GT H TO INCR line to cause the contents of the H register to be gated into the incrementer. The OR circuit 2 responds to a signal from the E unit on an E GT H TO INCR line and to a signal from the IE unit on an IE GT H TO INCR line. The OR circuit 2 is also responsive to a pair of AND circuits 3, 4, the AND circuit 3 in turn requiring a signal from an OR circuit 5. The OR circuit 5 is operative during branch ops due to a signal on a BR OP line, or during a multiple load operation due to a signal on a BD MULT LD line. The AND circuit 3 also requires a signal on the T2 line which indicates the T2 portion of instruction sequencing. The AND circuit 4 responds to the last cycle of a successful branch due to signals on a BR LC line and a BR SUCC M line.

(9.B.1.2) INCREMENTER INPUT (FIG. 144)

The circuit of FIG. 144 comprises a three way input gate, there being provided an OR circuit 1 for each bit (including parity bit) of the incrementer, each OR circuit being responsive to a respective trio of AND circuits 2–4. The AND circuits 2 permit gating of the left-hand half of the PSW, the AND circuits 3 permit gating of H register bits, and the AND circuits 4 permit gating of the right-hand half of the PSW, all in an obvious manner. Each of the OR circuits 1 provides a signal on a corresponding one of a plurality of INCR IN lines 0–23, PO–7–P16–23.

(9.B.1.3) ADD ONE/TWO CIRCUITS (FIG. 143)

Figure 143:
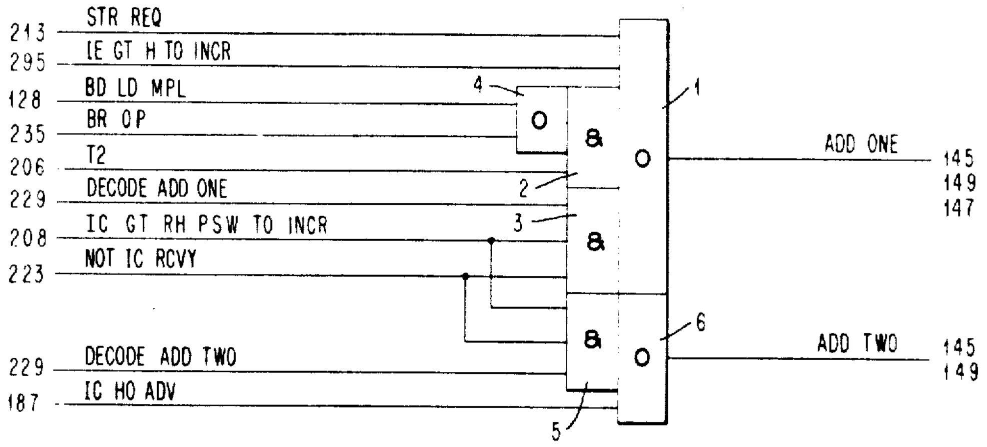

In FIG. 143, an OR circuit 1 generates a signal on a ADD ONE line in response to a storage request as indicated by a signal on a STR REQ line or in response to IE unit controls as indicated by a signal on a IE GT H TO INCR line. The OR circuit 1 is also responsive to a pair of AND circuits 2, 3, the AND circuit 2 being operative at T2 time in response to an OR circuit 4 which can be operated either by a signal on the BR OP line, or by a signal on the BD LD MULT lines. The AND circuit 3 is responsive to the concurrence of a signal on the DECODE ADD ONE line, on the IC GT RH PSW TO INCR line, and on the NOT IC RCVY line. These latter two lines also operate an AND circuit 5 which, together with an input on a DECODE ADD TWO line will cause an OR circuit 6 to generate a signal on an ADD TWO line. The OR circuit 6 is also operative in response to a signal on the IC HO ADV line. Thus, the OR circuits 1 and 6 provide control to cause the incrementer to add either one or two to the setting by providing control inputs to bits 20, and 19 thereof, respectively.

(9.B.1.4) INCREMENTER CARRIES INTO GROUPS (FIG. 145)

In FIG. 145, a plurality of C IN lines are provided, one for each 4 bit group in the incrementer, each energized by a corresponding circuit 1–5. The OR circuit 1 will generate a carry into group 16–19 whenever there is a signal on the ADD TWO line, or when there is an output from an AND circuit 6 which will be when there is a signal on the ADD ONE line concurrently with a signal on the INCR IN 20 line. An ADD TWO signal is in fact a signal into bit 19, and it is utilized in the incrementer as a carry into the group 16–19. Similarly, an ADD ONE is an input into bit 20 of the incrementer and so if there is a bit 20 and a 1 is added to it, this will cause a carry into bit 19 which is therefore a carry into the group which comprises bits 16 through 19. Inasmuch as the only inputs into the incrementer are the incrementer input bits themselves, and the ADD ONE and ADD TWO signals, it therefore follows that any carries within the incrementer must be generated as a result of the ADD ONE and ADD TWO signals. Therefore, the AND circuits 2–5 can each operate only if a carry is propagated to the corresponding group from the OR circuit 1. Thus, the AND circuit 2 will provide a carry into group 12–15 if there is a signal on the C IN 16–19 together with the output of an AND circuit 7 which responds to each of the bits in the group 16–19. Therefore, a carry into bit 19 will be propagated through bit 19, 18, 17 and 16 so as to provide an input to the AND circuit 2 in order to generate a carry into group 12–15. The remaining AND circuits 8–10 operate in a similar fashion, in combinations with AND circuits 3–5, so that carries may propagate all the way to the group which comprises bits 0–3 provided that the incrementer input is all one from bit 4 to bit 19, and there is a carry into bit 19 (C IN 16–19).

(9.B.2) *Incremening circuit* (*FIG. 146 and FIG. 147*)

The incrementing circuits of FIG. 146 and FIG. 147 differ due to the nature of the ADD ONE and ADD TWO inputs to the incrementer. Thus, it can be seen that the control input to FIG. 146 is a carry in to bits 16–19 on the C IN 16–19 line, whereas the control input to FIG. 147 is an ADD ONE input on the ADD ONE line. In both FIG. 146 and FIG. 147, the J register may be gated into the incrementer latch circuits from the ICR; in other words, when the incrementer is used as a data path for the J register, the signals do not pass through the incrementer input circuits of FIG. 144; this means that the incrementer is a faster data path for the J register than it is for the H register or the PSW, which makes up for the fact that the J-INCR path includes the ICR as part of the data path, and the fact that the J register is more remote (in the E unit).

In FIG. 146, a plurality of latches 1 may each be set by a related OR circuit 2 in response to any one of 3 corresponding AND circuits 3–5. The AND circuits 3 are all operative in response to a signal on the SCAN GT J TO INCR line concurrently with a signal on a related one of a plurality of ICR lines 0–19. These lines, though fed by the ICR, are in fact supplying J register data bits to the INCR on a scan operation.

Each of the AND circuits 4,5 are in turn responsive to a related inverter 6 which is fed by a corresponding AND circuit 7. The AND circuits 4, 5, 7 and the inverter 6 all operate more or less as an EXCLUSIVE OR circuit, where the corresponding input bit is EXCLUSIVE OR'd with a carry into that bit. Thus, for bit 19, the INCR IN 19 line is EXCLUSIVE OR'd with the CIN 16–19 INCR line; thus, if there is either a carry into bit 19 (which is the same as a carry into the group 16–19) or an incrementer input bit 19, then there will be an incrementer bit 19 unless both of them are present, in which case there will be no bit 19. This is due to the fact that the AND circuit 7, when it senses the presence of both inputs, will cause the inverter 6 to block the AND circuits 4 and 5.

The expression gets more complicated with higher order bits, due to the fact that a control input into successively higher order bits is based on the carry into the group 16–19 having to be propagated through more of the bits of the incrementer to reach the subject bit. For instance, with respect to bit 18, there must be a carry into the group 16–19 and an incrementer input bit 19 in order to propagate the carry to bit 18. Therefore, bit 18 is EXCLUSIVE OR'd with a combination of bit 19 and a carry into bit 19. In a similar fashion, the AND circuit 7 which corresponds to bit 17 requires that there be a carry into bits 16–19, an incrementer input bit 19, an incrementer input bit 18, and bit 17, in order to block the AND circuits 4, 5 corresponding thereto. With respect to bit 16, the carry into the bit is detected by an inverter 8 which is responsive to the inverter 6 related to bit 17; however, all of the various bits could be collected (as for bit 17) with respect to bit 16 if faster circuits are desired. The relationship including the inverter 8 which is shown with respect to bit 16 is illustrative merely.

At the bottom of FIG. 146 is illustrated arrangements for the remaining bits of the incrementer, where each 4 bit group is identical to the 4 bit group shown in the upper portion of FIG. 146, except for the actual bits, and carries into groups, which are applied thereto. Thus, the circuit of FIG. 146 provides incrementer outputs for the bits 0–19.

In FIG. 147, bits 20–23 are handled somewhat differently. In FIG. 147, a plurality of latches 1 may be set by an OR circuit 2 in response to either one of two AND circuits 3, 4. Each of the latches 1 generates a signal on a corresponding one of three INCR lines 21–23. In addition, a latch 5 is settable by an OR circuit 6 in response to any one of three AND circuits 7–9. The AND circuit 7 is identical to the AND circuit 3 and the AND circuits 8, 9 correspond to the AND circuits 4. In operation, the AND circuits 3, 7 are each operative whenever there is a signal present on a SCAN GT J TO INCR line concurrently with a signal present on a corresponding one of a plurality of ICR lines 20–23 (each of which is actually transmitting data from the J register for scan purposes). This function of the AND circuits 3 in FIG. 147 is identical to the function of the AND circuits 3 in FIG. 146. Each of the AND circuits 4, 8, 9 is operative only during NOT LC time as indicated by a signal on a NOT LC line. The AND circuits 4 will set the corresponding latch 1 provided there is a signal on a corresponding one of the INCR IN lines 21–23 whereas the AND circuits 8, 9 form an EXCLUSIVE OR function with the OR circuit 6 in combination with a pair of inverters 10, 11. Thus, if there is either an ADD ONE input to the AND circuit 8 and the inverter 11, or an INCR IN 20 input to the AND circuit 9 and the inverter 10, then there will be an output from the AND circuit 8, or the AND circuit 9, respectively, so as to cause the OR circuit 6 to set the latch 5. However, if both the ADD ONE and the INCR IN 20 inputs are present to the inverters 10, 11 then both of the AND circuits 8, 9 will be blocked by said inverters. Thus, there will be an INCR bit 20 out of the latch 5 only when there is an ADD ONE, or an INCR IN 20, but not both applied to the AND circuits 8, 9. The function of the AND circuits 8, 9 in FIG. 147 is identical to the function of the AND circuits 4, 5 in FIG. 146.

Thus, the incrementer can respond directly to bits of the J register during scanning operations, or can act as an adder by responding to incrementer input bits together with the ADD ONE and ADD TWO bits. However, should there be an ADD ONE, an ADD TWO, and an INCR IN bit 20 all at the same time, then the incrementer will not operate to give the proper sum, as indicated in the Instruction Fetching section.

The reason why the incrementer *should not* operate properly is that this condition should never occur, and if it does occur, a faulty sum is desired so that the parity checking circuit will be able to indicate that a malfunction has occurred. The reason that this condition should never occur is because of the fact that the gate select adder causes an IC HO ADV only when bit 20 of the ICR LO is advanced from 1 to 0, and the IC HO ADV takes place on the following cycle so that whenever a high order advance takes place, bit 20 is always 0. Although an IC high order advance can be done simultaneously with an "on the fly" generation of a storage address, the only time when this could cause a conflict is in the case of SS instructions, and IC fetching is blocked during SS instructions.

The reason for the incrementer *actually* providing a faulty sum in the event of an ADD ONE, an ADD TWO, and an incrementer input into bit 20 concurrently, is that the OR circuit 1 in FIG. 145 recognizes a carry into the group 16–19 either from ADD TWO or from ADD ONE together with an input to bit 20. However, if there is an output from the AND circuit 6 concurrently with an ADD TWO signal, this alone should cause the reversal of the carry into bits 16–19, and create instead a carry into bits 12–15 even without propagation by an AND circuit such as the AND circuit 7. It is thus the simplicity of the circuit of FIG. 145 (rather than any complex control hardware) which permits checking of the operation of the instruction updating apparatus.

(9.B.2.1) INCREMENTER BITS 0–15 PARITY (FIG. 148 AND FIG. 150)

The parity of the incrementer output for bits 0–7 and for bits 8–15 will depend upon whether a carry into one of these parity groups has occurred, and whether an odd or even number of changes in the output bits results from the carry into the group in comparison with the configuration of bits at the input to the incrementer. The circuit of FIG. 148 recognizes where there is a parity change, by generating a partial invert parity signal for each of the parity groups 0–7 and 8–15. Specifically, an OR circuit 1 responds to either one of three AND circuits 2–4 or to a signal on an INCR IN NOT 7 line. The AND circuit 2 responds to a 6 but no 5; the AND circuit 3 responds to 4 and 6 but no 3; and the AND circuit 4 responds to 2, 4 and 6 but no 1 input to the incrementer. In other words, each of the inputs to the OR circuit 1 represents the fact that a 0 bit has occurred an even number of bits from the input (noting that the bit 7 input is located an even number of bits, ZERO, from the input into the group). Thus, if bit 7 is a 0, then a carry into the group which is a carry into bit 7, will cause bit 7 to change from 0 to 1; this change will not cause any further rippling of carries, so that the parity will be changed from an odd to an even number, or from an even to an odd number. Similarly, the AND circuit 2 recognizes the case where if bit 7 is not a 0, and bit 6 is a 1, then if bit 5 is 0, carries will propagate to bit 5 and no further, which means that a configuration of 011 (for bits 5, 6 and 7 respectively) will be changed to 100, thus resulting in a need to change the parity bit. The other AND circuits 3, 4 operate in the same fashion; note that whenever one of the odd bits is a 0, the highest number (lowest ordered) odd bit will exercise control over the OR circuit 1.

Figure 148:
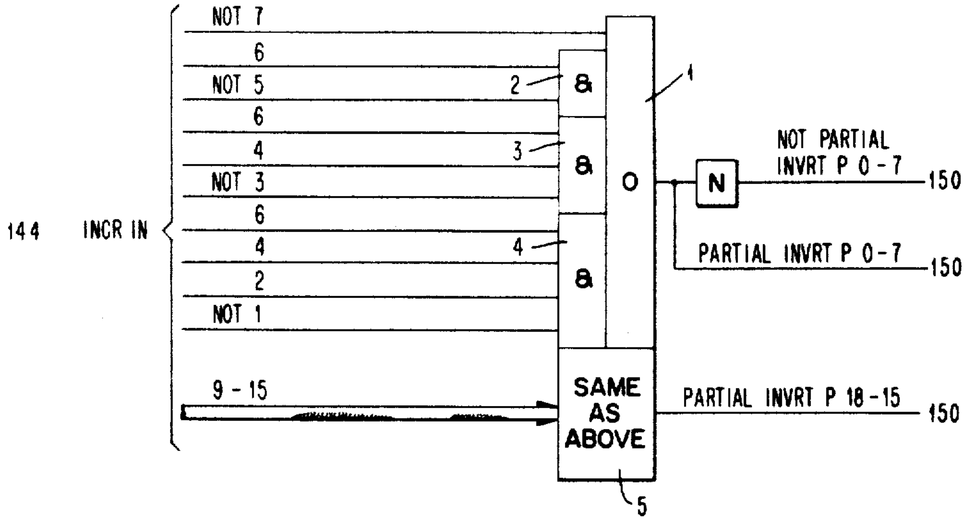

A set of circuits 5, similar to that shown at the top of FIG. 148, is provided for bits 9–15, although not shown in detail herein.

In FIG. 150, the effect of the invert parity signals of FIG. 148 is to reverse the related parity bit from whatever it is at the input so as to provide a correct parity bit at the output. Parity is set in a latch 6 for the parity group including bits 0–7 whenever the latch is set by an OR circuit 7 in response to any one of 4 AND circuits 8–11. The AND circuit 8 in FIG. 150 is similar in function to the AND circuit 3 in FIG. 146 and FIG. 147 in providing an input to the incrementer latches from the J register (via the PSW register) for scan purposes. Note that the AND circuit 8 responds to PSW bit 37, which is therefore J register bit 37, rather than to a parity for bits 0–7 of the J register. The purpose of this is to provide for scanning a particular parity bit into the incrementer parity circuit of FIG. 150 while maintaining the parity bits of the J register for the purpose of checking the actual scan-in word which is contained therein. In other words, PSW37 is used as a data path for J register bit 37 which is used in scanning operations as a parity bit for groups 0 to 7 of the incrementer. This is described more fully in the section on scan operations.

The AND circuit 9 recognizes the case where there is a signal on the NOT PARTIAL INVRT P0–7 line concurrently with a parity bit as indicated by a signal on the INCR IN P0–7 line when there is a carry into bits 0–7 of the incrementer as indicated by a signal on the C IN 0–7 line. The AND circuit 10 recognizes the case where, although there is a carry into bits 0–7 and a partial invert parity function for bits 0–7 (as indicated by signals on the C IN 0–7 and PARTIAL INVRT P0–7 lines), there nontheless is no parity input to the bit as indicated by a signal on the INCR IN NOT P0–7 line. Thus, a parity bit should result because of being changed from no parity bit.

The AND circuit 11 is operative when there is a parity bit at the input to the incrementer, and since there is no carry into bits 0–7, there can be no change in the parity bit as a result of the incrementing operation; thus, the AND circuit 11 operates in response to signals on the NOT C IN 0–7 and INCR IN P0–7 lines. A circuit 12 is provided which is fully equivalent to the circuits 6–11 except for the fact that the circuit 12 responds to signals which relate to the parity of bits 8–15 of the incrementer.

(9.B.2.2) INCREMENTER BITS 16–23 PARITY (FIG. 149 AND FIG. 151)

With respect to bits 16–23 of the incrementer, 2 parity bits are provided, one of which (P1) is used only during IC HO ADV (instruction counter highe order advances), and the other of which (P2) is used as a normal parity bit for incrementer bits 16–23. The P1 bit is not used for parity checking of the incrementer output, but is merely used as a parity bit to be returned to the ICR with bits 16–20 and 23 after an IC HO ADV; the INCR parity checking circuits (described in the next section) respond to the P2 bit.

Figure 149:
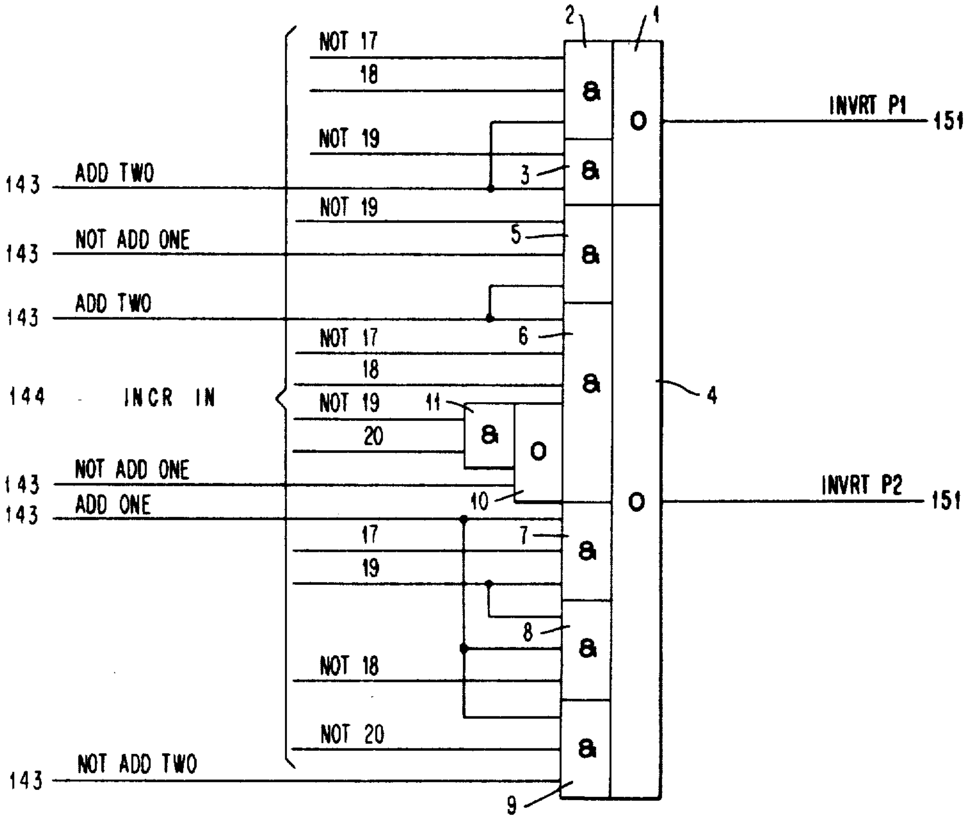

In FIG. 149, a function which indicates that P1 should be inverted is generated by an OR circuit 1 in response to either one of two AND circuits 2, 3. Both of these AND circuits are operative only when there is an ADD TWO signal at the input thereto. The AND circuit 3 responds to a NOT 19 bit, whereas the AND circuit 2 responds to a NOT 17 together with an 18 bit. The reasoning behind this is the same as with respect to the circuit of FIG. 148, to wit, to determine whether the ADD TWO signal is going to affect only bit 19, or if it will affect bit 19, 18 and bit 17. If it affects all 3 of the bits 17–19 and bit 16 as well, then the effect is to leave the parity the same as it was without considering the effect of the ADD TWO. Another OR circuit 4 is provided to generate a similar function indicating that parity bit P2 is to be inverted. The principle behind the circuitry associated with the OR circuit 4 is the same as that of the circuit 3 associated with the OR circuit 1, although it is more complex. Additionally, the OR circuit 4 and its associated circuitry is established in such a fashion that correct parity signals should result from an ADD ONE and an ADD TWO concurrently only when there is no bit 20 at the incrementer input. The OR circuit 4 responds to any one of 5 AND circuits 5–9, each of which recognizes a different condition with respect to the parity as a result of ADD one and ADD TWO inputs for various combinations of incrementer input bits. The AND circuit 5 recognizes the case where the ADD TWO is applied to bit 19, and bit 19 is a 0, and there is no other effect on bit 19 due to the fact that there is no ADD ONE as indicated by a signal on the NOT ADD ONE line. The AND circuit 6 can respond in a similar situation due to the fact that an OR circuit 10 is operative in response to a signal on the NOT ADD ONE line, so that if bit 19 is present, and bit 18 is also present, but bit 17 is a 0, then the AND circuit 6 can supply a signal to the OR circuit 4. On the other hand, with bit 18 a 1 and bit 17 a 0, even if there is an ADD ONE, if there is no bit 19 but there is a bit 20, then parity must be inverted to a carry into bit 19 as a result of a carry from bit 20 into bit 19; however, when there is also an ADD TWO, this will result in an error situation (as it should) due to the fact that the ADD TWO, when combined with a carry into bit 19 will cause bit 19 to again look is it did in the first instance, and therefore nullifies the parity effect. Thus, the AND circuit 11 will tend to sense the case where there is a malfunction that has permitted an ADD ONE, an ADD TWO, and bit 20 all to appear simultaneously.

An AND circuit 7 detects the case where there is an ADD ONE (which is an input to bit 20) together with 1's in bits 17 and 19. Thus, if bit 20 is a 0, then the ADD ONE itself will stop at bit 20, but will change the bit 20 from a 0 to a 1 and therefore causes the parity to change. On the other hand, if bit 20 is a 1, then the ADD ONE will cause bit 20 to change to 0, with a carry to bit 19, so bit 19 changes to 0, and will either propagate through bit 18 to bit 17 which will change to 0, or it will cause bit 18 to change from a 0 to a 1 and stop there. Thus, parity will be affected without regard to the even numbered bits provided that the odd numbered bits are both 1's when an ADD ONE is presented to bit 20.

The AND circuit 8 recognizes the case where the propagation of the carry from bit 20 into bit 19 ends with bit 18 without regard to the status of bit 17; specifically, with bits 19 and 20 both equal to a 1, the ADD ONE will cause bit 20 to change to 0, giving a carry into bit 19, which in turn changes to 0 with a carry into bit 18. Since bit 18 is 0, it becomes a 1, so that as between the 3 bits 18–20, only bit 18 now has a 1 therein whereas bits 19 and 20 had 1's therein prior to the effect of ADD ONE. Thus, parity has to be changed for the condition sensed by the AND circuit 8.

The AND circuit 9 recognizes a simple case where there is an ADD ONE but no ADD TWO and there is no bit 20; this then recognizes the case where the 0 in bit 20 is changed to a 1 by a signal on the ADD ONE line, and no carry is to be effected, and since there is not also an ADD TWO, there is no change in bit 19 (and upward) so that parity must be inverted.

The invert P1 and invert P2 functions are utilized in FIG. 151 to generate final P1 and P2 parity bits by means of a pair of EXCLUSIVE OR circuits 12, 13, each of which will operate a corresponding AND circuit 14, 15 so as to set a related latch 16, 17. The latch 17 is in fact set by an OR circuit 18 since the latch 17 may also be set by an AND circuit 19 which reflects bit 39 of the J register (in the same fashion that bits 37 and 38 are utilized in the circuit of FIG. 150 for scan purposes). Thus, if there is a parity bit at the input to either of the EXCLUSIVE OR circuits 12, 13, but there is an instruction to invert the bit by means of a signal on one of the related lines INVRT P1 and INVRT P2, then there will be *no* input to the AND circuits 14, 15 so that the related latch will *not* be set. On the other hand, if there *is* an input parity bit and no invert function, or if there is an invert function but no parity bit, then the EXCLUSIVE OR circuits 12, 13 are able to set the related latches 16, 17. The outputs of the latches 16, 17 are signals on related INCR P1 16–23 and INCR P2 16–23 lines. The P1 line is used merely to accompany bits back to the incrementer, but the P2 line out of FIG. 151 is utilized in FIG. 152 to check the output of the incrementer.

(9.B.2.3) INCREMENTER PARITY CHECK (FIG. 152)

Figure 152:
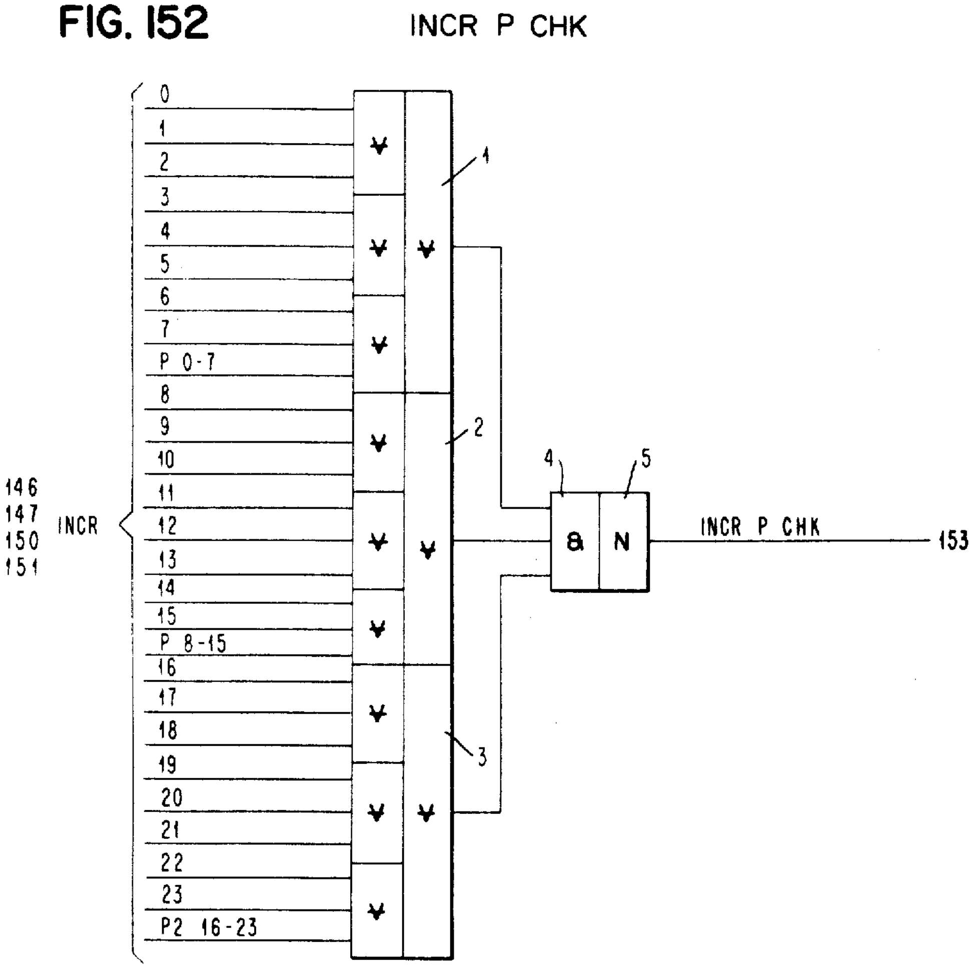

In FIG. 152, a plurality of EXCLUSIVE OR complexes 1–3 are each connected so as to operate an AND circuit 4 in the event that there is an odd number of inputs thereto. Should all of these EXCLUSIVE OR complexes 1–3 operate the AND circuit 4, then there will be no output from an inverter 5 on a INCR P CHK line. On the other hand, if an even number of inputs are applied to any one of the EXCLUSIVE OR complexes 1–3, then that complex will have no output, and will provide no input to the AND circuit 4; with less than all of the inputs present at the AND circuit 4, then there will be an output from the inverter 5 on the INCR P CHK line. The EXCLUSIVE OR complexes 1–3 respond to the 8 bits of a corresponding parity-check-byte, together with the parity bit for that byte, bits 16–23 are combined with the P2 16–23 bit from FIG. 151, for instance.

(9.B.3) *Incrementer extender* (*FIG. 142*)

The increment extender shown in FIG. 142 comprises essentially a plurality of latches 1 each of which may be set by a corresponding OR circuit 2 in response to either one of two related AND circuits 3, 4. The OR circuits 2 and the AND circuits 3, 4 correspond identically with the OR circuits 1 of FIG. 144 and the AND circuits 2, 4 of FIG. 144. In other words, the latches 1 may be set in response to either bits 0–7 of the PSW (together with parity bits 0–7) or in response to bits 32–33 (together with the parity bits 32–39) in dependence upon the presence of a signal on either a GT LH PSW TO INCR line or on a GT RH PSW TO INCR line, respectively. The output of each of the latches 1 is applied to an EXCLUSIVE OR complex 5, the output of which comprises a generated parity bit which is combined in an EXCLUSIVE OR circuit 6 with the actual parity bit from the related latch 1. In the event that either or both parity bits are present, there is no signal on an INCR EXT P CHK line, but the presence of one of them without the other will cause an incrementer extender parity check condition to be manifested by a signal on the INCR EXT P CHK line. This signal is utilized in FIG. 153 in generating the incrementer check function.

The output of each of the latches 1 is also applied to a corresponding AND circuit 7 so as to cause said output to be gated to the K register whenever there is a signal present on a GT INCR TO K line. The output of the AND circuits 7 comprise a plurality of signals on corresponding INCR EXT lines 0–7, P.

Figure 153:
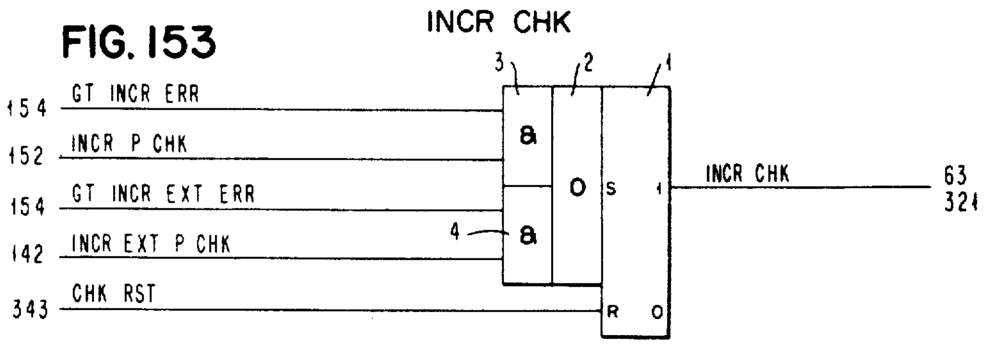

(9.B.4) *Incrementer check circuit* (*FIG. 153*)

In FIG. 153, a latch 1 will generate an incrementer check signal on an INCR CHK line whenever it is set by an OR circuit 2 in response to either one of two AND circuits 3, 4. The AND circuit 3 responds to an incrementer parity check signal on the INCR P CHK line concurrently with a signal on the GT INCR ERR line; the AND circuit 4 responds to an incrementer extender parity check signal on the INCR EXT P CHK line together with an incrementer extender gating signal on the GT INCR EXT ERR line. The latch 1 is reset by the regular check reset signal which is utilized throughout the system on the CHK RST line. The output of the latch 1 is applied to the clocking signals.

Figure 154:
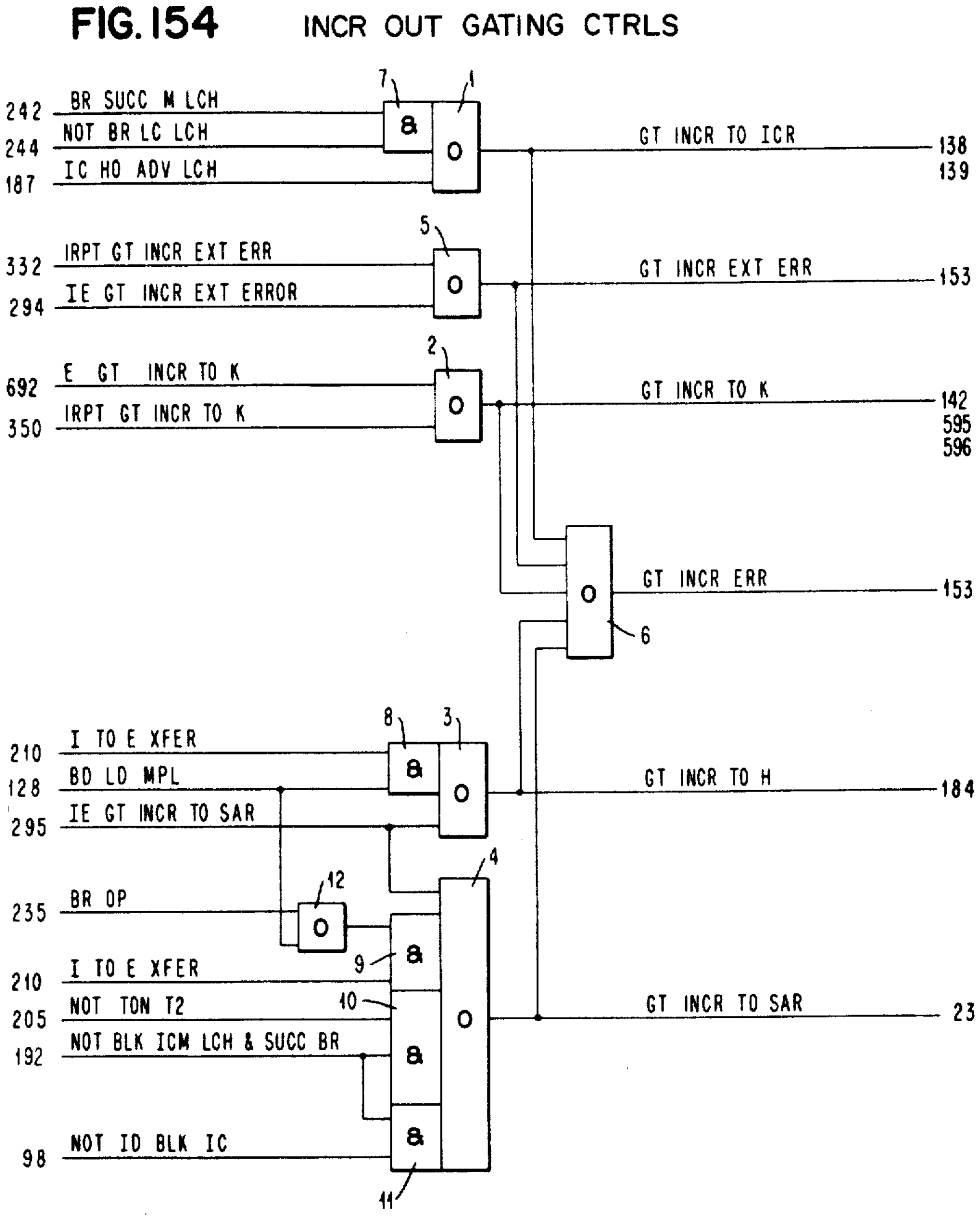

(9.B.5) *Incrementer out-gating control* (*FIG. 154*)

In FIG. 154, a plurality of OR circuits 1–4 provide corresponding incrementer output gating signals to the ICR, K REG, H REG, and SAR. Additionally, an OR circuit 5 generates a signal to gate the incrementer extender error, and an OR circuit 6 responds to any one of the OR circuits 1–5 to generate a signal for gating incrementer error on a GT INCR ERR line.

The signal on the GT INCR TO ICR line is generated by the OR circuit 1 in response either to a signal on a IC HO ADV LCH line or in response to an AND circuit 7 which requires concurrent presence of signals on both the BR SUCC M LCH line and the NOT BR LC LCH line. Thus, the contents of the incrementer is returned to the ICR during IC high order advance, or during the last cycle of a successful branch. In the latter case, the INCR is used as a data path for the new ICR setting, which is the address of the subject (or branch-to) instruction, from the H register, where the subject instruction address computed by the address adder has been placed.

The signal on the GT INCR EXT ERR line is generated by the OR circuit 5 in response to signals on either the IE GT INCR EXT ERR line or the IRPT GT INCR EXT ERR line. Thus, the incrementer extender error may be gated in response to interruptions when the INCR and INCR EXT are used as a data path for checking the new PSW. The INCR EXT ERR may also be gated by the I UNIT when it is performing the load PSW instruction, and thus using INCR as a means of checking the new PSW.

The signal on the GT INCR TO K line is generated by the OR circuit 2 in response to either E unit or interrupt control as manifested by signals on the E GATE INCR TO K line or the IRPT GT INCR TO K line. The interrupt gate is used when the old PSW is being moved from the PSW register to the K register so that it may be transferred to storage.

The OR circuit 3 will generate a signal on the GT INCR TO H line in response to either a signal on the IE GT INCR TO SAR line or the output of an AND circuit 8 which requires concurrent signals on the I TO E XFER line and the BD LD MPL line. Thus the incrementer is gated to the H register in response to multiple load and store requirements of the IE unit controls, or during the I to E transfer of a multiple load instruction. In the case of an I to E gating of incrementer to H, it will also cause an OR circuit 4 to gate the incrementer to SAR as indicated by a signal on the GT INCR TO SAR line. This permits cycling the address through the INCR and the H register for repetitive updating. The OR circuit 4 is also responsive to three AND circuits 9–11, the AND circuit 9 being responsive to the output of an OR circuit 12 during branch ops as indicated by a signal on the BR OP line or during a multiple load operations as indicated by a signal on a ED LD MPL line. Thus, the INCR is gated to both the H register and to SAR during the I to E of a multiple load, since the AND circuit 9 is gated at I to E transfer time as indicated by a signal on an I to E XFER line. The AND circuits 10, 11 are each gated by the concurrence of a signal on the NOT BLK ICM LCH & SUCC BR line together with NOT TON T2 or NOT ID BLK IC lines, alternatively. Thus, the INCR is gated to SAR when a successful branch is completed provided the IC blocks are removed or TON T2 is off.

(9.C) GATE SELECT MECHANISM

As shown in FIG. 72, the gate select mechanism includes a prelatch, a gate select adder, a gate select register, and, as shown in FIG. 73, a gate select decoder. The purposes to which the gate select mechanism are put are described in the Instruction Fetching section of said environmental system.

The various parts of the gate select mechanism are described in the following sections.

Figure 156:
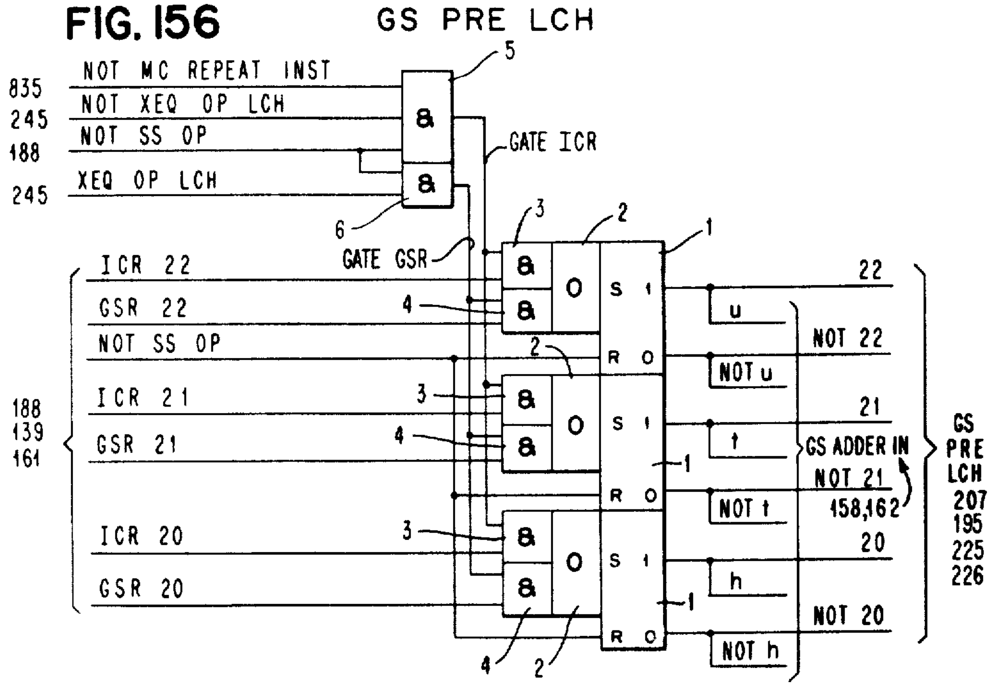

(9.C.1) *Gate select prelatch* (FIG. 156)

In FIG. 156, the gate select prelatch is shown to comprise essentially three latches 1 each of which is set by a corresponding OR circuit 2 in response to either one of a pair of AND circuits 3, 4. Each of the AND circuits 3 is operative in response to a signal on a GATE ICR line which is generated by an AND circuit 5 at all times other than during an SS OP, an EXECUTE OP, or a repeat instruction operation. The AND circuits 4 are gated by a signal on a GATE GSR line which is generated by an AND circuit 6 during execute instruction as indicated by a signal on a XEQ OP LCH line. The AND circuit 6 is inhibited during SS operations as is the AND circuit 5. Each of the AND circuits 3, 4 respond to the respective gate signal and to a corresponding bit of either the ICR, or the GSR, respectively. The latches 1 are each reset by a signal on a NOT SS OP line.

The output of each of the latches 1 comprises a signal on a corresponding one of a plurality of GS PRE LCH lines, which are also used as GS ADDER IN lines. The GS PRE LCH lines are renumerated 20–22 for positions of the ICR to which they correspond, and the GS ADDER IN lines are designated *u*, *t*, *h* (in the complements thereof) for units tens and hundreds as used in the GS ADDER.

Figure 157:
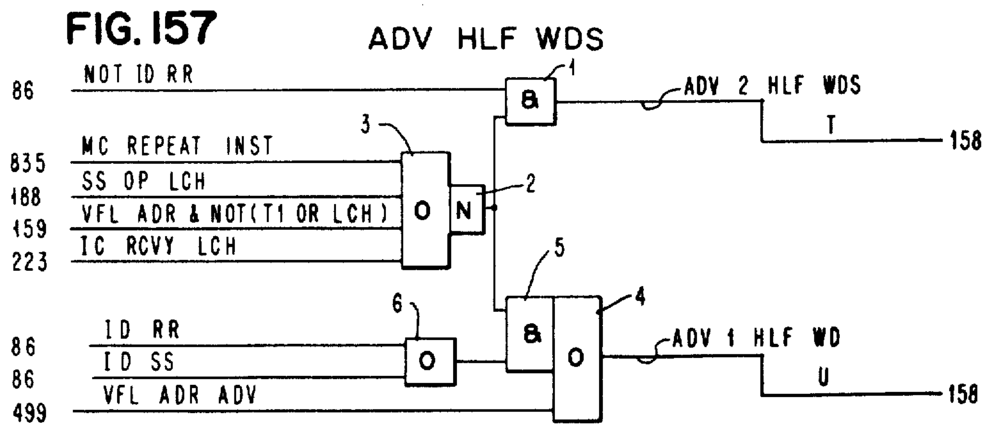

(9.C.2) *Gate select advance* (FIG. 157)

In FIG. 157, a two half word (or two syllable) advance of the gate select adder is called for by a signal on a ADV 2 HLF WDS line which is generated by an AND circuit 1 in response to the output of an inverter 2 which is operated by an OR circuit 3, concurrently with a signal on a NOT ID RR line. The OR circuit 3 is operative during instruction operations as indicated by a signal on a MC REPEAT INST line, or in response to instructions in the SS format as indicated by a signal on a SS OP LCH line. The OR circuit 3 is also operative in response to a signal on a VFL ADR.

Figure 158:
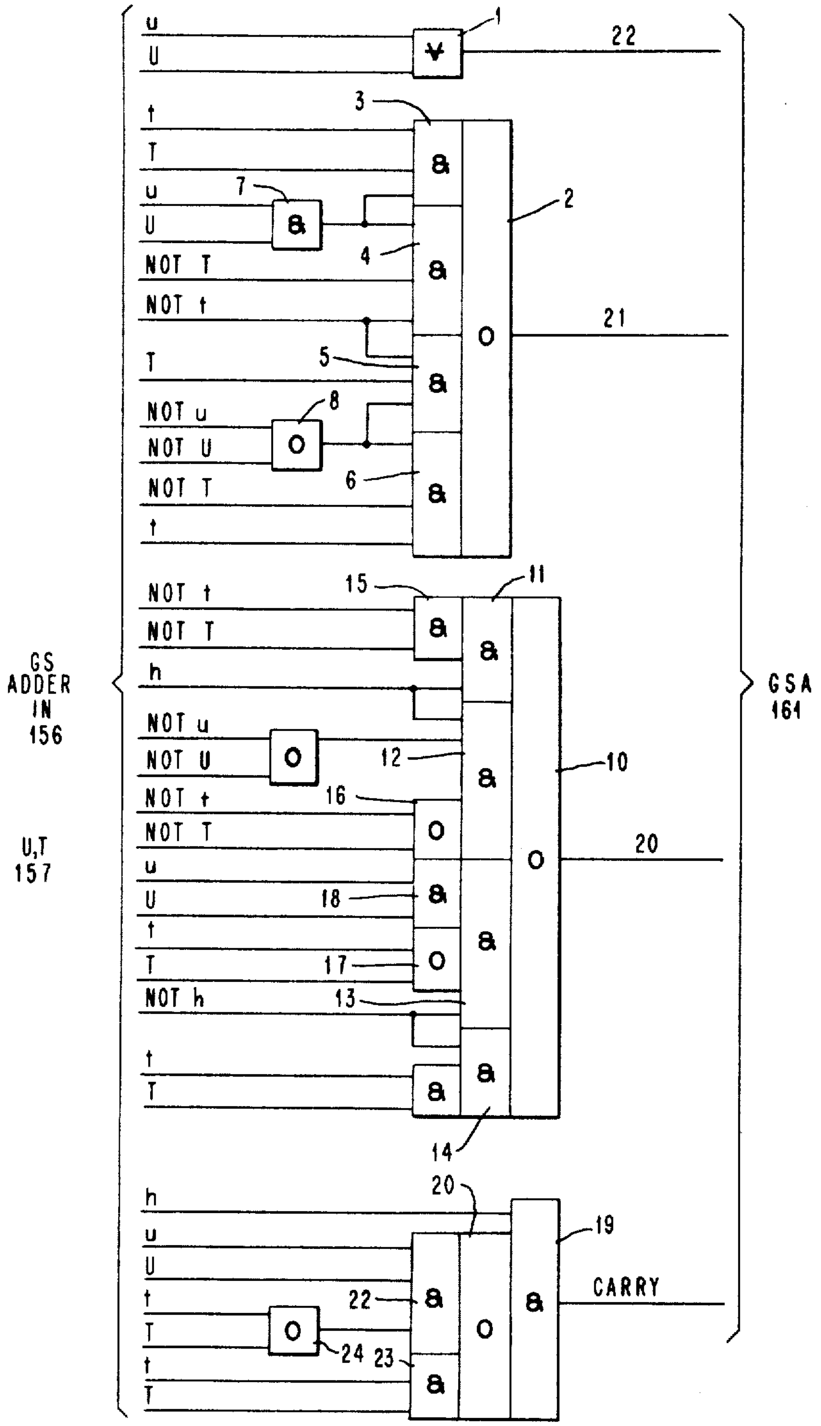

(9.C.3) *Gate select adder* (FIG. 158)

The gate select adder shown in FIG. 158 comprises three orders: units (bit 22), tens (bit 21), and hundreds (bit 20). The GS adder also supplies a carry, whenever a carry out of bit 20 is indicated. The units order comprises an exclusive OR circuit 1 which responds to the *u* and U signals to generate bit 22. Thus, if either but not both of the *u* and U signals is present, there will be a signal on the GSA 22 line. On the other hand, if both or neither are present, then bit 22 will be a 0.

The tens order comprises an OR circuit 2 which is resopnsive to any one of 4 AND circuits 3–6, each of which accounts for a different combination of *u*, U, *t*, T bits. The AND circuit 3 takes into account when there are both *t* and T inputs, and both *u* and U inputs so that an AND circuit 7 generates a carry into the tens order from the units order thereby causing a net affect on bit 21 being a 1. The AND circuit 4 is also responsive to a carry into the tens order from the units order, but recognizes a situation where there is neither a *t* or T input. In other words, it recognizes that bit 21 is only the carry from the units order (from bit 22). The AND circuit 5 recognizes the case where there is no carry from the units into the tens order as indicated by an output from the OR circuit 8 which responds to not *u* or NOT U as an indication that no carry can result in the units order. The AND circuit 5 is also responsive to a T with no *t* which indicates that there should be a bit 21 into the presence only of the control input (T) and no other inputs to the tens order. The AND circuit 6 also recognizes the lack of a carry from the units order as indicated by a signal output from the OR circuit 8 and the case where there is no control input (NOT T) but there is a bit input from the GS prelatch (*t*). Thus, each of the AND circuits 3–6 recognizes the case where the net effect of carries control and prelatch inputs to the tens order result in a tens order output bit, GSA bit 21.

The hundreds order of the gate select adder relates to bit 20, and comprises essentially an OR circuit 10 which is fed by any one of 4 AND circuits 11–14. The AND circuit 11 recognizes the case where there is no inputs to the tens order as indicated by a NOT *t* and a NOT T which is sensed by an AND circuit 15, but there is an input to the hundreds order as indicated by the *h* applied to the AND circuit 11. Thus, no inputs from the tens order, nor carries from the units order, can cause a carry from the tens order to the hundreds order, so that the presence of the hundreds order bit will require the presence of an output bit for the hundreds order on the GSA 20 line. The AND circuit 12 recognizes the case where there may be one input to the tens order, but there is no carry from the units order so that there will be no carry into the hundreds order; this is achieved by application of NOT *u* or NOT U and NOT *t* or NOT T (OR circuit 16). The AND circuit 13 recognizes the case when there is at least one input to the tens order (OR circuit 17) together with both inputs present at the units order (AND circuit 18), which means that a carry into the hundreds order will result, but there being no input to the hundreds order, this carry will require that there be an output from the hundreds order.

The AND circuit 14 recognizes the case where both inputs are present to the tens order so that there will be a carry into the hundreds order without regard to conditions in the units order and yet there is no input to the hundreds order so that the carry into the hundreds should be reflected in an ouput bit on the GSA 20 line.

GSA carry is generated by an AND circuit 19 in response to an OR circuit 20 provided there is also an input to the hundreds order of the adder. The OR circuit 20 may be operated by either one of two AND circuits 22, 23, the AND circuit 23 recognizing the case where there are two inputs to the tens order so that there will be a carry into the hundreds, which together with the regular input to the hundreds order will cause a carry out of the GS adder. The AND circuit 22 recognizes the case where both inputs are present to the units order so that there will be a carry into the tens order, and that either one or the other of the tens order inputs are present as indicated by an OR circuit 24, thus giving rise to a carry into the hundreds order; again a carry into the hundreds order together with an input to the hundreds order will result in a hundreds order of 0 with a carry out of the hundreds order.

Thus, the gate select adder recognizes three inputs *u*, *t*, *h* and two control inputs U and T to generate output bits 20–22 together with a CARRY on corresponding GSA lines.

Figures 159, 160, 161:
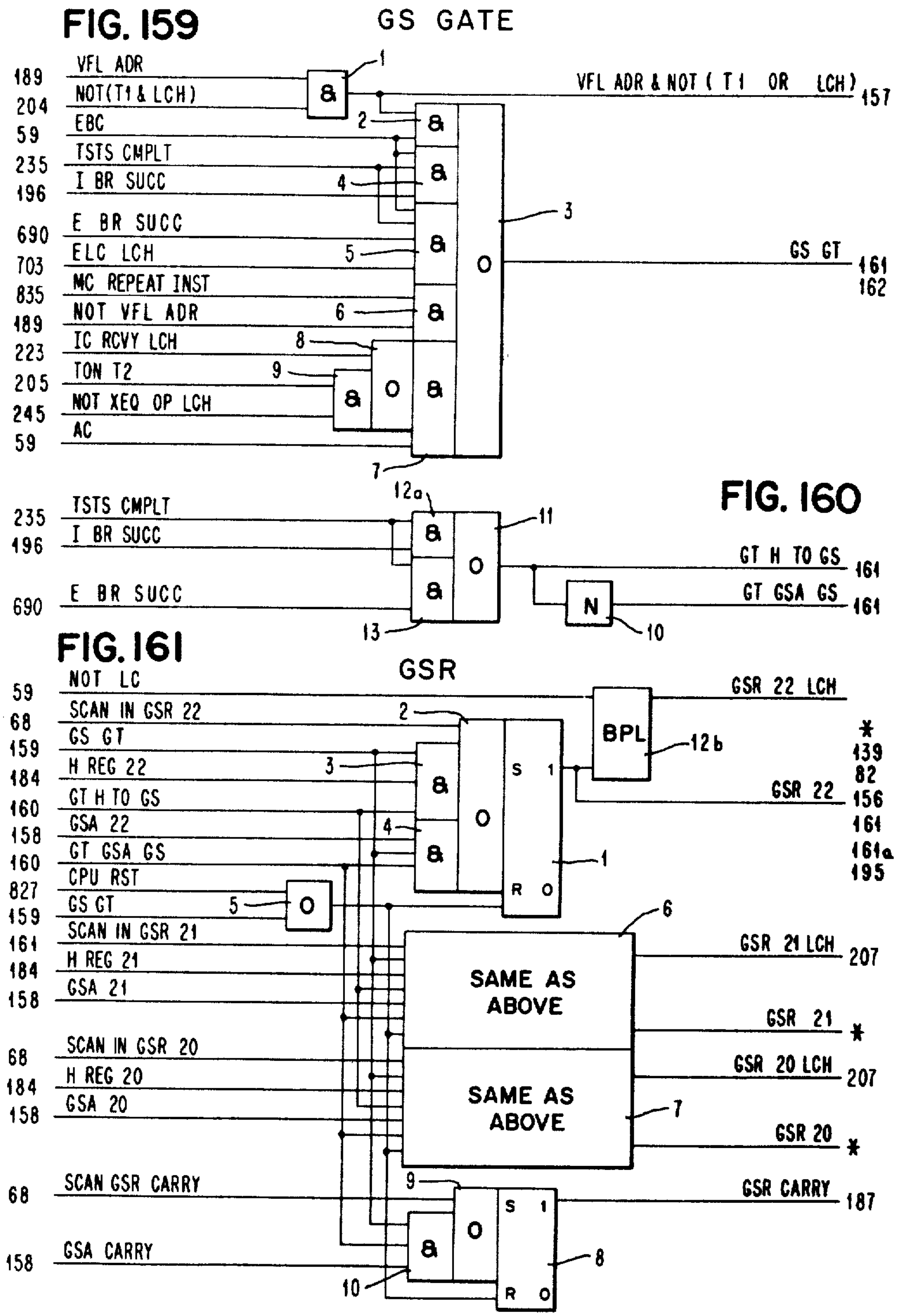

(*9.C.4*) *GS gate controls* (*FIG. 159 and FIG. 160*)

In FIG. 159, a signal is generated on a VFL ADR & NOT T1 or LCH by an AND circuit 1 in response to a signal on a VFL ADR line concurrently with a signal on the NOT T1 & NOT T1 LCH line. The output of the AND circuit 1 is also used as a gate for an AND circuit 2 which otherwise responds to a signal on the EBC (early B control clock) line so as to operate an OR circuit 3 which generates a signal on a GS GT line, which is utilized in FIG. 161 as an input control gating line for the GSR. The OR circuit 3 is also responsive to an AND circuit 4 which may be operated at early B time in response to a concurrence of a signal on the TSTS CMPLT (tests complete) line and a signal on the I BR SUCC (I unit branch success) line. The OR circuit 3 is responsive to another AND circuit 5 which is operated by EBC and TSTS EMPLT concurrently with a signal on the E BR SUCC line. An AND circuit 6 is operative in response to MC REPEAT INST and NOT VFL ADR lines. An AND circuit 7 is operated at A time by a signal on an AC line provided there is an output from an OR circuit 8 which may be caused by a signal on a IC RCVY LCH line or by an AND circuit 9. The AND circuit 9 operates with TON T2 during other than an execute instruction as indicated by a signal on a NOT XEQ OP LCH line.

In FIG. 160, a signal which gates the H register to the gate select register is generated on a GT H to GS line, the complement of which is generated by an inverter 10 on a GT GSA GS line so that either the gate select adder or the H register are always gated into the gate select register. These lines are controlled by an OR circuit 11 which responds to either AND circuits 12, 13, each of which requires a signal on a TSTS COMPLT line. The AND circuit 12 is also responsive to a signal on the I BR SUCC, whereas the AND circuit 13 is responsive to a successful branch from E, as indicated by E BR SUCC.

(*9.C.5*) *Gate select register* (*FIG. 161*)

In FIG. 161, the gate select register comprises essentially a plurality of latches 1, each of which is setable by an OR circuit 2 in response to either one of two AND circuits 3, 4 or in response to a scan input for the corresponding latch. The AND circuits 3, 4 are responsive to a signal on the GS GT line, and to related inputs for either the H register or the gate select adder, respectively. Thus, the AND circuits 3 will respond to a related bit of the H register if there is present a signal on the GT H TO GS, and in the alternative, the AND circuits 4 will respond to the corresponding gate select adder bit provided there is a signal on the GT GSA GS line. Each of the latches 1 is reset by a signal from an OR circuit 5 which responds to either a CPU RST signal, or to the GS GT signal. Although shown in FIG. 161 in detail only with respect to bit 22, a plurality of similar circuitry 6, 7 is provided for bits 20 and 21 thereof.

A carry position is provided in the GS register comprising a latch 8 which is set by an OR circuit 9 in response to an AND circuit 10 or in response to a scan input for the GSR carry. The AND circuit 10 in response to the GS gate signal on a GS GT line, to a signal on the GT GSA GS line, and to a gate select carry from the adder circuit as indicated by a signal on the GSA carry line. The latches 1 each operate a bipolar latch such as the bipolar latch 12 so that the contents of the latch 1 will be reflected in the latch 12 and not LC time, thereby providing for signals on GSR LCH lines as well as on the GSR lines 20–22.

*(9.C.6) Gate select decode circuit (FIG. 161a)*

Figure 161A:
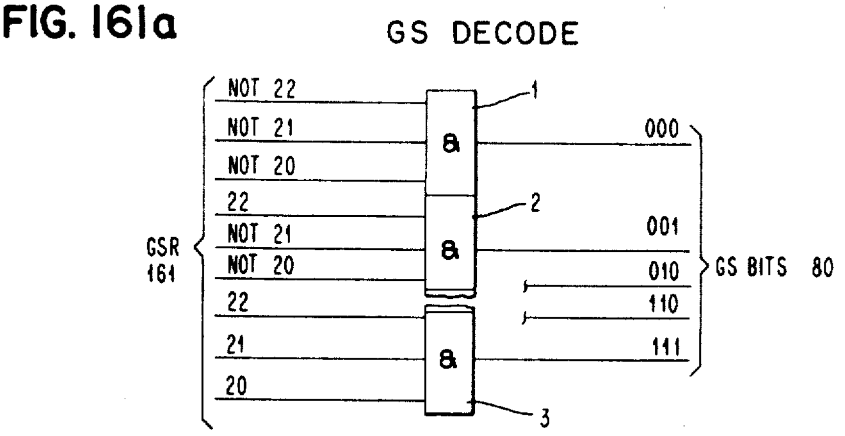

In FIG. 161*a*, a plurality of gate select control bits are provided on corresponding GS bits lines 000–111 which are generated by corresponding AND circuits 1, 2 . . . 3 in response to various combinations of GSR input bits. This is a straight binary decoder which recognizes that bit 20 is high order, bit 22 is low order, and the various combinations of bits will generate a corresponding binary output line 000–111. These lines are utilized at the output of the AB register to select the correct instruction for application to the IOP register in the predecoder, as described in section 5.2.0.0.

*(9.C.7) Gate select parity circuit (FIG. 162)*

Figure 162:
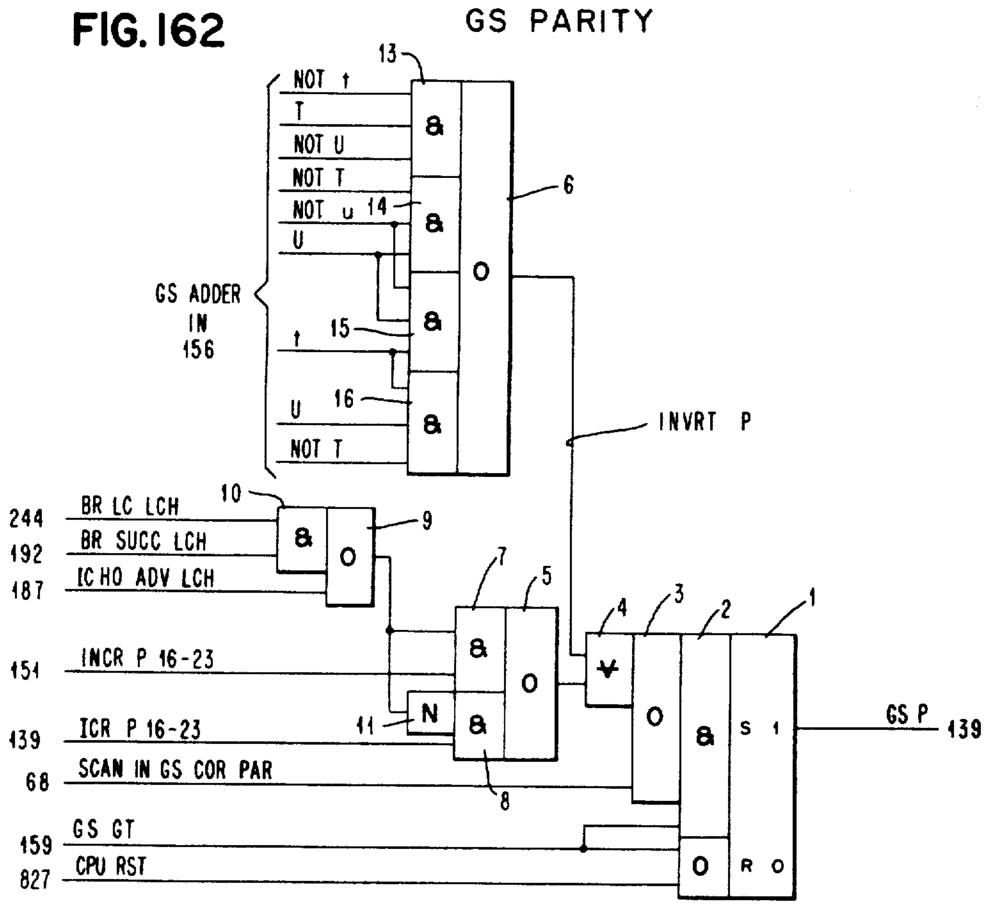
Figures 163, 183:
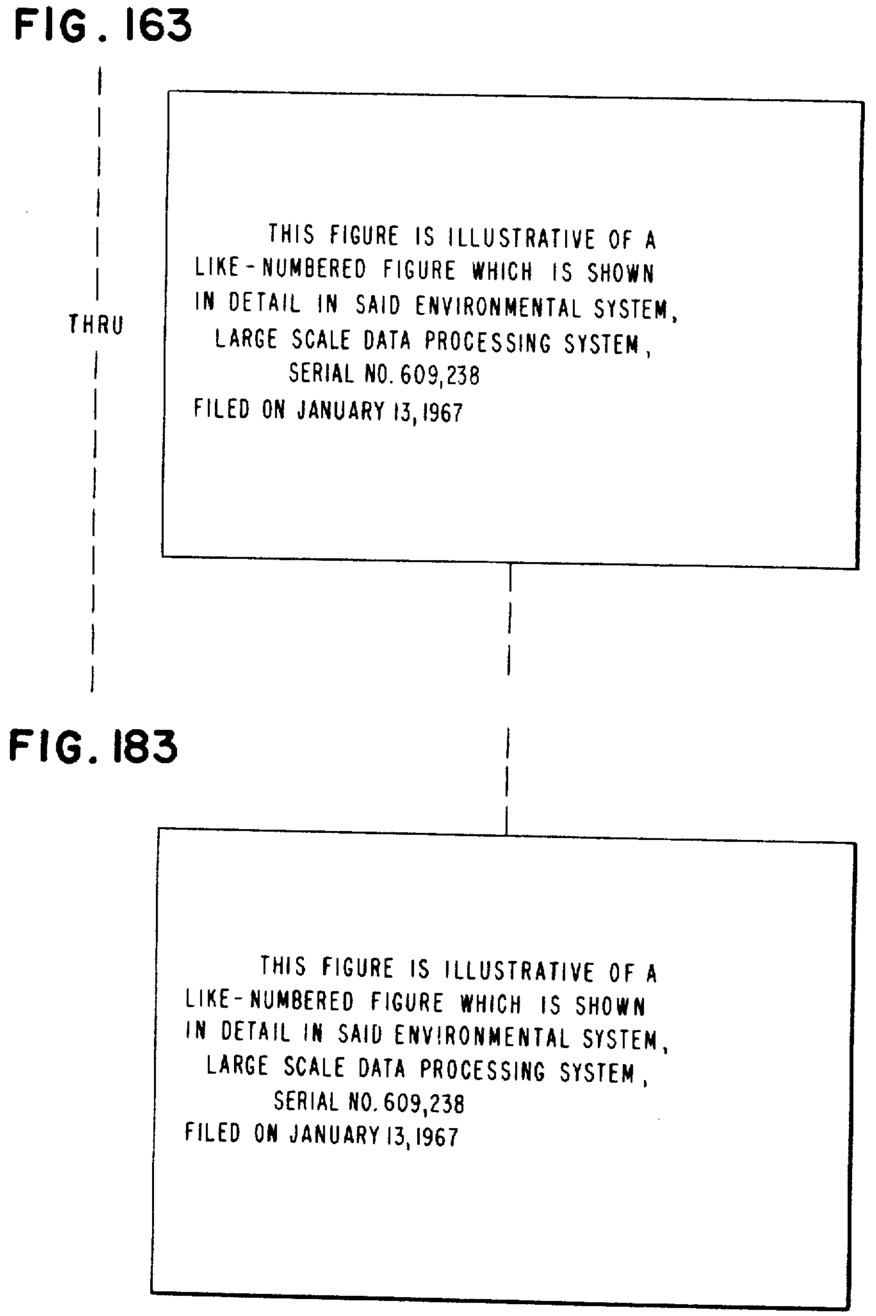

The parity stage of the gate select register comprises a latch 1 shown in FIG. 162. This latch generates a signal on a GS P line when set by an AND circuit 2 in response to an OR circuit 3 concurrently with the GS GT signal which is the same signal that is utilized to set and reset the remaining latches in the gate select register. The OR circuit 3 is responsive to a signal on a SCAN IN GS COR PAR line or to the output of an exclusive OR circuit 4. The exclusive OR circuit responds to parity as indicated by an OR circuit 5 and to an invert parity function from an OR circuit 6 so as to provide an output when there is no parity and the parity is to be inverted, or when there is parity and the parity is not to be inverted. Otherwise, the exclusive OR circuit 4 will provide no input to the OR circuit 3. The OR circuit 5 responds to either one of two AND circuits 7, 8 in respect to dependence upon whether there is no output or there is an output from an OR circuit 9. The OR circuit 9 in turn is responsive to an IC high order advance as indicated by a signal on the IC HO ADV LCH lines, or to the output of an AND circuit 10 which is operated during the last cycle of a successful branch as indicated by signals on the BR LC LCH lines and the BR SUCC LCH line. Thus, during the last cycle of a branch or an IC high order advance, the AND circuit 8 is operative to cause the parity bit of bits 16–23 or the ICR to be controlling, and otherwise, the increment parity bits 16–23 will cause the AND circuit 7 to operate the OR circuit 5 due to the gating effect of an inverter 11.

The OR circuit 6 senses various cases where parity must be inverted due to the effect of the control inputs U and T on the gate select adder inputs *u*, *t*, *h*. Since the parity bit which is to be changed is that which accompanies an 8 bit byte including the three inputs to the gate select adder, and the only effect on that byte at the time of a gate select addition is the effect on bits 20–22 thereof, then the only effect on the parity is that which the control inputs have upon the input bits *u*, *t*, *h*. Each of the AND circuits 13–16 recognizes a case where the parity of the entire byte must be changed in order to reflect the results of the addition. The theory of operation of each of the AND circuits is very straightforward, and merely senses a condition where parity will change. As an example only, the following table illustrates the change in parity which is sensed by the AND circuit 13, it being possible to draw a similar table for each of the AND circuits 14, 15 and 16, which has been eliminated herein, however, for simplicity. The changes in parity sensed by the AND circuit 13 are as follows:

| Possible Inputs | | | | | | | | | | | | | | | | |
|---|---|---|---|---|---|---|---|---|---|---|---|---|---|---|---|---|
| h t u P | 0 | 0 | 0 | 1 | 0 | 0 | 1 | 0 | 1 | 0 | 0 | 0 | 1 | 0 | 1 | 1 |
| Ctrl Inputs T, U | | 1 | 0 | | | 1 | 0 | | | 1 | 0 | | | 1 | 0 | |
| Possible Results | 0 | 1 | 0 | 0 | 0 | 1 | 1 | 1 | 1 | 1 | 0 | 1 | 1 | 1 | 1 | 0 |

*(6.1.2) Channel selection, generally (FIG. 9)*

Figure 9:
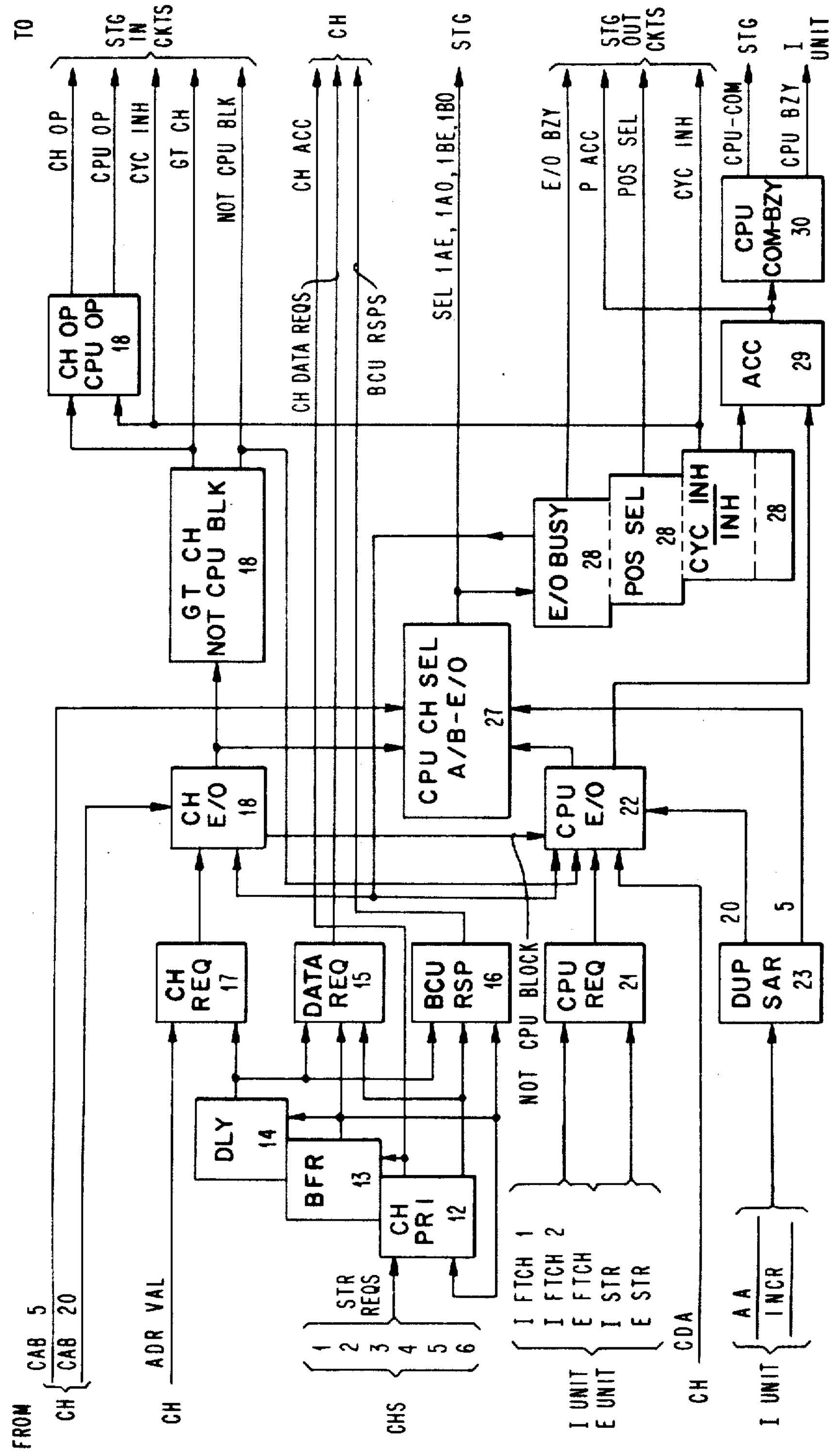

Selection of a channel for communication with a storage unit is achieved by the channel request circuit FIG. 17, and the channel even/odd circuit FIG. 18 shown in FIG. 9. As described in preceding sections one channel will be selected in dependence upon the priority of the channels making storage requests; from the particular selected channel, a signal will be received on an ADR VAL (address valid) line in the channel request circuit, and, providing that even or odd storage is not busy (in correspondence with the desire to select an even storage or an odd storage, respectively), a GATE CH signal is generated in response to the selecting of the even or odd storage as shown in FIG. 18 and described in detail in section 6.1.2.2, hereinafter.

(6.1.2.1) CHANNEL REQUEST CIRCUIT (FIG. 17)

The channel request circuit shown in FIG. 17 comprises a latch 1, which when set by an AND circuit 2 will generate a signal on the CH REQ line for use in FIG. 18. The AND circuit 2 in turn responds to a latch 3 which is set by an AND circuit 4 at A time (due to a signal on the AR line), provided there is a signal on the DLY FULL line from FIG. 14 and a signal on an ADR VAL line from the channel. In the embodiment herein described, the signal will never appear on the ADR VAL line until after the DLY FULL signal has already appeared, which means that use of the ADR VAL signal as an input to the AND circuit 4 is redundant. However, if a different channel device were applied to the BCU here being described, it is possible that the delay characteristics of the channel configuration could be such that the DLY FULL signal could be available at a time earlier than when a correct address were being presented to the BCU by the channel; therefore, the ADR VAL signal being applied to the AND circuit 4 renders this BCU more universal in its compatibility with channels of various designs. The use of the two latches 1, 3 permits recognizing the time when a channel request can be effective in starting a storage operation even though the ADR VAL signal may come on at differing times (in dependence upon the characteristics of the particular channel to which priority has been assigned). The latch 1 can be set only 100 ns. after latch 3 is set, which means there is no possibility of latch 3 becoming set at the wrong time within a timing signal so as to cause noise or other questionable operation of the various circuits. In other words, by the time the latch 1 can be turned on by the BR clock pulse, latch 3 must have been set nearly 50 nanoseconds earlier, and therefore has had plenty of time to fully establish the set condition (in view of the fact that only approximately 10 nanoseconds are required for a latch to establish a definite steady state). The latch 1 is not only set at B time, but also will be reset at B time. This is another latch of the type wherein the setting condition has a shorter path than the resetting condition, and a tendency to set simultaneously with a tendency to reset will cause the latch to be set. The latch is reset upon the rise of the BR signal, and is set immediately thereafter (about 4 ns.). When the BR signal disappears however, it disappears more quickly from the reset input to the latch than it does from the set input of the latch, due to the fact that an additional logic circuit is in the set path. Thus, the BR signal will be effective at the set input to the latch for a sufficient length of time *after* the loss of the BR signal at the reset input of the latch so as to leave the latch in a set condition, provided the other input to the AND circuit 2 is present. In this manner, the latch 1 is set at the start of B time and remains set until the start of the following B time. This is illustrated in FIG. 19, the channel priority and selection timing diagram.

The latch 3 is reset by an OR circuit 5 in response to the off-side of still another latch 7 which is set by an AND circuit 8 in response to the NOT BFR signal and a signal on the DLY6 line. In operation, the latch 7 is reset when DLY6 appears, and will be set (during DLY6) as soon as NOT BFR appears. This conditions latch 7 to reset the latch 3 until the next NOT BFR time which causes the latch 7 to be set again (see FIG. 19). It is to be noted that the clock pulses are RUNNING clock pulses (AR, BR) and the reset signal utilized to reset the latch 3 is a system reset control signal (SRC) indicating that these circuits are allowed to oeprate by themselves during diagnostic procetdures wherein CPU reset controls and single cycling may be effective.

Concerning the ADR VAL signal, it should be noted this signal is received by the BCU from the channel to indicate that the channel has sent to the BCU a valid address and other related signals. The ADR VAL signal is therefore directly caused by the BCU RSP signal sent to the channel, which causes the channel to apply a valid address on the input lines to the BCU. Thus, in the chain of operation, one considers that a storage request from a channel will eventually result in a BCU response, causing the channel to send an address and an address valid signal, which then permits the channel request circuits to recognize a particular channel storage request and initiate the storage selection process.

(6.1.2.2) CHANNEL EVEN/ODD SELECTION (FIG. 18)

Figure 10:
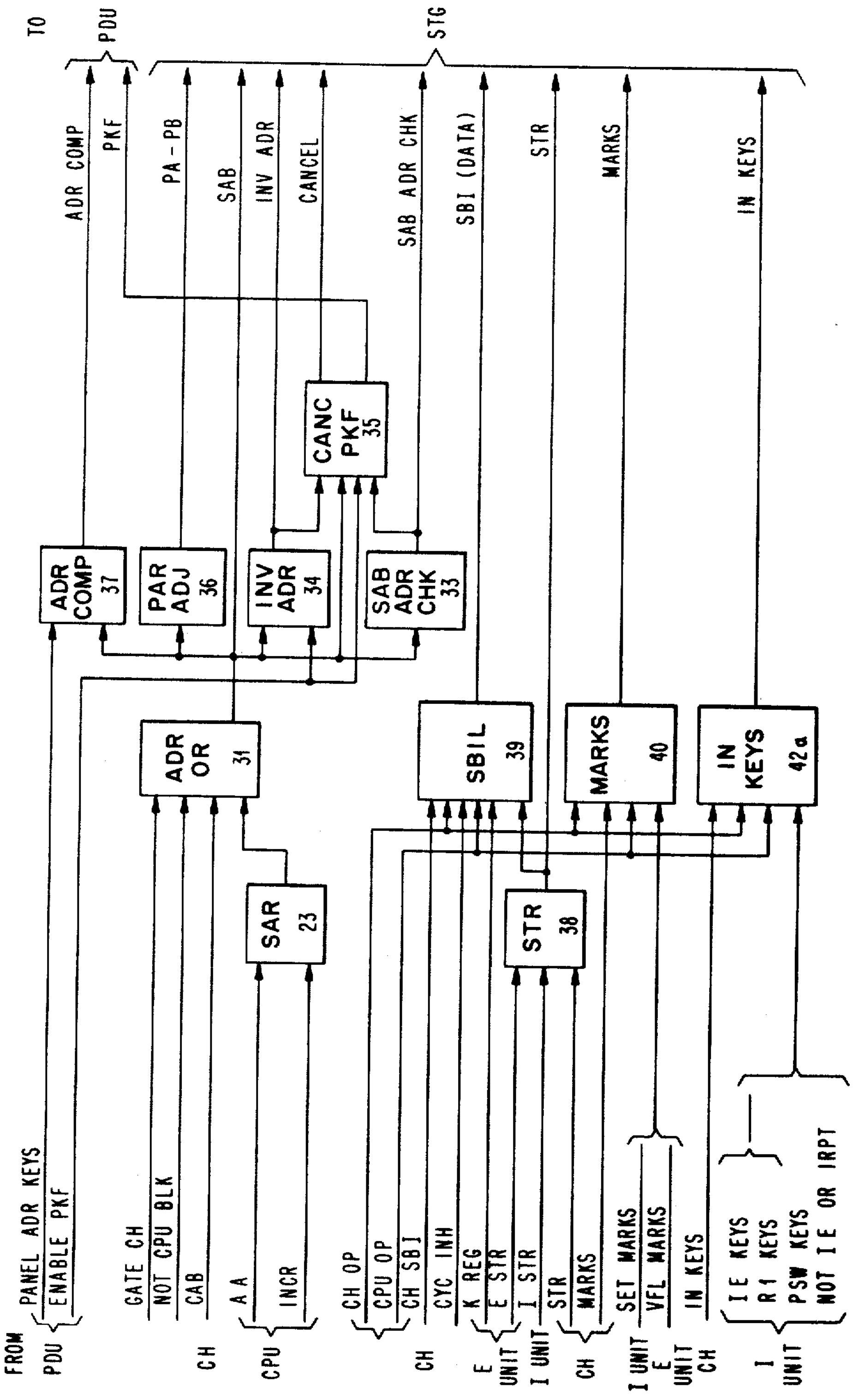
Figure 11:
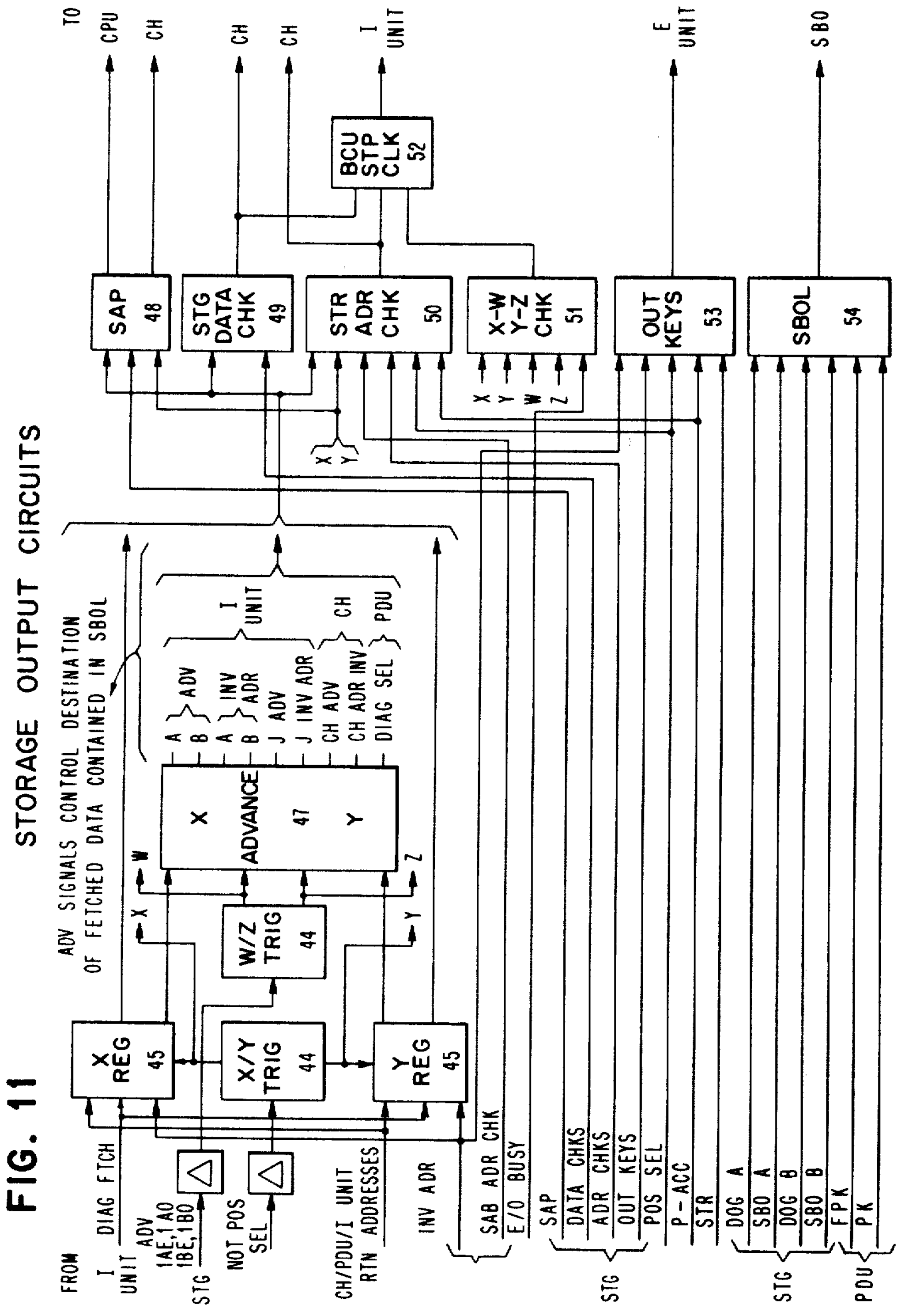

The channel even/odd selection circuit, shown in FIG. 18, determines that a valid channel request has been accepted for either an even or an odd storage unit and, when this is so, that the channel, rather than the CPU, is to be gated in various other circuits within the BCU, as indicated by the GATE CH (gate channel), NOT CPU BLK (block), CH OP (operation), and CPU OP, control signals which are utilized in the remainder of the circuits shown in block form in FIG. 9 and FIG. 10.

(11.0) INSTRUCTION COUNTER CONTROLS (FIG. 72 THROUGH FIG. 75)

The incrementer and gate select circuits control the normal advancing of the instruction counter and the normal fetching of instructions.

Instructions fetched from storage are buffered in either the A or the B register before being set into the IOP register for initial execution (see FIG. 72 through FIG. 75). The instruction counter register (ICR) contains 24 bits (numbered 0 through 23) and is advanced by means of two adders: the gate select adder for advancing the low order portion IC LO (bits 20–22) and the incrementer for advancing the instruction counter high order portion ICHO (the remaining bits). The gate select adder works in conjunction with the gate select register (GSR) to select gates from the A and B registers to the IOP register.

(*11.1*) *Introduction*

All instructions are executed in two parts: and I time and an E time. I time of one instruction may be overlapped with E time of the previous instruction. The instruction counter controls, while advancing the setting of the gate select register GSR, also maintain the ICR with a proper address for interrupt purposes.

The IC controls also generate the instruction fetch addresses and make normal IC fetches. The addresses are generated by adding, in the incrementer, an appropriate, small increment amount to the ICR. The IC controls attempt to make an IC fetch as soon as an empty instruction buffer (A or B REG) condition is detected, but any instruction in the process of execution may block out IC fetches if an IC fetch would cause interference with the instruction execution. If the IC fetches are continuously blocked by instruction executions, the I unit ultimately will exhaust all instructions in the buffers. At this time, the IC block will drop, allowing IC fetches to be made and instruction execution to resume. Normally the instruction buffers will not be exhausted before IC fetches are made. However, special logic has been incorporated to insure that, except in unique situations, both buffers are not emptied. In other words, fetches relating to executions take priority over instructions fetches until the A and B registers no longer have a full instruction left; then, one instruction fetch is allowed notwithstanding the need for operands.

First there is a physical description of the IC data flow. IC addressing, advancing, fetching and recoveries are discussed, in that order.

(*11.2*) *Physical description of data flow*

In illustration of the data flow for the I unit is shown in FIG. 72 through FIG. 75. That portion of the data flow relevant to the INCR and GS adder is shown in FIG. 72.

(11.2.1) ICR AND INCREMENTER

The ICR is a 24 bit register used for addressing instructions in external storage during normal linear sequencing. Though the register is located in positions 40–63 of the PSW, it is called ICR0–23 in this description. The ICR is gated into a 24 bit adder called the incrementer (INCR). The input on the other side of the incrementer is at positions 20 and 19 only. These two lines are generated by controls, and are called ADD ONE and ADD TWO, respectively. By various combinations, addresses at the incrementer input can be advanced 0, 1, 2 or 3 64-bit storage words. While the gate to SAR is a full 24 bits wide, the gate to ICR lacks positions 20–22 and therefore consists of only 21 bits. A full 24 bit path from the H register to the incrementer is also provided.

It should be noted that the incrementer is not a true general adder because certain special inputs will not give a correct sum. However, these special inputs can occur only if there is a machine malfunction. If there is a bit in incrementer data input position 20 at the same time as there are bits on both control inputs, an incorrect sum results. For this case the result in bit 19 is erroneous, and if $x$ is zero, the carry which normally would go into position 18 is not generated. For any other inputs, the incrementer gives a correct sum. The parity prediction and checker for incrementer P16–23 (called P2) is designed for the incrementer as implemented—not a true adder. Thus, if all three inputs *did* appear, the parity circuit would detect the malfunction. The details of the incrementer implementation are described hereinafter.

(11.2.2) A, B AND J REGISTERS

The two instruction buffer registers A and B each hold one storage word of 64 bits. The A register is associated with double words in storage for which the address is *even*, that is, the address contains a 0 in bit position 20; the B register relates to storage words for which the address is ODD (contains a 1 position 20). Except for this one consideration, registers A and B are completely similar in usage. Bit 63 of register A is considered as being adjacent to bit 0 of register B, and bit 63 of register B is considered as being adjacent to bit 0 of register A. There is also one 64 bit operand buffer, the J register. All these buffer registers are fed by the 64 bit SBO (storage bus out) which is fed from external storage. There is also the 64 bit bus from the J REG to the AB REG (which includes A and B). There is a 32 bit op (operational) register called IOP which can be loaded directly from any thirty two bit field in AB starting at a halfword address (0, 16, 32, 48). The field in AB that is selected for gating to IOP is determined by a full binary decode output of a 3 bit gate select register.

(11.2.3) CHECKING

The A, B, J, ICP, SBO, H and ICR registers have one parity bit for each 8-bit byte. The incrementer has a checker which checks input parity and checks internal operation of the incrementer. The incrementer also generates normal parities for each of the three output bytes. These are generated by independent circuitry. A unique parity bit P1 is also generated within the incrementer. This is necessary because bits 21 and 22 of the INCR are not gated into the ICR with the rest of the INCR output. This parity is generated by considering incrementer inputs 16–19, control input 19, and the input parity. Assume that there are an even (odd) number of bits in incrementer input 16–19. If control input 19 is one, and if adding a one into position 19 of the incrementer input would result in a sum with an odd (even) number of bits in positions 16–19, then P1 is set equal to the input parity inverted. If the result has an even (odd) number of bits in positions 16–19, then P1 is set equal to the input parity. The parity bit P1 is gated into ICR P16–23 instead of the conventional parity bit for 16–23. However, the normal incrementer parity for 16–23 is gated to SAR P16–23. The following is an example of the operation of the incrementer:

fetch, the parity is checked. At this time the erroneous parity will lead to a data check.

(11.2.5) ADDRESSING OF INSTRUCTIONS

At the start of each T1 cycle the instruction being executed by the I Unit is placed into the IOP register. The left most half-word or syllable; two 8-bit bytes of the instruction is placed in IOP0–15, and the next half-word is placed into IOP16–31. If the instruction is an RR instruction (one syllable in length), then IOP16–31 is not involved in the instruction execution, and will be followed in ICP. The basic unit of data in external storage is the 64 bit storage word, which contains 8 bytes, four syllables, or two "full words." Addresses, which are 24 bits long, access storage to the byte level. Therefore bits 0–20 of any address specify a double word in storage and bits 21–23 specifies a byte within a double word. Instructions always start at syllable (or halfword) addresses and hence any address for an instruction should have a zero in position 23, thus indicating an even-number byte. In order to obtain an instruction at a given address it is necessary to first fetch the storage word addressed by bits 0–20. If bit 20 is 0, the double word is buffered in the A register. If bit 20 is 1, the double word is buffered in the B register. If the instruction is located in a position which overlaps a double word boundary, it is necessary to also fetch the next dou- (11.2.4) GATE SELECT MECHANISM

| Position | 16 | 17 | 18 | 19 | 20 | 21 | 22 | 23 | P | P1 |
|---|---|---|---|---|---|---|---|---|---|---|
| Incr Input | 0 | 0 | 1 | 1 | 0 | 0 | 1 | 0 | 0 | ------- |
| Ctrl Input | | | | 1 | 1 | | | | | |
| Incr Output | 0 | 1 | 0 | 0 | 1 | 0 | 1 | 0 | 0 | 1 |

A three bit path is provided from ICR20–22 to the gate select adder pre-latch. A second three bit input to the gate select adder pre-latch comes from the gate select register. The output of this latch feeds into the gate sheet adder. The gate select adder is a three position adder implemented in two levels. Control inputs are provided at positions 21–22 of the second side of the gate select adder. The output of the gate select adder can be gated into the three position gate select register. This register also has a gated input from positions 20–22 of the H register, which is used during branches. There is also a carry position in the gate select register which is fed by the carry output of the gate select adder. The decoder of the gate select register selects thirty two bit fields in the A, B registers for gating to IOP as follows (see FIG. 73):

*AB Register*

| GSR | Bits selected |
|---|---|
| 000 | A00–31. |
| 001 | A16–47. |
| 010 | A32–63. |
| 011 | A48–63, B00–15. |
| 100 | B00–31. |
| 101 | B16–47. |
| 110 | B32–63. |
| 111 | B48–63, A00–15. |

The gate select register is provided with a "Corrected Parity" position which is used in updating ICR P16–23 whenever ICR 20–22 is updated from the GSR. The corrected parity is generated from the gate select adder data inputs and a parity bit sent along with the data. Normally this parity comes from ICR P16–23, but if the ICR is being set from the incrementer at the same time as the GSR is being set from the ICR, the input parity is taken from P1 of the incrementer. This corrected parity reflects the new ICR P16–23 that results from the add in the gate select adder. But, if any single error occurs in the gate select adder or the parity generation circuitry, the corrected parity bit is incorrectly set. When the GSR is returned to the ICR, the last byte of the ICR will then contain incorrect parity. Whenever the ICR is gated into the incrementer, for an IC HO ADV or for an instruction ble word; this second double word would be buffered in the B register if the first double word was in the A register, and vice versa. The A and B registers are hereinafter referred to jointly as the AB register.

Before any instruction contained in the AB register can be properly set into IOP, it is first necessary to select one of the gates out of AB. This is accomplished by setting bits 20–22 of the instruction counter into the GSR. On the basis of the GSR, one of the eight gates from the AB register to IOP is selected. The specific decoding is described in section 5.3.1.4.

The first two bits of any instruction, which are placed in ICP0, 1 (and BOP0, 1), contain a code which identifies the number of halfwords or syllables in the instruction, which is determined by the format of the instruction. There is a length decoder connected to BOP0, 1, which provides the actual length of the instruction. The output of the length decoder is fed to PSW32, 33. The coding is as follows:

| ICP | | Input to PSW | | Format |
|---|---|---|---|---|
| 0 | 1 | 32, 33 | ---------- | |
| 0 | 0 | 0 | 1 | RR. |
| 0 | 1 | 1 | 0 | RX. |
| 1 | 0 | 1 | 0 | RS-SI. |
| 1 | 1 | 1 | 1 | SS. |

(11.4) *Instruction counter advancing*

An example of ICR advancing is shown in FIG. 265, and described with respect to FIG. 72, and to a lesser degree FIG. 73 through FIG. 75.

Except during special circumstances, ICR20–22 is continuously gated into the gate select pre-latch of the GSA illustration 4, FIG. 265. Normally, the input to the GSA is not latched, but acts as a flush path. Also, normally, the two-bit indication of the instruction length, which is obtained from the IOP decoder, is gated into the control inputs of the gate select adder (illustration 5, FIG. 265).

At the start of any instruction pre-decoding cycle (the first T1 cycle), bits 20–22 of the address of that instruction are contained in both ICR 20–22 (illustration 10) and the GSR (illustration 12). During the last T1 cycle for that instruction, the instruction being pre-decoded is located in IOP, and therefore bits 20–22 of the address of the *next* instruction can be made available at the output of the gate select adder. This output, along with the carry and corrected parity, are gated into corresponding GSR positions by TON T2 at A time (AC). During T2 the GSR output selects the proper gate from the AB registers for the next instruction (FIG. 72). Thus the gates are selected in time for setting IOP with the next instruction in the AB register on the clock cycle following TCN T2 (i.e., in the first T2 cycle).

When an instruction is transferred from the I unit to the E unit (called the I to E transfer), ICLO is advanced by gating the GSR to ICR20–22, the "Corrected Parity" is also set back into ICR P16–23, and, the length of the instruction being transferred is gated from the BOP decoder to PSW32, 33. If a carry is generated by the gate select adder (ICLC). The ICR will not be completely advanced until ICR positions 3–20 (ICHC) are advanced. Therefore, in order to advance the ICHC, the ICHO ADV trigger is turned on by I to E XFER concurring with GS CARRY. The ICHO ADV gates the complete ICR into the incrementer, increments position 19, (ADD T2), and gates the sum along with new parties back into the ICR0–19. Thus, within at most one cycle of the I to E transfer, the whole ICR is updated. ICR bits 20–22 (ICLO) are not gated from the INCR result, so they remain as set by the GSR.

As is described under IC fetching, the IC controls have the ability under certain circumstances to force the incrementer control input to generate IC fetch addresses, but the fetch controls are not necessarily blocked during an ICHO ADV. Therefore, the possibility exists that the *IC fetch* controls may activate the incrementer control input 20 (ADD 1), and may also, incidentally, increment position 19 at the same time as an *ICHO ADV* is activating incrementer control input 19. However, ICR20 is always zero whenever an ICHO ADV is made, due to the fact that an ICHO ADV is made only when advancing from the B register to a the A register, and bit 20 equals zero when the B register is in use. Therefore, there can be no *carry into* position 19 of the incrementor during an ICHO ADV. It follows that during an ICHO ADV. incrementor sum positions 0–19, 23 are the correct bits for updating the ICHO even if IC fetch addresses are being generated. Incrementer parity bit P1 16–23, which is generated by predicting the effect of incrementer control input 19 on the input parity, is the correct parity for the updated ICR, and therefore is gated back to ICR 16–23.

When updating the ICLO, the quantity to be updated should be taken from the fully advanced previous ICR value. However, it is possible for an ICHO ADV to coincide with a "good" or "last" T1 cycle. In this case, the ICHO is being advanced for one update at the same time as the updated IC LO is being set into the GSR for the next update. This generates no problems (because of the partial incrementer to ICR gate) except for the setting of the "corrected parity" into the GSR. Since the parity to be modified in the gate select adder has not yet been set into the ICR, the parity is taken directly from P1 16–23 of the incrementer output. Thus the "corrected parity" is set correctly at TON T2 for transfer to the ICR P16–23 on the next I to E transfer.

The advancing of the IC high order during the first cycle of E time creates problems with the execution of only two instructions. These are the load address instruction (LA) and the load PSW instruction (LPSW). In LA, the E unit makes use of the incrementer to transfer the effective address from the H register to the K register. The transfer is made on the second E time cycle, instead of the first, in order to avoid conflict with an ICHO ADV. In LPSW, there is a possibility that an ICHO ADV will gate the incrementer output into the ICR at the same time that the J register is being gated into the ICR by the instruction execution. To avoid this duplicate gating, the IE unit which controls the load PSW operation blocks the INCR to ICR gate whenever the PSW is being loaded from the J register.

(11.4.1) INTERRUPTION EFFECT ON IC ADVANCING

If an interruption occurs, the PSW which is stored must contain the address of the next instruction. There are two types of interruptions, E interruptions and I interruptions. E interruptions take place after the last cycle of instruction execution. This class includes the majority of interruption types. I interruptions take place at the I toE transfer in place of normal instruction execution. It is possible for an E interruption and an I interruption to occur simultaneously. In this case the E interruption is processed and the I interruption is suppressed, due to the fact that the E interruption relates to a prior instruction.

In the case of an E interruption, the ICR has already been advanced to the next instruction. Therefore, the I to E transfer of the next instruction is blocked from having any further effect on the ICR, the IC HO ADV trigger or the PSW length code. In the case of an I interruption, the ICR must still be advanced to the next instruction. At the time of the I to E transfer, ICR20–22 is advanced normally, IC HO ADV is turned on, if required, and the PSW length code (ILC) is set.

(11.4.2) EFFECT OF SS INSTRUCTIONS ON IC ADVANCING

The ICR is advanced normally at the start of all SS instructions, which involve the VFL (variable field length) section of the system. However, during SS instructions the execution unit must alternately have access to the second and third half words or syllables, of the SS instruction. This is due to the fact that the first and second operand address functions are handled alternatively by the same fields of IOP, AA, etc. Access to these half words is obtained through special controls into the gate select mechanism. An example of SS instruction timing is shown in FIG. 266, in which a Move With Offset (MVO) instruction is taken as the example.

At TON T2 of SS instructions, the "SS CP" status trigger is turned on, providing an SS OP control signal. This latches the gate select pre-latch, thus holding bits 20–22 of the address of the SS instruction at the gate select adder input SSOP also inhibits the normal gating of the instruction format length (which indicates length) into the control side of the gate select adder. However, upon the occurrence of TON T2, GSR is updated in a normal fashion. At the I to E transfer the GSR is transferred to ICR20–22; an IC HO ADV can also take place if needed. Thus, the ICR is advanced for SS instructions as in other instructions, and the ICR thereby has the proper value for handling any interruptions during the SS instruction E time.

At TON T2, BLOCK ICM is turned on, and at the I to E transfer BLOCK T1M and BLOCK T2M are turned on. These three triggers guarantee that neither IC fetches nor I time of the next instruction can interfere with the SS execution, since further T1 or T2 cycles are blocked.

The VFL ADR trigger is turned on with I to E transfer in an SS instruction, the output of which, called NFG ADR, is used to set the output of the GSA into the GSR: an early B clock, timed to not overlap an A clock, is used to gate this transfer, and serves, in effect, as a latch, since the GSR is guaranteed not to change until after the ICLO has been set on the I to E transfer.

During execution of the SS instruction, the VFL unit has control over a special line called VFL ADR ADV, which provides an ADV 1 HLF WD (advance one half word) input to the GSA. Since SS OP is one, it follows that the address of the SS instruction is held (latched) at the gate select adder input by the gate select adder prelatch, and normal length code addition (under control of instruction formats) is suppressed. Thus with each early B clock, the GSR is either set with the address of the SS instruction (if there is no VFL ADR ADV) or is set to the address of the second half word of the SS instruction (if there is a VFL ADR ADV signal present).

The IOP register is set from the AB register by VFL ADR concurring with SS OP on every A clock. The SS instruction is still in the AB register because IC fetching is blocked during SS instruction executions. IOP is set according to the quantity which was placed in the GSR by the previous early B clock. Therefore IOP is loaded on every A clock with either the first two half words or the second two half words of the SS instruction, depending ultimately on the VFL ADR ADV line, SS CP gates the ICP D field and the general register addressed by the IOP B field to the addressing adder. Therefore, on the cycle after IOP is set, either the address resulting from the addition of the contents of GR B1 to the D1 field (or the contents of GR B2 plus D2) is available at the input to the SAR and the H REG, since the VFL apparatus has controls for setting the resulting address into the SAR or H REG as desired.

At the end of an SS instruction, the VFL THRU line is activated so that the I unit will return the controls to normal operation. VFL THRU turns off SS OP with an A clock, thus unlatching the GSA pre-latch. VFL now holds down the VFL ADR ADV line, and a line called VFL ADR & NOT (T1 or LCH) blocks the length code from entering the gate select adder. Therefore, ICR20–22 flushes through into the gate select adder from the GSA PRE-LATCH and is set into the GSR on the next early B clock. The GSR now contains the proper value for the next instruction. BLOCK T1M is turned off on the next A clock and T1 of the next instruction is turned on. BLOCK T2M, BLOCK ICM, and VFL ADR are all turned off whenever SAR is no longer needed by the SS instruction. However, when T1 turns on, VFL ADR & NOT (T1 or LCH) is disenergized and no longer blocks the length code input to the GSA. Therefore, a normal add is made in the gate select adder at TON T2.

(11.4.3) THE REPEAT INSTRUCTION FUNCTION

The repeat instruction function (called REPEAT INST hereinafter) is designed to enable the continuous execution of an instruction located in the left end of the A register. In order to utilize REPEAT INST it is necessary to first place the desired instruction in the left end of the A register.

All instructions may be processed in REPEAT INST mode except branches, LPSW or XEQ. Also, interruptions or IC recoveries may not be taken while in REPEAT INST. Any of the above exceptions initiates instruction fetches to A and B, thus destroying the instruction being repeated. A steady MC REPEAT INST signal suppresses the following gates in the gate select mechanism:

(1) ICR20–22 TO GATE SELECT ADDER INPUT.
(2) Length code to gate select adder input.
(3) GT GSR TO ICR.

REPEAT INSTR AND NOT VFL ADR holds the gate to the GSR open continuously.

Except during SS instructions, the suppression of gating forces zeros to be flushed into the gate select adder. The zeros are set into the GSR because of REPEAT INST and NOT VFL ADR. The GSR holds zeros at all times and thus continuously selects the first halfword in the A register. At no time is the GSR able to make an ordinary advance. The gate back to ICR20–22 is suppressed in order to prevent setting the ICR with incorrect parity. If the original parity in the ICR was correct, it will remain correct throughout the operation of REPEAT INST.

During SS instructions VFL ADR is on and therefore REPEAT INST and NOT VFL ADR no longer sets the GSR. The SS controls now operate and are able to utilize the gate select mechanism in the usual manner during instruction execution. Upon completion of the SS instruction, zeros are returned to the GSR.

Since the GSR continuously indicates all zeros, thereby specifying the first halfword of the A register, neither the A REG nor the B REG can be exhausted, and so no IC fetches are needed during REPEAT INST.

(11.5.3) INSTRUCTION FETCHING (11.5.1) GENERAL

In the instruction counter apparatus, the interlocks between IC advancing and IC fetching are indirect in nature. Advancing of the IC and fetching of instructions take place at times which are not closely synchronized. In order to generate correct IC fetch addresses the instruction fetching mechanism monitors the ICR. On the basis of the ICR and the loaded status of the AB register the ICR is modified in the incrementer to obtain an instruction fetch address.

Seven rules of IC fetching, which are discussed in detail in following sections, are used in providing IC fetch control.

(11.5.2 RULE 1) ICP LOADED RULE

In order to turn on T2 of an instruction, all halfwords (or syllables) of the instruction must have been in IOP for at least one "good" T1 cycle. The GSR is set with bits 20–22 of the instruction address no later than the cycle preceding the start of T1. The GSR is set with an A clock for normal ICR advancing; but in other cases, such as at the termination of SS instructions or branching, the GSR is set with an early B. In either case, the GSR output has at least ¾ cycle to select a gate from AB to IOP. Any words returning to A or B are loaded with a late BR clock and an advance from BCU. BCU generates an A advance to gate in A and a B advance to gate in B. The contents of A or B have, at the very least, ¼ cycle to get to IOP. Usually, however, the required instruction will have been available in the AB register for a number of cycles.

On the AR clock immediately following the late BR clock on which a word is returned to the A or B register, the trigger A LOADED or B LOADED, respectively, is set. The loaded triggers are set by the same logic which gates in the data to AB. A LOADED stays on until the last instruction is removed from the A register. B LOADED is treated similarly. A LOADED and B LOADED indicate when the A register and B register, respectively, contain unprocessed instructions. With the start of every T1 cycle, IOP is set from the output of the selected AB gate.

The line IOP LOADED must rise before T2 can be turned on. This line, which indicates when an unprocessed instruction is available at the output of the AB ORs, indicates that the instruction being sensed in A or B is complete in only A or B, respectively.

GS20, GS21 and GS22 are positions of the GSR. P0 and P1 are positions of the selected word from the AB registers. P0 goes to IOP0 and P1 goes to IOP1. The above line is lathced with a not B clock and is then used to condition TON T2.

An explanation of the above line follows. If both A and B are loaded, then certainly a good instruction is available in IOP no matter which AB gate is selected. If the instruction selected is contained entirely with the A register and A is loaded, then again a good instruction is available in IOP. The instruction addressed is entirely within the A register if GSR position 20 is zero and if none of the following are satisfied:

(1) The instruction starts at the last halfword of a register (GS21=1, GS22=1) and is not an RR instruction.

(2) The instruction starts in the last half of a register (GS21=1) and is an SS instruction (i.e., if P0=1).

Exactly analogous reasoning holds for the B register.

The line IOP LOADED is latched with a not B clock because of a problem arising during single cycling. A fetch may return to A or B on a running B clock a few cycles after the last controlled clock pulse has been given. IOP is loaded on an A clock however. If T1 is on and if the turn on of T2 is waiting for IOP LOADED, it is clear that this line must not be allowed to rise before IOP has been set. Immediately upon setting the A (or B) register and the associated A LOADED trigger (or B LOADED trigger), the raw line IOP LOADED rises. The line IOP LOADED LCH does not rise because it was latched after the last B clock. IOP is set with the next A clock and IOP LOADED LCH rises with the next corresponding B clock. Therefore a "good" T1 cycle will occur before T2 is turned on by IOP LOADED LCH.

(11.5.3 RULE 2) EMPTY RULE

If an instruction is emptying the A register or B register and an IC fetch is therefore required, the A LOADED trigger is turned off an TON T2. Though this section discusses the A register, an exactly analogous discussion holds for the B register. The logic, called NOT A LOADED, for recognizing the last instruction in A is GS20 (GS20 for B register) and any of the following:

(1) GS21 and ID RR.
(2) GS21 and GS22.
(3) GS22 and IDSS.

IDRR is the ANDed output of IOP0 and IOP1. IDSS is the ANDed output of IOP0 and IOP1.

The first term covers any two or three halfword instruction starting in the last half of A. The second term covers any instruction starting in the last quarter of A. The last term covers SS instructions starting in the second quarter of A.

NOT A LOADED (ANDED with no outstanding fetch to A) is the normal method for indicating the necessity for a fetch to A. If IC fetches are not blocked and if a fetch to B does not have priority a fetch request to A is made on the next A CLK. As explained previously, A LOADED is turned on when the fetch returns to A. However, an auxiliary trigger ICAM (instruction counter fetch to A memorized) is turned on when the BCU accepts the request to A. ICAM (along with its turn on) serves to indicate an outstanding fetch. ICAM (along with its turn on) prevents A LOADED from indicating a fetch required condition for A. Accept is applied thereto in anticipation thereof.

If an instruction is emptying the A register, the conditions which turn off A LOADED at TON T2 also enter directly into the fetch request circuitry. If IC fetches are not blocked and if a fetch to B does not have priority, a fetch request to A is then made at TON T2. For a number of instructions, including most RR's, this anticipation circuitry allows early IC fetches to be made.

It should be noted that if the system is in Repeat Instruction, then the GSR never leaves the first halfword of the A register. Therefore, no instruction buffer is ever made empty and no IC fetch is ever made. Thus the contents of the instruction buffers remain unchanged throughout Repeat Instruction.

(11.5.4 RULE 3) IC FETCH RULE

If either A or B is empty and if IC fetches are not blocked, an IC fetch request is sent to the BCU, and remains in control until an accept is received, or until IC fetching is blocked. If both A and B are empty, the priority circuitry described in the next section (IC Address Rule) determines which register is first requested. This section discusses fetches to the A register and, as before, an analogous discussion holds for the B register.

At the same time as an IC request is made to BCU, the trigger IC AFE (Instruction counter fetch to A execute) is turned on. On any A clock on which an IC request is made SAR is set from the incrementer. This is controlled by NOT BLK ICM, and is described under the Block IC section. IC AFE turns off unless turned on. It therefore is turned on each cycle a request for A is made, and goes off on any cycle that a request for A is not made. IC AFE has two functions. First of all it is OR'ed with IC BFE to indicate that the fetch is to be returned to the A or B register. If a fetch to AB is indicated, BCU examines bit 20 of SAR and sets the A return trigger in BCU if SAR20=0, and sets the B return trigger in BCU if SAR20=1.

When the accept is received from BCU, IC AFE steers the accept to turn on IC AFM. IC AFM is the "IC fetch to A outstanding" trigger. IC AFM remains on until the word is returned to the A register. At this time A ADV turns off IC AFM and turns on A LOADED.

The full logic for generating the "A empty" condition of the previous section can now be described. A appears empty to the fetch logic if the following expression is satisfied: NOT A LOADED and NOT IC AFM and NOT IC AFE or NOT ACCEPT or the combination of +ID A EMPTY.TON T2.

Figures 214, 215:
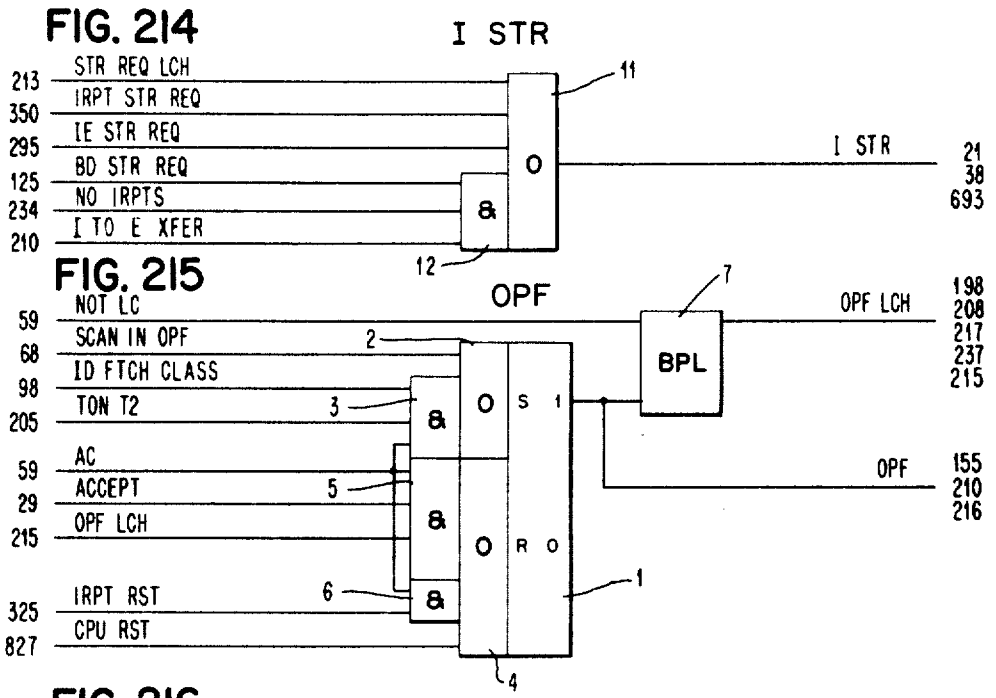

The first term represents the normal empty condition and the second term is the anticipatory term. Notice that NOT IC AFE or NOT ACCEPT is included in the first term. This quantity makes the register look full immediately upon receipt of the accept for an IC fetch to A. Therefore IC AFE will not stay on after the accept has been generated. The normal fetching is shown in FIG. 215.

If the B register is empty at the same time as a fetch to A is being made, it is possible that the fetch request to A is followed by a fetch request to B. The request to B in this case occurs on the cycle following the cycle of the accept for the first fetch. The request to B is not made on the cycle of the accept because the address circuitry (see next section) is not able to respond until IC AFM is turned on. This causes no deterioration in performance because of the two cycle bus rate of BCU.

If the CPU is being single cycled, the sequencing of the IC fetch sequencers is slightly modified. At this time, single clock pulses are generated upon each depression of the start button. All running clocks continue to operate, however, in the normal high speed manner.

PULSED ACCEPT is a 200 ns. latched line which stradles the AR CLK following the start of storage activity. ACCEPT rises at the same time as PULSED ACCEPT and falls after the first A CLK following the start of storage.

The request trigger in BCU (CPU REQUEST) turns off with each A CLK unless turned on by a request from CPU at a time when ACCEPT is not on. The request trigger is also turned off by PULSED ACCEPT AR CLK. Since single cycle pulses can be issued at a very slow rate only, it follows that any word requested on one A CLK will be returned to the CPU before the next A CLK. It also follows that the BCU request trigger is turned off by PULSED ACCEPT and cannot be turned on with the next A CLK.

Figure 218:
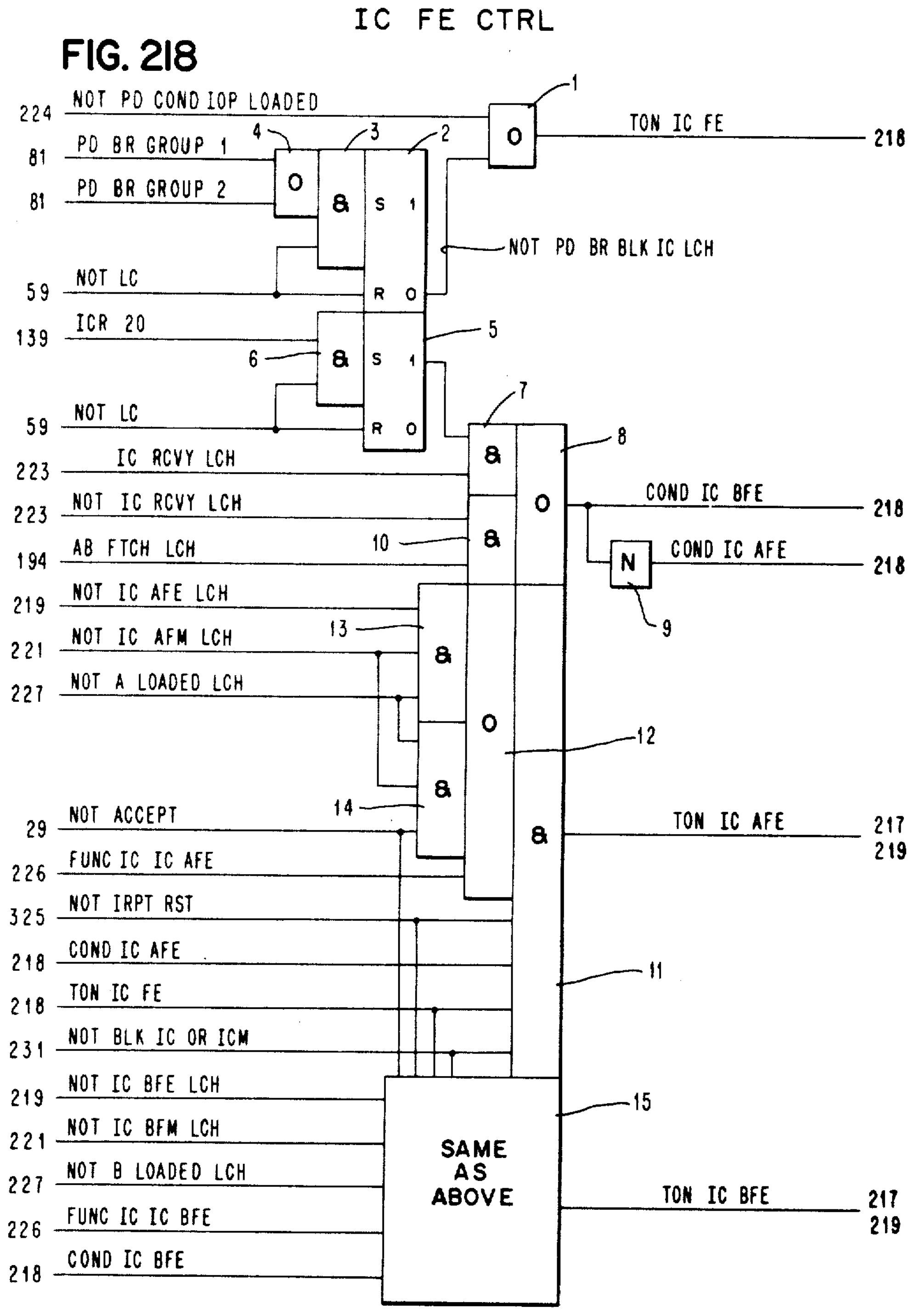

IC AFE is turned on and off with an A CLK. IC AFM is turned on and off with an AR CLK. A LOADED is turned on with an AR CLK and is turned off with an A CLK. Therefore, if an IC request is made while single cycling, IC AFE will turn on and stay until the next A CLK. IC AFM will turn on and off at high speed, and A LOADED will turn on when IC AFM turns off. This is shown in FIG. 218.

(11.5.5) CHART OF IC FETCH ADDRESS GENERATION

| ICR POSITIONS | | | AE & NOT BE CTRL | | REG | | AE & BE CTRL | | REG | NOT AE & BE CTRL | | REG | | NOT AE & NOT BE | | | |
|---|---|---|---|---|---|---|---|---|---|---|---|---|---|---|---|---|---|
| 20 | 21 | 22 | 19 | 20 | | | 19 | 20 | | 19 | 20 | | | 19 | 20 | | |
| 0 | 0 | 0 | 0 | 0 | A | R | 0 | 0 | A | 0 | 1 | B | | 0 | | A | R |
| 0 | 0 | 1 | 0 | 0 | A | R | 0 | 1 | AR | 0 | 1 | B | | 0 | 0 | A | R |
| 0 | 1 | 0 | 1 | 0 | A | | 0 | 1 | B | 0 | 1 | B | | 1 | 0 | A | |
| 0 | 1 | 1 | 1 | 0 | A | | 0 | 1 | B | 0 | 1 | B | | 1 | 0 | A | |
| 1 | 0 | 0 | 0 | 1 | A | | 0 | 0 | B | 0 | 0 | B | R | 0 | 0 | B | R |
| 1 | 0 | 1 | 0 | 1 | A | | 0 | 1 | B R | 0 | 0 | B | R | 0 | 0 | B | R |
| 1 | 1 | 0 | 0 | 1 | A | | 0 | 1 | A | 1 | 0 | B | | 1 | 0 | B | |
| 1 | 1 | 1 | 0 | 1 | A | | 0 | 1 | A | 1 | 0 | B | | 1 | 0 | B | |

AE=Not IC AFM or A loaded.
BE=Not IC BFM or B loaded.
CTRL 19=Add 2 input to incrementer Pos. 19.
CTRL 20=Add 1 input to incrementer Pos. 20.
A, B indicates the register to which the fetch is made.
R indicates inputs cannot occur and entry is therefore redundant.

(11.5.6 RULE 4) IC ADDRESS RULE

Whenever BLK ICM is off (that is, whenever IC fetches are not prevented by BLK ICM) or the ICR is gated to the incrementer and an increment amount is added into positions 19 and 20, in dependence upon the empty status of the A REG and the B REG, the amount to be added to the ICR is shown in the chart of the preceding section, which also indicates whether the generated address is for the A register or the B register. This chart does not illustrate branch fetches or the first IC fetch during an IC recovery, but it does indicate how addresses are generated for any other IC fetch situation. AE is equal to the expression NOT A LOADED & NOT IC AFM, and BE is NOT B LOADED & NOT IC BFM. AE or (BE) therefore is an unlatched line which is related to the need for a fetch to A or (B). AE and BE are used in conjunction with ICR20–22 to generate the increment amount for the incrementer and are therefore the five coordinates of the chart. Whenever an R appears in the table, that entry then represents a situation which can never happen if the machine operates correctly. An analysis of the various entries now follows:

Consider those entries of NOT AE & BE for which ICR20=0, which means that current fetching is from the A register, that A does not need to be fetched, and that B does need to be fetched. Therefore good instructions in A are currently being processed, but the B register must be fetched if instruction processing is to continue to proceed without interruption. Since instructions are fetched sequentially and the ICR specifies the address of an instruction in the A register, it follows that ICR bits 0–20 of the proper address for a fetch to B can be obtained by adding a 1 into position 20 of the ICR. Since SAR bits 21–23 are ignored by the BCU. No problem is created by the fact that the output of incrementer positions 21–23 is set into SAR along with the rest of the address.

If ICR20=0 in the case of AE & NOT BE, then A must be fetched and B does not need to be fetched. This situation can arise while processing the last instruction in the A register. At least one cycle occurs after the AE condition has been recognized and before the ICR has been updated to the B register.

The case where AE & NOT BE obtains with ICR20=0 cannot occur until at least one good T1 cycle has been executed on an instruction located in the A register. This can be demonstrated by considering the situation with ICR20=0 and AE, and with no instructions in the A register yet processed: the ICR has therefore just left the B register, thereby emptying that register without any fetches being made. If the AE condition exists, then the A register has necessarily been empty for an extended period. The situation is now ICR20=0 with AE & BE, and the A register is provided with a fetch at this time. Therefore, the situation now becomes ICR20=0 NOT AE & BE. Thus ICR20=0 with AE & NOT BE cannot occur until an instruction in A is processed.

If the ICR addresses the first halfword of A, then A cannot be emptied by use of a single instruction in A because it would take a four halfword instruction to empty A and no instruction exceeds three halfwords. If the ICR addresses the second halfword of A then A can be emptied only through an SS instruction. For SS instructions, however, IC fetching is always blocked during the period between the recognition of the empty condition and the advance of the ICR and again this situation cannot occur. Therefore the top two entries in the situation now being considered are marked with an R (for redundant). If the third or fourth halfwords are specified, since B is already loaded, it is necessary to fetch the A register two storage words ahead of the ICR. Therefore a bit is added to the ICR in position 19.

If ICR20=0 with AE & BE then both A and B must be filled. If the ICR addresses any but the first halfword of A then the AE condition occurs as just described for ICR20=0 with AE & NOT BE. The only difference arises from the fact that the previously emptied B register has not yet been filled. Therefore the fetch will be for the B register, the address for which is obtained by adding a bit into position 20 of the incrementer. Again, the situation for the ICR addressing the second halfword of A is redundant because SS instructions block the IC, and only an SS instruction is long enough to exhaust the A register.

If the ICR addresses the first halfword of the A register with AE & BE, then there are no loaded instructions available in the instructions buffers. Before the instruction at the address specified by the ICR can be executed, a new instruction must be fetched to the A register. Therefore the ICR is used as a fetch address without any modification.

The entries for ICR20=0 with NOT AE & NOT BE have meaning because a fetch request can be made at the same moment as A LOADED is turned off. Therefore it is necessary to generate a correct fetch address in anticipation of an empty condition. (An example of this situation is shown in FIG. 268.) This column is the same as the column for ICR20=0 with AE & NOT BE because the only new empty condition which can be generated while ICR20=0 is the A empty condition.

All of the foregoing reasoning holds for entries in the chart for which ICR20=1, with the exception the AE and BE must be interchanged in the explanation.

As described under ICR Advancing, hereinbefore, the generation of IC fetch addresses is not inhibited if there is an IC high order advance. At this time the ICR address is incorrect because a carry from the ICR LO must be entered into position 19. While gating the ICR to the incrementer, IC HO ADV forces a one into position 19. If an IC HC ADV is taking place when bit 20 must be zero, and ICR20–22=000, 001, or 010. If ICR20–22=010 when an IC fetch occurs, then an SS instruction is being executed and IC fetches are necessarily blocked by the SS execution. If ICR20–22=000 or 001 then the chart in the preceding section indicates that either a 0 or a 1 must be added into position 20 of the ICR. If the entry is 0, then the correct updated ICR (Cld ICR+1 in position 19) for the IC HO ADV is obtained at the output of the incrementer for IC fetching. If the chart entry is 1, then (Cld ICR+1 in position 19+1 in position 20) is obtained at the output of the incrementer, and this is the correct value for making an IC fetch, so that, as described under ICR advancing, hereinbefore, bits 0–20, 23 of the incrementer contain the correct updated IC HO value for all cases and are therefore gated back into the ICR at the end of the ICR HO ADV.

Thus, during IC HO ADV, IC fetch addresses may also be computed and no special interlocks are necessary to inhibit the IC fetching during this time. (An example of this situation is shown in FIG. 269.)

(11.5.7 RULE 5) BLOCK IC RULE

Many instructions block IC fetches in order to insure that no interference occurs in the usage of SAR or the incrementer. For all instructions which block the IC, the trigger BLOCK ICM is turned on by TON T2, concurring with ID BLK IC. IC fetch requests and the gating of ICR to SAR are inhibited by TON T2 and ID BLK IC or BLOCK ICM LCH. The ICR, along with the appropriate increment amounts, (ADD 1 OR ADD 2) is gated into the incrementer for IC fetch address computation whenever BLOCK ICM is off. When BLOCK ICM is turned on, this gating is suppressed.

The timing for BLOCK ICM is shown in FIG. 269 and FIG. 270.

The uses of BLOCK ICM by instruction classes are now described.

(a) *One fetch class.*—For this class an operand is fetched at TON T2. During the fetching of the operand, the IC controls are denied access to SAR. Upon generation of ACCEPT (which indicates that the fetch request is being honored by storage), the IC fetch mechanism is again allowed to operate. ID ONE FETCH CL (class) and OPF and ACCEPT and NOT TON BLK, ICM, turn together BLK ICM off. An IC fetch address is then generated which can be set into SAR at the next A time. This is the earliest time that the BCU can accept another storage request because of a two cycle bus rate, described in D–0036. Therefore, the I unit controls are able to operate the BCU at its maximum rate in this situation, if necessary.

The instructions which belong one fetch class are most of the external fetch instructions for which no storage requests are made during E time. These include instructions such as A, SD, DE and TM.

For the following instructions the execution unit makes use of SAR for storage fetches and stores:

(b) *Store/fetch execution class.*—STH, STC, CVD, ST, STD, STE, SSK, ISK, RD, STM, MVI, NI, OI, XI, LM; SS instructions therefore, the IC controls are inhibited from making any requests until the last storage request of E time has been accepted. At this time the execution unit, or the I unit controls in the case of SS instructions, generates a signal on a TOF BLK T2M ON ACC LINE. This line, which conditions the turn off of BLK T2M is also used to condition the turn off of BLK ICM. The condition which actually turns BLK ICM off, except for SS instructions, is TOF BLK T2M ON ACC together with ACCEPT and NOT TON BLK ICM. For SS instructions, NCT SSOP and VFL ADR with either NOT STORE REQUEST or ACCEPT combine to turn off BLK ICM. As described under SS instructions, hereinafter, SSOP and VFL ADR occur together at the end of an SS instruction. At this time, if there is no store request outstanding, BLK ICM is turned off immediately. If there is a store request outstanding, BLK ICM is turned off upon receipt of the ACCEPT.

(c) *Branches.*—IC fetches are blocked until the end of branch instructions, and the Execute (XEQ) instructions, which provides the branch controls with access to both the incrementer and SAR.

The turn off conditions for BLK ICM are described with respect to branching in D–0037.

(d) *BALR* (*R2*=0), *LA*.— For these instructions (and certain instructions of the Store Fetch class), instruction execution makes use of the incrementer. Therefore, BLK ICM is turned on to prevent IC fetch address generation from interfering with the instruction execution use of the incrementer. The E unit turns off BLK ICM when through with the incrementer.

(e) *Load PSW.*—BLK ICM is turned on for the Load PSW instruction because a fetch is made at TON T2. It is turned off when the new PSW has been loaded and an IC Recovery has been started.

(f) *Diagnose.*—BLK ICM is turned on for the diagnose instruction because the IE Unit makes a fetch during E time. BLK ICM is turned off by a sequencer (IE3) which in turn is turned on by a PROCEED signal from the PDU. This insures that the IC fetches will always start at a known time after a Diagnose.

Interruptions.—BLOCK ICM is also turned on during interrupt routines even though the turn on of BLOCK ICM does not itself block IC fetches, in this case, because the interrupt lines themselves directly block IC fetches at this time. BLOCK ICM is turned off when an IC recovery is started.

Resets.—BLOCK ICM is turned on by a CPU reset: if the reset resulted from an IPL or a machine check, BLOCK ICM is turned off at the end of the appropriate routine; if the reset resulted from a manual reset, BLOCK ICM is turned off by SET IC or SET PSW.

(11.5.8 RULE 6) PRE BLOCK IC RULE

Whenever the GSR is advanced to select a new instruction, that new instruction (if in AB) becomes available at the output of the eight way OR off the AB register. If certain branch instructions are decoded at this point, then IC fetching is blocked. An example of this block is shown in FIG. 272. This block does not prevent generation of IC fetch addresses and their placement into SAR, but only inhibits the IC fetch request line to BCU. The combination which generates the block is IOP LOADED and together with one of the following pre-decode outputs: BALR, BAL, BCTR, BCT, XEQ, BXH, or BXLE.

The effect of this rule is to block unnecessary IC fetches before branches which have a high probability of being successful branches. Thus, storage activity just before the branch fetch is decreased by blocking the IC fetch. This increases the likelihood that the branch fetch can be made without running into storage conflicts. BCR and BC are excluded from this block because these are not considered to be branches with a high probability of success.

(11.5.9 RULE 7) IC FETCH PRIORITY RULE

The action of the previous rules may be summarized as follows: the empty status of a register is recognized at TON T2 of the instruction emptying that register. IC fetch requests are then made to that register unless some instruction in the process of execution generates a block to inhibit IC fetching. This block may occur through the action of BLOCK ICM or through the action of pre block IC. IC fetch requests may or may not be accepted by BCU. A fetch request which has not yet been accepted by BCU may be cancelled at any time by a block generated by a new instruction. It is therefore possible for the IC fetch to be made very early, and it is also possible for IC fetches to be block out continuously by instruction executions until both registers are emptied. If both registers are emptied, all IC blocks are definitely removed, and both registers are fetched in proper order.

It is the nature of these rules to give IC fetches low priority, except when both A and B are empty. Whenever an IC fetch request is recognized to cause interference with instruction execution, the instruction execution wins out. This has two advantages: (1) IC fetches cause minimum interference with instruction executions; (2) if IC fetches are not forced prematurely, they will be recognized to be unnecessary if a successful branch is encountered before both registers are emptied, and are thus avoided. Therefore, an unnecessary storage cycle is not taken. However, for normal instruction sequences (i.e., sequences not containing successful branches) a net performance loss is suffered if both registers are allowed to become empty.

With both registers empty it is necessary to make an IC fetch while the I unit remains idle. This results in a significant number of lost cycles. It is better to take a smaller penalty by forcing IC fetches at some earlier time when instructions are still available for processing. Therefore this rule—IC Fetch Priority—is incorporated to allow IC fetches to be made as late as possible while minimizing the chances of the I unit being idled by lack of instructions. The action of this rule is accomplished by blocking TON T2 at times which are described in the following. An example of usage of this rule is shown in FIG. 269.

TON T2 is blocked by the combination of not a branch or RR instruction from the I decode together with both GSR bits 21 and 22 present, together with either GSR20=0 & B FTCH REQD GSR20=1 & A FTCH REQD, where A FTCH REQD=NOT IC AFE or NOT ACCEPT, NOT IC AFM and NOT A LOADED. With a FTCH REQD, note that no block of TON T2 can be generated by this rule *until* the GSR addresses the second, third or fourth halfword of B, since there are ample instructions available in B (or in A and B together) until this time; thus forcing IC fetches prematurely is avoided.

If the GSR addresses the second, third, or fourth halfword, and the instruction is an RR instruction, then again no block is generated. A block is not generated because no interference is possible between RR instructions and IC fetches (except for ISK, SSK, and the branches). In all probability the IC fetch will be made without any special block to hold up RR execution most of the time.

If the GSR addresses a branch instruction (RS, RX branch, or RR branch with $R2\neq 0$) then IC fetching is not given special priority. This is for the same reason that the Pre-block IC Rule was incorporated: it is undesirable to make IC fetches which might prove unnecessary before a branch instruction. If branches were not excluded from bringing up IC fetch priority there would be a conflict between these two rules.

If the GSR addresses any instruction which starts in the last three halfwords of B and which is neither a branch nor an RR instruction, and A is exhausted, then IC fetch priority holds up TON T2 until a fetch to A has been made. RX instructions are assumed to be the instructions with the highest rate of occurrence; it follows that if A is empty, an instruction starting in the second, third, or fourth halfwords of the B register is probably the last complete instruction available in the buffers. It is therefore another feature of this rule to force any unmade IC fetches before TON T2 of the probable last instruction in the IC buffers. As a result, there is an excellent chance that a new instruction will be available in the buffers when needed for execution.

(11.6) *Instruction fetching—special cases*

(11.6.1) PROGRAM STORE COMPARE

If a store is made by the CPU to an address which has been prefetched to the AB register, it becomes necessary to re-fetch the storage word for that register. Whenever a store is made to either the storage word addressed by the ICR or to the next adjacent storage word, the storage word is refetched. To sense this condition, two comparisons are provided which enable comparison between the store address and the ICR, and between the store address and the address next to that of the ICR. Whenever a store takes place (except stores made by interruptions) these comparisons are made without regard to whether or not the instruction buffers have been loaded. If the addresses do compare, an IC Recovery is taken as an E time interruption and the AB registers are refetched.

Whenever a CPU store (except an interrupt store) is made, the STR REQ latch is turned on. This latch gates the ICR into the incrementer and adds one into position 20; BLOCK ICM is always on at this time.

At the time that a store address is set into SAR, the address is also set into the H REG. This is compared H register. A full compare of the H register bits 0–20 with ICR bits 0–20 and a full compare of H register bits 0–19 with the incrementer output bits 0–19 are made. The second compare can be modified to include bit 20 in the event that no IC HO ADV is being made. This is illustrated in the following chart:

BITS COMPARED

| COMPARE | NCT IC HO ADV | IC HO ADV |
|---|---|---|
| H: ICR | 0—20 | ---------- |
| H: INCR | 0—20 | 0—19 |

Store request gates:
ICR to INCR
+1 to INCR position 20
IC HO ADV gates:
ICR to INCR
+1 to INCR position 19 if all bits in any of the indicated comparisons are satisfied when store request is on, the trigger *prg sto cmp* is turned on.

If the IC HC ADV is off, bits 0—20 of the H register is compared to bits 0–20 of the ICR and to bits 0–20 of the incrementer output. Bits 21–33 are ignored because they are not relevent to external storage addresses. If either compare is satisfied while STO REQ is on, PGR STR COMP is turned on and an IC Recovery will result at the end of the instruction. If IC HO ADV is on, the ICR is necessarily two full storage words behind its proper value. Therefore, the H:ICR compare is blocked by IC HO ADV. Since 1 is added into incrementer position 19 by the IC HO ADV and 1 is added into incrementer position 20 by the STR REQ it follows that the incrementer output is one full storage word ahead of the correct ICR value. Whenever IC HC ADV is turned on, bit 20 of the ICR is necessarily zero. With bit 20=0, if H REG bits 0–19 are compared to incrementer outputs 0–19 the following comparisons are effectively generated:

(1) 0–20 of H to 0–20 of the "correct" ICR.

(2) 0–20 of H to 0–20 of the next address following the "correct" ICR.

If the H:INCR comparison is satisfied, PGM STR CMP is again turned on.

(11.6.2) INTERRUPTION ENTRY

Whenever an interruption is detected and a signal appears on one of the three interruption lines into the I unit sequencing controls, IC fetches are immediately blocked. The IC fetch controls may still attempt to make IC fetches, but since no storage unit can be started, it is impossible for the request to be acknowledged. All IC fetching is terminated by the first interruption sequences, and the IC controls are reset and BLOCK ICM is turned on (unless the interruption is an IC Recovery only).

(11.6.3) IC RECOVERIES

Figures 222, 223:
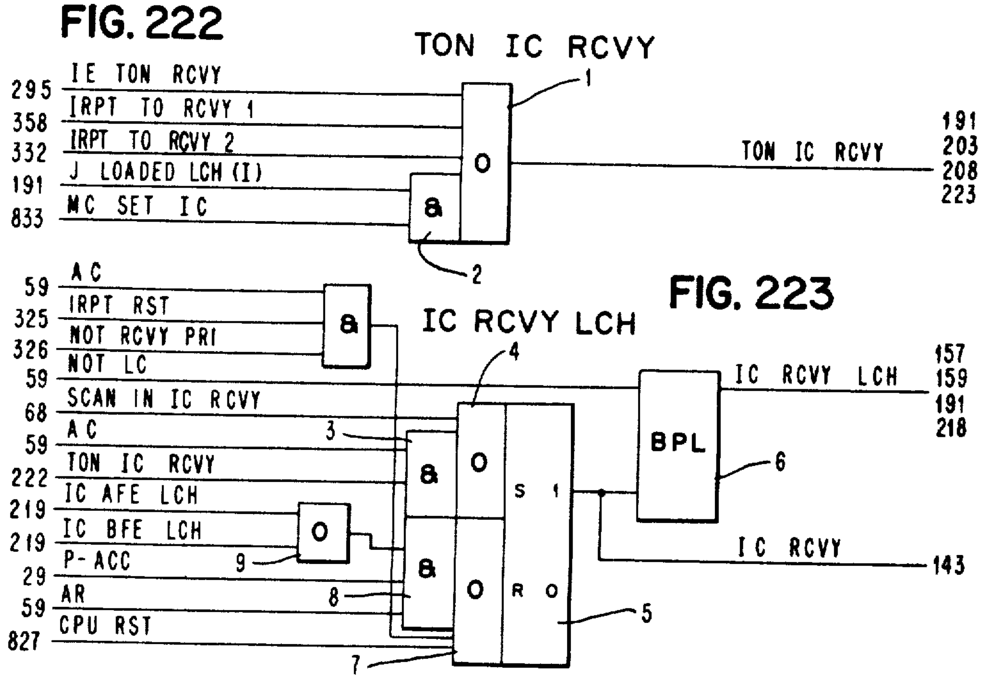

During an interruption routine, the instruction LPSW, or the manual operations SET IC or SET PSW, a new value is placed into the instruction counter. It is therefore necessary to refetch the A and B registers. At the appropriate time after the IC has been loaded, a signal is generated by the unit loading the IC. This signal starts an IC recovery. A typical example of an IC recovery is shown in FIG. 222). This signal resets A LOADED, B LOADED, BLOCK ICM, and BLOCK T1M; and sets IC RECOVERY.

IC RECOVERY blocks the control inputs into the gate select adder and gates the gate select adder into the GSR at A time. Thus the GSR is correctly loaded for the first instruction.

IC RECOVERY prohibits the normal methods of generating IC fetch addresses and of establishing priority between the A and B registers. The ICR is gated directly through the incrementer to SAR. Since BLOCK ICM is off, an IC fetch request is now made. This fetch is from the location addressed by the ICR and goes to the instruction buffer indicated by ICR20.

IC RECOVERY finally resets J LOADED to insure that it is not left on if a previous instruction failed to reset it.

IC RECOVERY is reset by P–ACC with either IC AFE or IC BFE and an AR clock signal. Therefore IC RECOVERY turns off when the first fetch is accepted. The IC fetch controls now operate normally and fetch the next storage word for the second instruction buffer. T1 turns on one cycle after BLOCK T1M is turned off, and instruction sequencing now proceeds normally.

*(11.8) Instruction counter fetch control circuits*

The following sections are concerned with IC fetches, and more particularly with the control circuits which govern the operation of instruction fetches, and other related circuitry.

(11.8.1) E AND IE BUSY LATCHES (FIG. 212)

Figures 212, 213:
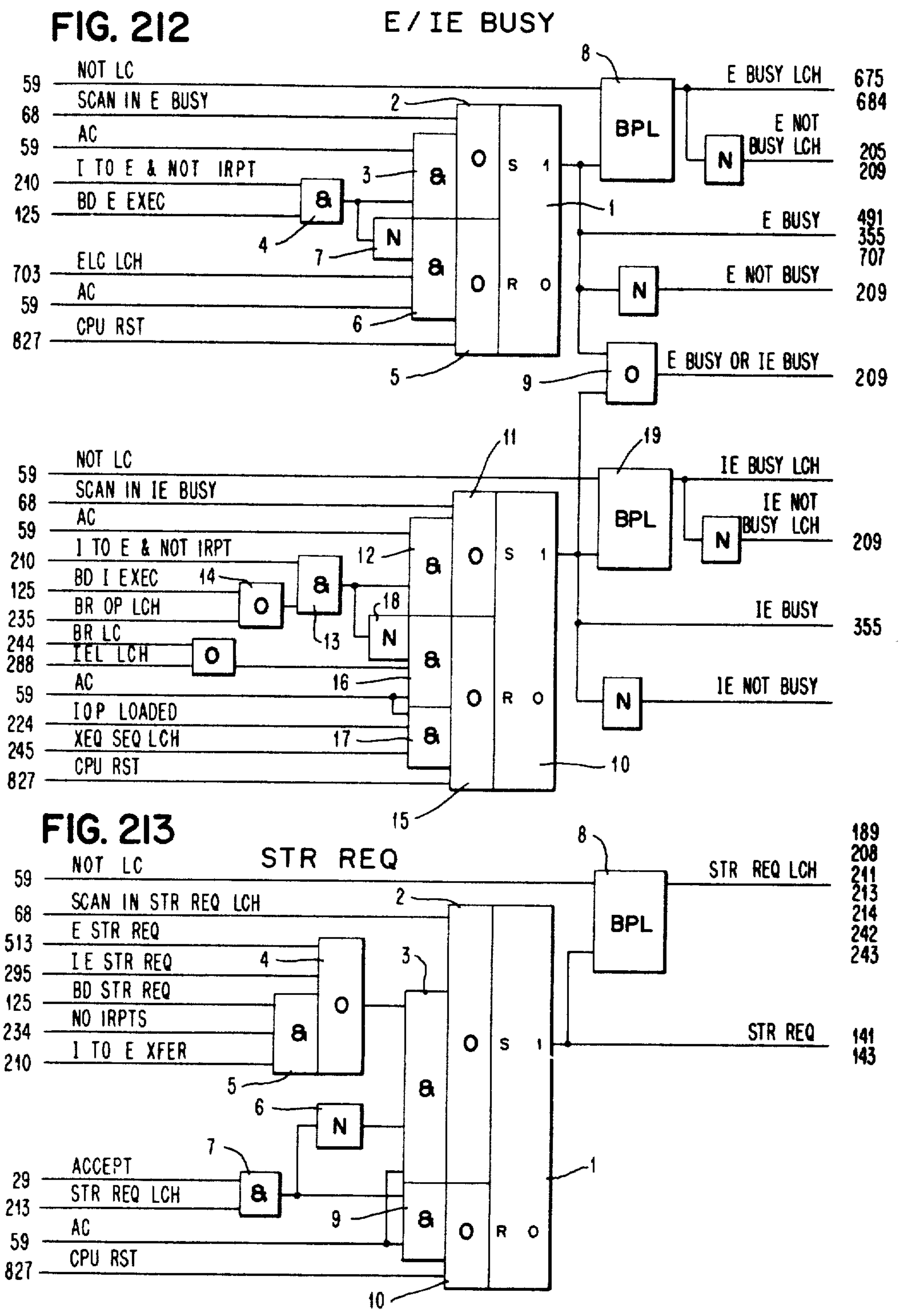

In FIG. 212 a signal is generated on the E BUSY line by a latch 1 which is set by an OR circuit 2 in response to a signal on a SCAN IN E BUSY line or in response to an AND circuit 3. The AND circuit 3 in turn is responsive to an AND circuit 4 which is operated at the I to E transfer when there is no interrupt and an excution by the E unit is required as indicated by a signal on a BD E EXEC line. The other input to the AND circuit 3 is a timing line which causes the circuit to operate at A time. The latch 1 is reset by an OR circuit 5 in response to a CPU reset signal on a CPU RST line, or in response to an AND circuit 6 which is operative at A time of a last E cycle provided there is an input thereto from an inverter 7. The AND circuit 6 responds to signals on the AC line and on the ELC LCH line so as to reset the latch 1 unless ELC occurs at the I to E transfer without an interrupt and another E execution is required, or as indicated by an AND circuit 4. The output of the latch 1 is applied to a bipolar latch 8 which reflects the setting of the latch 1 at not LC time, and thereby generates the signal on the E BUSY LCH line and the complement thereto. The E BUSY line is applied to an OR circuit 9 to generate a signal on an E BUSY OR IE BUSY line. The other input to the OR circuit 9 is the output of the latch 10 which is set by an OR circuit 11 in response to a signal on a SCAN IN IE BUSY line or in response to an AND circuit 12. The AND circuit 12 is operative at A time in response to an AND circuit 13 which in turn recognizes the I to E transfer without interrupt due to a signal on the I TO E & NCT IRPT line concurrently with the output of an OR circuit 14 which recognizes branch and IE functions due to the signals on the BD I EXEC and BR OP LCH lines. Thus, either a branch execution or an I execution will cause the setting of the latch 10. The latch 10 can be reset by an OR circuit 15 in response to a CPU reset or in response to one of two AND circuits 16, 17. The AND circuit 16 is operative at A time at the end of the last IE or BR cycle as indicated by signals on the AC line and on the IEL LCH line or BR LC line provided that there is an input from an inverter 18 from the AND circuit 13. Thus, as is true in the case of the latch 1, the latch 10 will be reset during the last IE or BR cycle unless a further IE or BR cycle is being called for. The AND circuit 17 is operative at A time when IOP is loaded and an execute sequence is being performed. The output of the latch 10 comprises the signal on the IE BUSY line, and a complement thereto, and is also applied to a bipolar latch 19 which is caused to follow the setting of the latch 10 at not IC time so as to generate a signal on the IE BUSY LCH line and the complement thereto.

(11.8.2) STORAGE REQUEST CIRCUITS (FIG. 213 AND FIG. 214)

In FIG. 213, a storage request signal is generated on a STR REQ line by a latch 1 which is set by an OR circuit 2 in response to a scan in signal on a SCAN IN STR REQ LCH line or in response to an AND circuit 3. The AND circuit 3 may be operated by an OR circuit 4 which in turn is operable in response to an AND circuit 5. The AND circuit 5 recognizes I to E transfer without interrupts where a storage request is indicated by the BOP decode circuitry, all as manifested by signals on the BD STR REQ line, the NC IRPTS line, and the I to E XFER line. The OR circuit 4 also responds to signals on a E STR REQ line and the IE STR REQ line. In order for the OR circuit 4 to cause the AND circuit 3 to set the latch 1, there must be a signal from an inverter 6 indicating that there is no current accept signal, and the storage request latch line has not been energized as indicated by an AND circuit 7. The AND circuit 7 responds to a signal on the ACCEPT line, and to a signal on the STR REQ ICH line, which signal is generated by a bipolar latch 8 that is set by the latch 1 at not LC time. Thus, once the latch is set, the bipolar latch 8 will become set and when an ACCEPT is returned from the BCU, the AND circuit 7 will block the AND circuit 3 and will also have its output applied to an AND circuit 9 which is operative at A time to cause an OR circuit 10 to reset the latch 1. The OR circuit 10 can also respond to a CPU reset signal on a CPU RST line.

In FIG. 214, an I unit storage signal is developed on an I STR line by an OR circuit 11 in response to an AND circuit 12 which in turn senses the I to E transfer without interrupt when a storage request is made (in the same fashion as the AND circuit 5 in FIG. 213), and which also can respond to storage requests from the IE unit or from interrupts, or to the output of the circuit of FIG. 213 on the STR REQ LCH line. Thus, the signal will be generated on the I STR line anytime the latch of FIG. 213 has been set; however, whether the latch is set by means of the AND circuit 5 or the IE or IRPT storage request, the OR circuit 11 (FIG. 214) will operate at the same time as the OR circuit 4 (FIG. 213), thereby anticipating the setting of the bipolar latch 8 by one cycle so as to provide the signal on the I STR line somewhat earlier than would otherwise be possible.

(11.8.3) OPERAND FETCH LATCH (FIG. 215)

In FIG. 215, an operand fetch signal is generated on a OPF line by a latch 1 which is set by an OR circuit 2 in response to a scan signal on the SCAN IN OPF line, or in response to an AND circuit 3 which is operative at A time in the cycle with TON T2 present, when the instruction is within the class of instructions which require a fetch as indicated by a signal on the ID FTCH CLASS line. The latch 1 is reset by an OR circuit 4 in response to either one of two AND circuits 5, 6 or in response to a CPU reset signal on the CPU RST line. The AND circuit 6 is operative at A time in response to a signal on the IRPT RST line. The AND circuit 5 responds at A time to the combination of the ACCEPT and CPF LCH, lines. The latch 1 will cause the setting of a bipolar latch 7 to reflect the setting of the latch 1 at not LC time, so as to generate a signal on the OPF LCH line.

(11.8.4) CPU RETURN TO AB/J (FIG. 216 AND FIG. 155)

Figure 216:
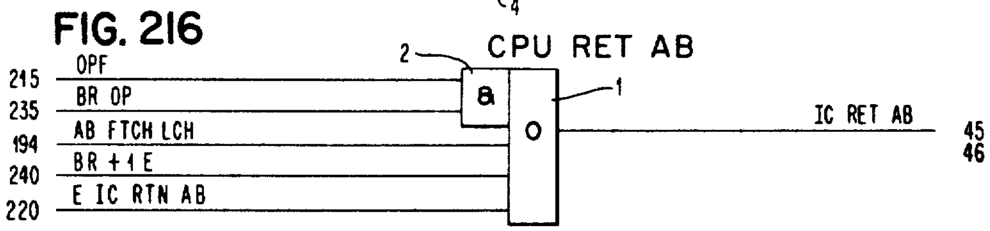

In FIG. 216, a signal indicating that a storage word is to be returned to the AB register in the CPU is generated on a CPU RET AB line by an OR circuit 1 in response to an AND circuit 2 which senses the presence of signals on the OPF line and the BR CP line. The OR circuit 1 also may operate in response to either a signal on an IC RET AB line or on the BR+1 E line. Thus, the OR circuit 1 can operate during a branch op when the operand fetch is indicated, or in response to an instruction counter operation, or when the branch unit is about to fetch the storage word adjacent to the word which contains the branch-to, or subject instruction.

Figure 155:
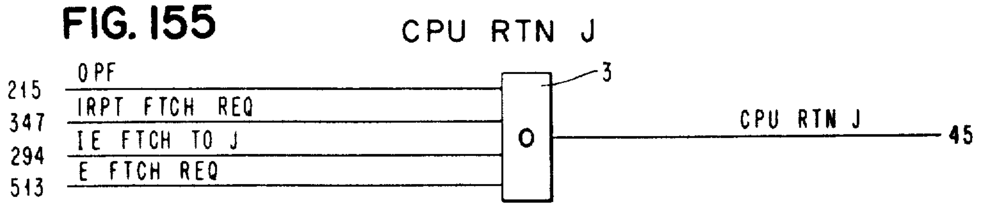

In FIG. 155, a signal indicating that the storage word is to be returned to the J register in the CPU is generated on a CPU RTN J line by an OR circuit 3 in response to a signal on any one of the following lines: OPF, IRPT FTCH REQ, IE FTCH TC J, or E FTCH REQ. Thus, the OR circuit 3 will operate for any operand fetch, during an interrupt fetch request, when the IE unit calls for a fetch to J, or for any E unit fetch.

(11.8.5) INSTRUCTION FETCH REQUESTS (FIG. 217)

Figure 217:
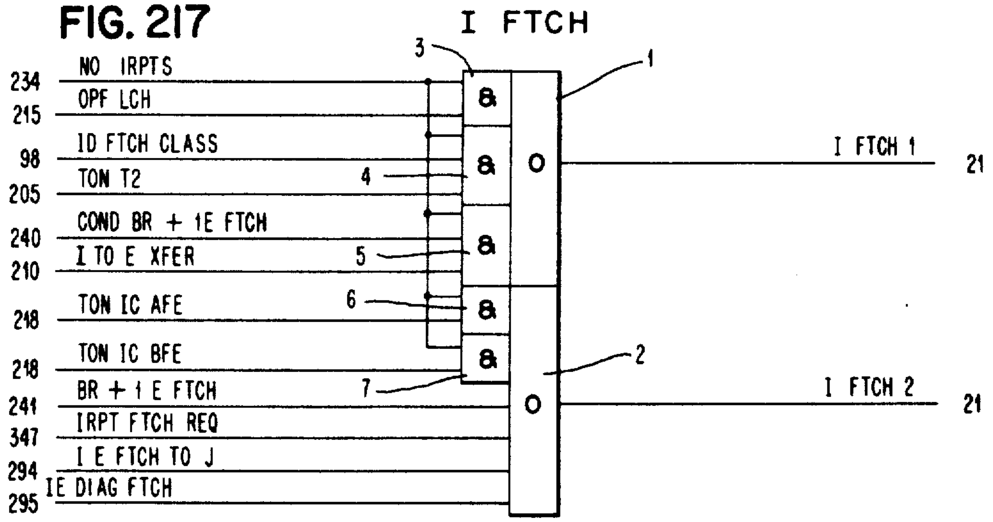

In FIG. 217, first and second fetch requests for the I unit are provided by signals on the I FTCH 1 line and on the I FTCH 2 line. The signals are generated by a pair of OR circuits 1, 2 in response to five AND circuits 3–7, each of which is gated by a signal indicating that no interrupts are outstanding on a NO IRPTS line, and in response to four other input lines. The AND circuit 3 responds to operand fetches as indicated by a signal on the OPF LCH line. The AND circuit 4 additionally requires concurrence of TON T2 and ID FTCH CLASS indicating that operands are required for this particular instruction. The AND circuit 5 is operative at I TO E XFER provided there is a signal on a COND BR+1 E FTCH line which indicates a conditioning of a branch plus one fetch. The AND circuits 6 and 7 respond respectively to signals on the TON IC AFE line and TON IC BFE line which indicates a turning on of an IC fetch execution for the A or B register, respectively. The OR circuit 2 is responsive not only to the AND circuits 6, 7, but also to the following lines: BR+1 E FTCH, IRPT FTCH REQ, IE FTCH TO J, and IE DIAG FTCH, which indicate a branch op second fetch, a fetch request for an interrupt, a fetch for the IE unit to the J register, or a diagnostic fetch, respectively.

(11.8.6) IC FETCH EXECUTIONS TO A B

In the following sections, the manner in which IC fetches are initiated and remembered is described. There are provided two sets of primary latches, one set is the "E" set, and the other set is the "M" set. The E set indicates that a fetch should be made, and these latches will stay on until an accept signal is received from the BCU indicating that the fetch request will be honored by the storage device; at that point, the M set turn on and remember that a fetch is outstanding, and this set will remain on until an advance signal is received from the BCU indicating that the fetched data is on its way back from the storage unit. The E set of latches are called IC AFE for the A register, and IC BFE for the B register. The M set are respectively called IC AFM and IC BFM.

(11.8.6.1) Turn on of IC AFE and BFE (FIG. 218)

In FIG. 218, an OR circuit 1 generates a signal on a TON IC FE line which indicates that either the ICAFE or the ICBFE latch should be turned on. This OR circuit responds to a signal on a NOT COND ICP LOADED which is generated in the predecode and shown in FIG. 82; this line indicates that the length of the instruction as compared with the point of the AB registers where the instruction begins indicates that a complete instruction is contained within the AB registers, as described in the section relating to FIG. 82. The OR circuit 1 also responds to a signal on a NOT PD BR BLK IC LCH line which is generated by the off-side of a latch 2, the latch being reset at every not LC time, and set at not LC time (after a short delay) by an AND circuit 3 only if there is present the output of an OR circuit 4 which in turn is responsive to either one of two predecode branch indicating signals on the PD BR GROUP 1 line or on the PD BR GROUP 2 line. Thus, unless the predecode indicates that the current instruction is in a branch group, the latch 2 will be off, and therefore there will be a signal applied to the OR circuit 1. The nature of the logic for the OR circuit 1 is based on the fact that whenever a branch is indicated, no IC fetch would be made unless it is possible that the complete branch instruction is not apparent in the AB register. When this is true, then there will be a signal on the NOT PD COND IOP LOADED line so that a fetch can be made anyway. However, if a complete instruction is contained within the IOP register, there will be no signal to the OR circuit 1 whenever there is a branch indicated by the predecode, so that IC fetching will be blocked by the OR circuit 1 having failed to generate a signal on the TON IC FE line.

Another latch 5 is provided to determine whether the A or the B register is involved in the current fetch; this latch is set by an AND circuit 6 provided there is a bit in ICR20, which indicates that the next instruction to be fetched should be to an odd storage address, and therefore relates to the B register rather than to the A register. When there is a signal on the ICR20 line, the latch 5 will always have an output. Thus, there will be an input which, together with a signal on the IC RCVY LCH line will cause an OR circuit 8 to generate a signal on a COND IC BFE line which will cause a B register fetch provided other conditions are met. On the other hand, when there is no output from the OR circuit 8, an inverter 9 causes any IC fetch to be to the A register in response to a signal on a COND IC AFE line. The OR circuit 8 is also responsive to an AND circuit 10 which can be operated by the AB fetch latch.

The COND IC AFE line is applied to an AND circuit 11 concurrently with TON IC FE, NOT BLK IC or ICM, and NOT IRPT RST. Also applied to the AND circuit 11 is an OR circuit 12 which is operated by a signal on a FUNC IC IC AFE line, or either of two AND circuits 13, 14, each of which will operate only if there is applied thereto signals on the NOT IC AFM LCH line and on the NOT A LOADED LCH line. The AND circuit 13 also requires a signal on the NOT IC AFE LCH line, and the AND circuit 14 requires a signal on a NOT ACCEPT line. Either of the AND circuits 13, 14 can sense the condition of the A register being empty. Thus, when there is no accept signal outstanding, and A is not loaded and there is no outstanding fetch memorized for A, then the AND circuit 14 recognizes that the A register is empty; when there has been no request for an A fetch as indicated by the NOT IC AFE LCH signal, and no such a request has been memorized by the IC AFM LCH, then if A is not loaded, the AND circuit 13 will recognize that A is empty. Thus, A can be sensed as requiring a fetch by functional conditions of the IC controls, by the lack of a fetch memorized when A is not loaded with either a lack of an accept signal or the lack of an IC AFE signal. Although not shown in detail for simplicity, a plurality of circuits 15 provide a signal on a TON IC BFE line in the same fashion that the signal is generated on a TON IC AFE line by the circuits 11–14 in FIG. 218.

Figure 219:
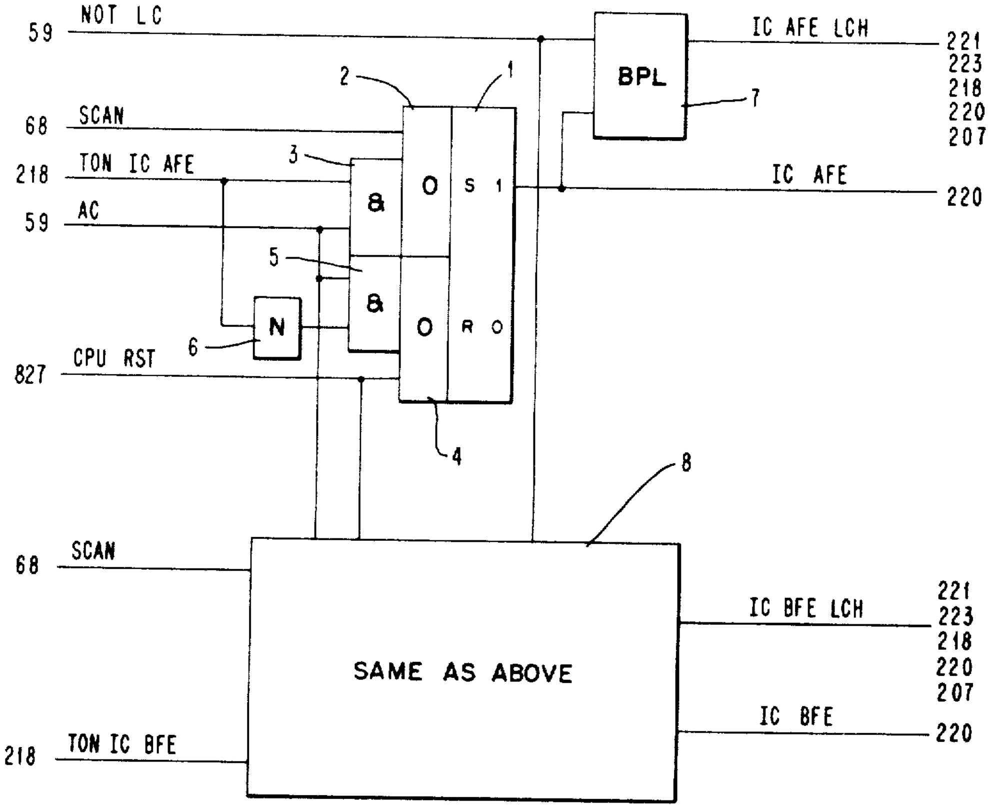

(11.8.6.2) IC fetch execution latches (FIG. 219)

In FIG. 219, the call for an IC fetch to the A register is manifested by a signal on an IC AFE line which is generated by a latch 1 that is settable by an OR circuit 2 in response to an AND circuit 3 or in response to a SCAN input thereto. The AND circuit 3 responds to a signal on a TON IC AFE line provided there is also a signal on the AC line. The latch 1 is reset by an OR circuit 4 in response to a CPU reset as manifested on a CPU RST line or by an AND circuit 5 which may operate at A time due to the effect of an inverter 6. In other words, at every A time, the latch 1 will either be set or reset depending upon whether there is or is not, respectively, a signal on the TON IC AFE line. The circuit may be set by scan controls or reset by the CPU RST. The setting of the latch 1 will be transferred into a bipolar latch 7 at not LC time so as to generate a signal on an IC AFE LCH line. Although not shown in detail in FIG. 219, a plurality of circuits 8 are provided for the B register which are identical in all respects to the circuits 1–7 which relate to the 1 REGISTER.

The signals of FIG. 219 are those which indicate that a fetch request for the A or the B register in response to IC control has been made. These signals will be continuously reset into the latches 1, 7 at every A and not L time so long as the turn on for the corresponding latch (such as TON IC AFE) remains present from the circuit of FIG. 218. This will be true until an accept signal appears, which will cause the blocking of the AND circuit 14 in FIG. 218, the AND circuit 13 of FIG. 218 being blocked at this time due to the fact that the bipolar latch 7 is set so there is no longer a signal on the NOT IC AFE LCH line. Thus, eventually the signal on the TON IC AFE line in FIG. 218 will disappear so that the inverter 6 in FIG. 219 will cause the AND circuit 5 to reset the latch 1 in FIG. 219 rather than set it. The same, of course, holds true for B register fetches.

Figure 220:
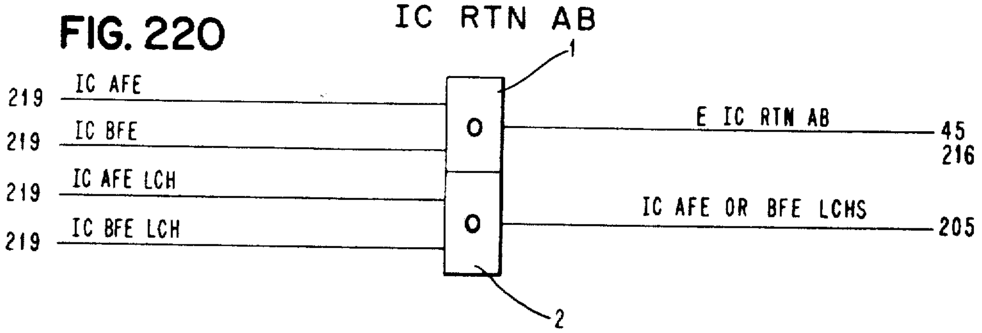

(11.8.6.3) IC fetch execution usage (FIG. 220)

In FIG. 220, the signals on the IC AFE and IC BFE lines are applied to an OR circuit 1 which generates a signal on the IC RET AB line, which signal causes the fetched storage word to return to the AB register as required. In a similar fashion, the signals on the IC AFE LCH line and on the IC BFE LCH line cause an OR circuit 2 to generate a signal on a IC AFE OR BFE LCHS line.

Figure 221:
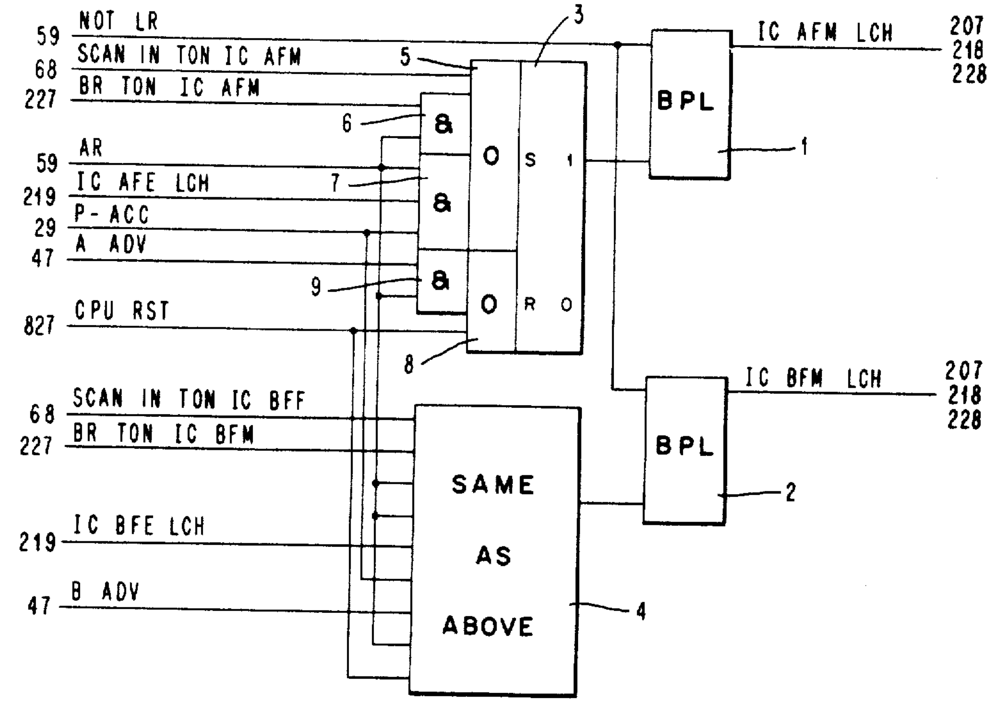

(11.8.6.4) IC fetch memorized latches (FIG. 221)

In FIG. 221 is shown the circuitry for generating signals on an IC AFM LCH line and on an IC BFM LCH line by corresponding bipolar latches 1, 2 in response to similar latch circuits 3, 4. The latch 3 is set by an OR circuit 5 in response to scan controls, or in response to either one of two AND circuits 6, 7, either of which operates in response to a running A clock pulse on an AR line. The AND circuit 6 will operate when there is a signal on a BR TON IC AFM line which indicates that branch controls are causing the A fetch memorized latch to turn on. The AND circuit 7 will operate provided there is a signal on a P–ACC (pulse accept) line concurrently with a signal on the IC AFE LCH line. The AND circuit 7 therefore indicates that a fetch to A has been requested, and the BCU has accepted the request as indicated by the return of a pulse accept signal. The latch 3 is reset by an OR circuit 8 in response to a CPU RST, or in response to an AND circuit 9 which is operative at A time in response to a A ADV (A register advance) line which indicates that a storage unit is momentarily going to supply storage data, and that this data has been indicated to be fetched for the A register. The details of the pulse accept and A advance lines are described with respect to the BCU.

Although not shown in detail in FIG. 221, the circuits 4 which relate to the B register are identical to the circuits 3, 5–9 which relate to the A register, as before described.

Figure 226:
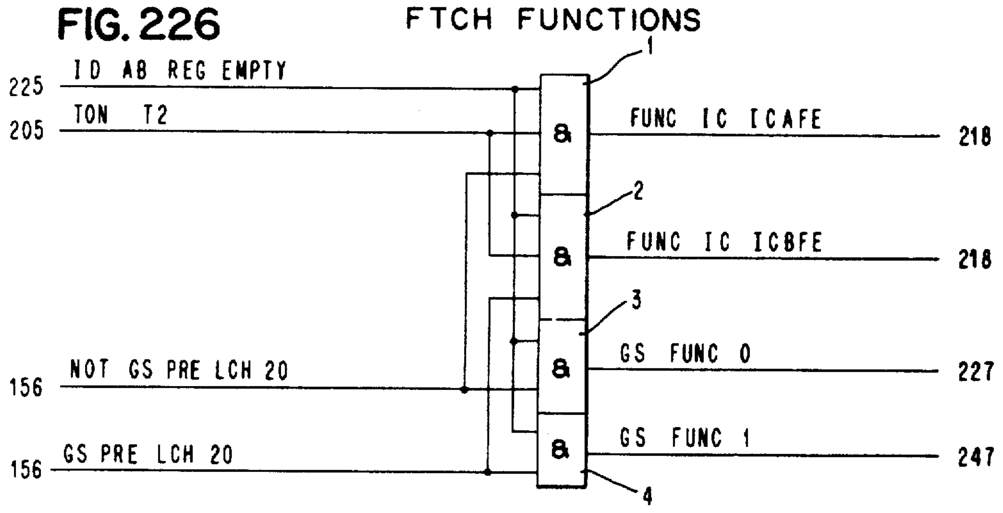

(11.8.6.5) IC fetch as a function of IC (FIG. 226)

In FIG. 226, four AND circuits 1–4 each generate signals on corresponding lines; FUNC IC IC AFE, FUNC IC IC BFE, GS FUNC 0, and GS FUNC 1. Each of the AND circuits 1–4 is operative only in response to a signal on the ID AB REG EMPTY. In addition, the AND circuits 1 and 2 are operative only during TON T2. The AND circuit 1 will operate when gate select bit 20 is 0 as indicated by a signal on a NOT GS PRE LCH 20 line, and the AND circuit 2 will operate when gate select bit 20 is a 1 as indicated by a signal on a GS PRE LCH 20 line. The AND circuits 3, 4 operate directly in response to the 0 or 1 condition of the GS register so as to indicate that the gate select function (that is, the status of bit 20) is either 0 or 1, respectively.

Figure 225:
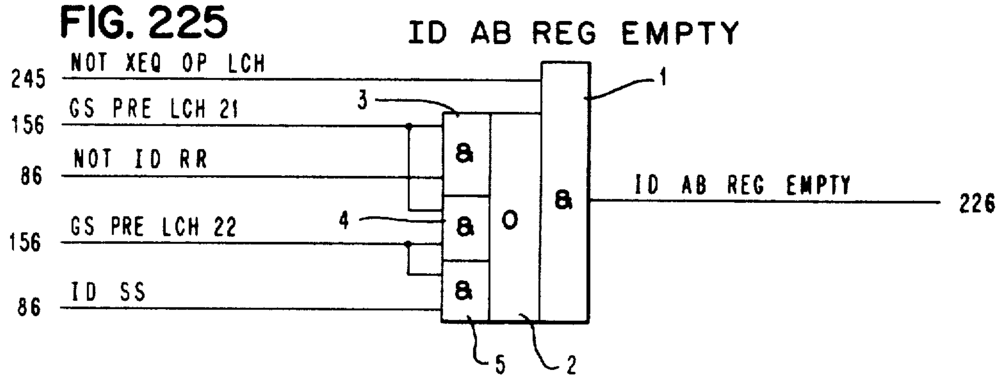

(11.8.6.6) AB register empty circuit (FIG. 225)

The signal on the ID AB REG EMPTY line is generated in FIG. 22 by an AND circuit 1 at all times other than during an executive operation due to the requirement of a signal on a NOT XEQ OP LCH line. The AND circuit 1 also responds to an OR circuit 2 which in turn is operated by any one of three AND circuits 3–5. The AND circuits 3 and 4 require a signal on a GS PRE LCH 21 line, and the AND circuits 4 and 5 require a signal on a GS PRE LCH 22 line. The AND circuit 3 recognizes the case where bits 32–63 of either the A register or the B register are going to be read out (as illustrated more clearly in FIG. 73) so that anything other than an RR instruction will exhaust the register from which the instruction is being read. The AND circuit 5 recognizes the case where the instruction is being read out of bit 16 through 47 of the A register or the B register, and if it is an SS instruction it will exhaust the A or B register because a second fetch which is effective to present bits 48 through 63 of that register (and also redundantly presents bits 31 through 47) will completely exhaust the register. The AND circuit 4 senses the case where bit 48 of the A register through bit 15 of the B register, or bit 48 of the B register through bit 15 of the A register is being read out, and thereby will exhaust either the A or the B register, respectively. Thus, the AND circuits 3–5 recognize conditions when the AB registers will be exhausted, and provided that other than an execute operation is being performed, the AB register must be considered to be empty by generating a signal on the ID AB REG EMPTY line. This line is combined with the circuitry (previously described) in FIG. 226 to determine which register is empty so that a fetch can be instituted as a function of the conditions in the A and B register with respect to a particular instruction being extracted therefrom.

(11.8.7) IC RECOVERY (FIG. 222 AND FIG. 223)

In FIG. 222 an CR circuit 1 generates a signal to turn on the IC recovery circuits on a TON IC RCVY line. The OR circuit 1 can respond to an AND circuit 2 or to signals on any one of the following lines IE TON RCVY, IRPT TO RCVY 1, or IRPT TO RCVY 2. The AND circuit 2 is operative when the maintenance console requires the setting of the instruction counter when the K register is loaded as indicated by signals on the MC SET IC line and on the J LOADED LCH line. The output of FIG. 222 is utilized in FIG. 223 as input to an AND circuit 3 which, together with a controlled A clock pulse on an AC line will cause an OR circuit 4 to set a latch 5. The OR circuit 4 is also responsive to a scan input thereto. A latch 5 generates a signal on a IC RCVY line and also causes a bipolar latch 6 to be set at not LC time so as to generate a signal on a IC RCVY LCH line. The latch 5 is reset by an OR circuit 7 in response to a CPU RST, or in response to an AND circuit 8 which is operative at A time due to a running A controlled clock pulse on the AR line when there is concurrently present thereto a pulse accept signal on a P-ACC line and the output of an OR circuit 9. The OR circuit 9 sense that an IC fetch request has been made for the A register or for the B register in dependence upon signals on the IC AFE LCH line or on the IC BFE LCH line. Thus, IC recovery can be initiated by the conditions in FIG. 222, and will be turned off when a pulse accept signal has been received for an A or B register IC fetch.

(11.8.8) IOP LOADED (FIG. 224)

Figure 224:
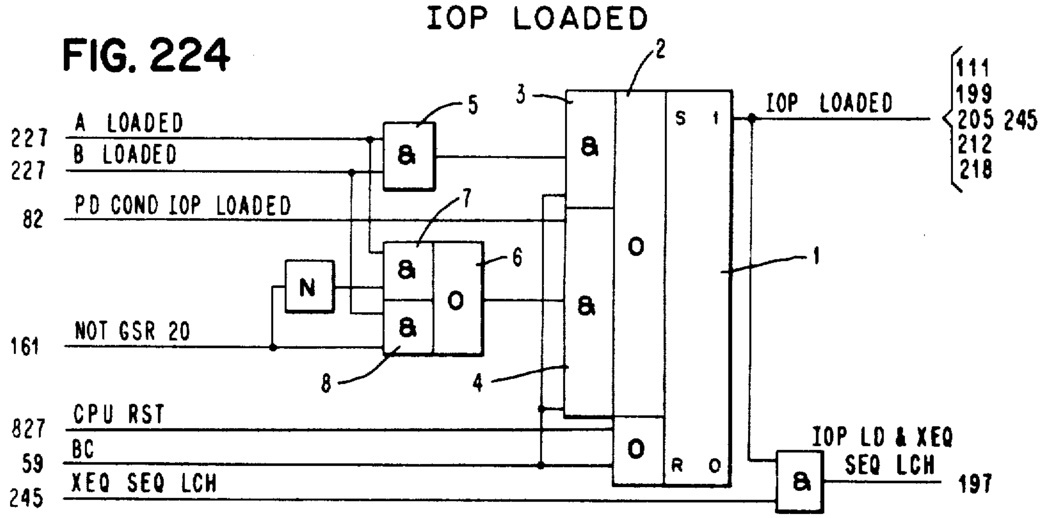

A signal is generated on a IOP LOADED line in FIG. 224 by a latch 1 which is set by an OR circuit 2 in response to either one of two AND circuits 3, 4 both of which are operative only at not B time as indicated by a signal on a NOT BC line. The AND circuit 3 operates in response to an AND circuit 5 which senses the fact that both the A register and the B register are loaded. The AND circuit 4 requires a concurrence of a signal indicating that a complete instruction is contained in the AB registers, said signal appearing on the PD COND IOP LOADED line, together with the output of an OR circuit 6. The OR circuit 6 responds to either of two AND circuits 7, 8 in dependence upon AB loaded with a not bit 20 or B being loaded with a bit 20. Thus, the AND circuit 3 senses the case where both A and B are loaded, and the AND circuit 4 senses the case where one of the registers is considered to be loaded, and the OR circuit 6 determines that it is either the A or the B register as called for by the condition of gate select register bit 20.

(11.8.9) A–B LOADED (FIG. 227)

Figure 227:
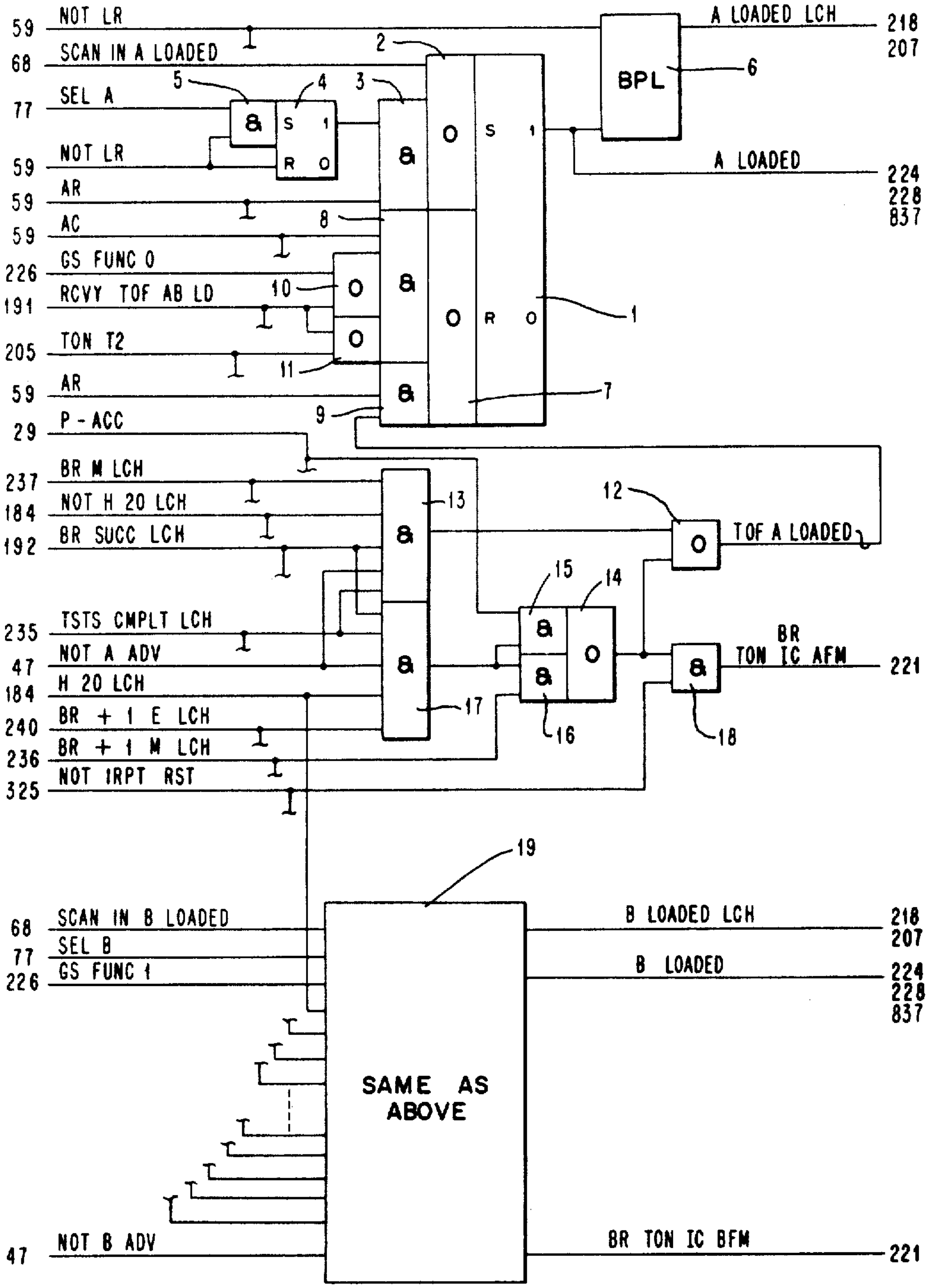

In FIG. 227, a signal indicating that the A register is loaded is generated on a A LOADED line by a latch 1 which is set by an OR circuit 2 in response to a scanning signal on a SCAN IN A LOADED line, or in response to an AND circuit 3. The AND circuit 3 is responsive to a latch 4 which is set by an AND circuit 5 at not LR time provided that there is a signal present on a SEL A line. The latch 4 will be reset at the start of each LR time, and immediately thereafter will again be set so long as the signal is present on the SEL A line. The AND circuit 3 responds to the latch 4 at A time due to the presence of a signal on a AR line. The A LOADED signal at the output of latch 1 is used to set a bipolar latch 6 at not LR time so as to provide a signal on a A LOADED LCH line. The latch 1 is reset by an OR circuit 7 in response to either one of two AND circuits 8, 9 the AND circuit 8 operates only at A time due to the presence of a controlled A clock signal on the AC line, and also requires the presence of either a recovery turnoff of A loaded or the combination of turn on T2 with GS function 0 as indicated by signals on the corresponding inputs to a pair of OR circuits 10, 11. Thus, if there is a signal on the RCVY TOF AB LD line, then both the OR circuits 10, 11 are satisfied so that with an AC signal, the AND circuit 8 can set the latch 1. On the other hand, if a signal is present on the TON T2 line, and a signal is also present on the GS FUNC 0 line, then the OR circuit 10 or 11 are again both satisfied so that the AND circuit 8 can operate at A time. The AND circuit 9 is operative at A time due to the presence of an A running clock pulse on the AR line provided there is a signal on a TOF A LOADED line from an OR circuit 12. The OR circuit 12 may be operated by an AND circuit 13 which is set when a successful branch is memorized provided H register bit 20 is 0 and there is no A advance from the BCU. This is brought about by application of signals on the following lines; BR M LCH, NOT H 20 LCH, BR SUCC LCH, TSTS CMPLT LCH, and NOT A ADV. The OR circuit 12 may also be operated by another OR circuit 14 which is responsive to either one of two AND circuits 15, 16, each of which in turn requires an input from a further AND circuit 17. The AND circuit 17 is similar to the AND circuit 13 except that it requires a bit in H register position 20, and an indication of a branch +1 fetch; thus the AND circuit 17 relates to fetching the next successive storage word following the storage word containing the instruction to which a branch may be effected. The AND circuit 17 requires signals on the BR SUCC LCH, TSTS CMPLT LCH, NOT A ADV, H 20 LCH, and BR+1 E LCH lines. In addition, the AND circuit 15 requires a pulse accept signal on the P-ACC line, and the AND circuit 16 requires a signal on the BR+1 M LCH line. Whenever the OR circuit 14 causes generation of the TOF A LOADED signal, it will cause an AND circuit 18 to generate a signal on the BR TON IC AFM line provided that there is no interrupt reset as indicated by a signal on the NOT IRPT RST line. The AND circuit 18 therefore indicates that an A fetch for a branch operation has been initiated, but has not yet been terminated due to the fact that an advance signal has not yet been received from the BCU heralding the approach of data returning from storage.

A plurality of circuits 19 are provided for the B register, and, although not shown in detail in FIG. 227, comprise circuitry identical with the circuit 1–18 which relate to the A register.

(11.8.10) J LOADED CIRCUIT (FIG. 191)

Figure 191:
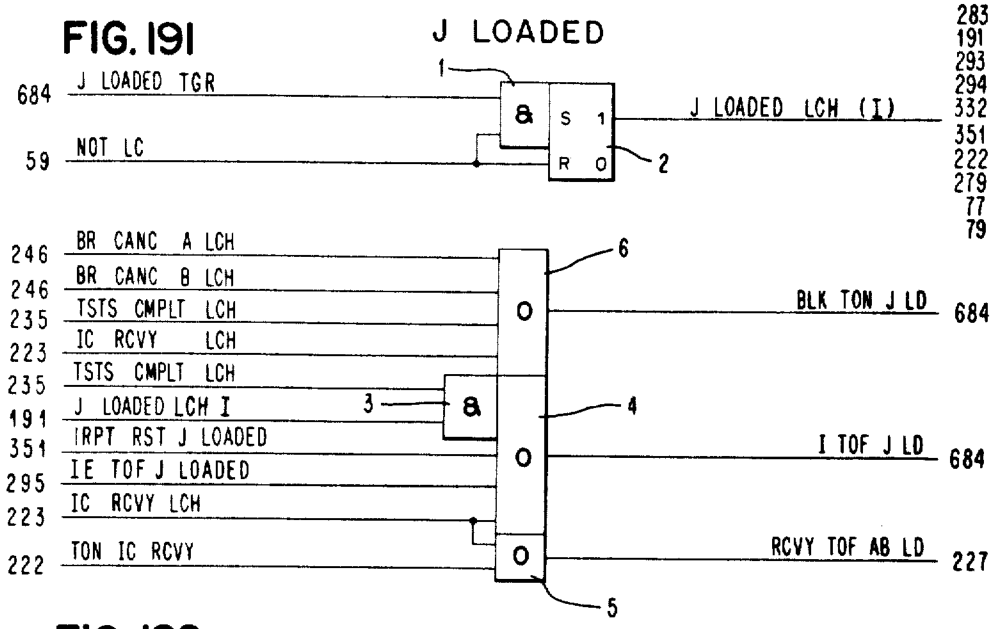

At the top of FIG. 191, an AND circuit 1 is responsive to a signal from the E unit on the J LOADED line which will cause a latch 2 to be set immediately following its reset at the start of HL time so long as the signal remains present. This causes the latch 2 to generate a signal on a J LOADED LCH line for use within the I unit. Whenever the signal disappears from the J LOADED line, then the AND circuit 2 will remain reset upon its being reset at the start of not L time.

The signal on the J LOADED LCH line is applied to an AND circuit 3 in FIG. 191 which, when energized by a signal on the TSTS CMPLT LCH line will cause an OR circuit to generate an I unit turnoff for J loaded on the I TOF J LD line. The OR circuit 4 is also responsive to signals on a IRPT RST J LOADED line, the IE TOF J LOADED line, and the IC RCVY LCH line. Thus, I unit turnoff J loaded can be caused by test complete when J is loaded, by interrupts reset of J, by the IE unit turning off J, or by an IC recovery. The signal on the IC RCVY LCH line is also applied to an OR circuit 5 which is responsive as well to a signal on the TON IC RCVY line, so that either during the start of an IC recovery or after the IC recovery has been manifested in the latch, the OR circuit 5 will generate a signal to turnoff AB loaded on the RCVY TOF AB LD line. The IC RCVY LCH line can also apply to an CR circuit 6 which generates a signal for blocking the turnon of J loaded on a BLK TON J LD line. The OR circuit 6 is also responsive to test complete, or branch handling of A or B as manifested by signals on the TSTS CMPLT LCH, BR CANC A LCH, and BR CANC B LCH lines.

(11.8.11) AB FETCH, LOAD AND DECODE ADD 1, 2 (FIG. 228 AND FIG. 229)

Figures 228, 229:
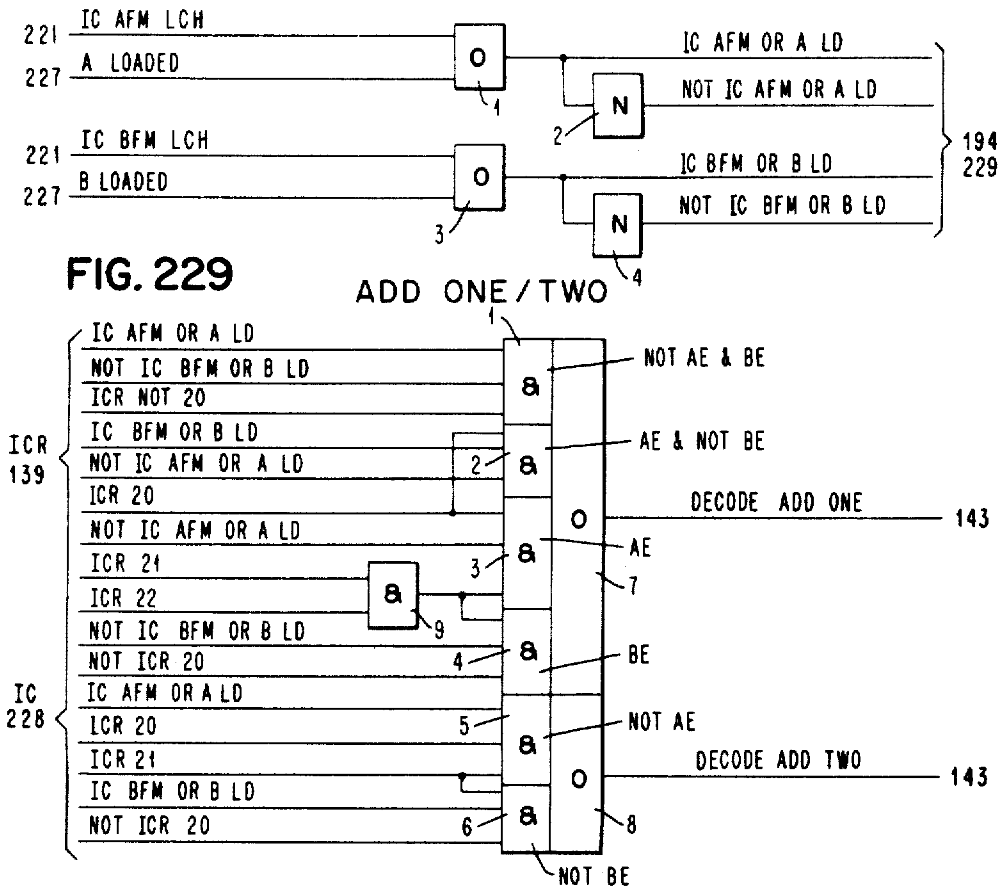

In FIG. 228, an OR circuit 1 responds to signals on IC AFM LCH line or on the A LOADED line to generate a signal on a IC AFM OR A LD line; this signal is complemented by an inverter 2 which generates a signal on the NOT IC AFM OR A LD line.

Similarly, an OR circuit 3 generates a signal on a IC BFM OR B LD line and causes an inverter 4 to generate a signal on a NOT IC BFM or B LD line.

The signals generated in FIG. 228 are utilized in FIG. 229 to indicate that the related register (A or B) is either loaded or about to be loaded, or it is not. This, together with bits 20–22 of the instruction counter register (ICR) is utilized to determine what fetching ought to take place, as indicated in section 5.3.4.5 which comprises a chart of IC fetch address generation. In FIG. 229, a plurality of AND circuits 1–6 recognize the condition set forth in the chart described in section 5.3.4.6. The AND circuits 1–6 each relate to a particular portion of the chart, certain simplifications being obtainable due to symmetry within the chart. The AND circuit 1 sense a response to signals on the IC AFM OR A LD line and on the NOT IC BFM OR B LD line recognizes the case where A is not empty but B is empty and therefore represents the expression NOT AE & BE. This condition, together with ICR bit 20 being a 0 as indicated by a signal on a ICR NOT 20 line will cause an OR circuit 7 to generate a signal on the DECODE ADD 1 line, which is equal to a controlled input into incrementer bit 20. This is verified by reference to the upper portion of the third section of the chart, wherein a control input to bit 20 is indicated for all values of ICR bits 21 and 22 provided that ICR bit 20 is a 0.

The AND circuit 2 responds to signals on the IC BFM OR B LD line and on the NOT IC AFM OR A LD line together with a signal on the ICR20 line which is equivalent to the upper portion of the first section of the chart of section 5.3.4.5 and relates to the expression AE & NOT BE, WHICH indicates that A is empty and requires a fetch, but B is not empty and does not require a fetch. Examination of this portion of the table shows that a decode add 1 (CTRL19) should be generated only when bit 21 of the ICR is a 1, and not when bit 21 of the ICR is 0; however, since the fetches which relate to bit 21 of the ICR being 0 are redundant fetches, it is immaterial what the inputs to the incrementer are.

The AND circuit 3 responds to a signal on the NOT IC AFM OR A LD line and therefore represents any AE condition shown in the chart, without regard to BE or not BE. This AND circuit also responds to a signal on the ICR20 line, and to an AND circuit 9 which recognizes ICR21 and ICR22. This means the AND circuit 3 relates to the lowermost role of the first and second sections of the table. The AND circuit 4 also responds to the AND circuit 9, but is responsive to a signal on the NOT IC BFM OR B LD line and to a signal indicating that ICR bit 20 is a 0. The AND circuit 4 therefore specifies the bottom row of the upper portions of the second and third portions of the chart of section 5.3.4.5.

The AND circuit 5 recognizes a NOT AE condition due to the presence of a signal on the IC AFM OR A LD line, and also recognizes that both bits 20 and 21 of the ICR equal 1. This specifies therefore the bottom two rows of the right-most two portions of the chart of section 5.3.4.5. Thus, the AND circuit 5 will cause the OR circuit 8 to generate a signal on the DECODE ADD 2 line which corresponds to the fact that a controlled input to bit 19 is called for in this portion of the chart.

The AND circuit 6 represents a NOT BE condition due to the presence of a signal on the IC BFM OR B LD line concurrently with bit 21 and not bit 20 of the ICR. This represents the lowest two rows of the upper half of the first (left-most) and last (right-most) portions of the chart of section 5.3.4.5 which calls for a control input to bit 19 of the ICR which is equivalent to the Decode Add 2 output of the OR circuit 8. Thus, each of the situations which are not redundant in the chart of 5.3.4.5 are accounted for by the circuits 1–8 of FIG. 229.

(11.8.12) OPERAND FETCH LATCH (FIG. 215)

In FIG. 215, an operand fetch signal is generated on a OPF line by a latch 1 which is set by an OR circuit 2 in response to a scan signal on the SCAN IN OPF line, or in response to an AND circuit 3 which is operated at A time in a cycle with TON T2 present, when the instruction is within the class of instructions which require a fetch as indicated by a signal on the ID FTCH CL line. The latch 1 is reset by an OR circuit 4 in response to either one of two AND circuits 5, 6 or in response to a CPU reset signal on the CPU RST line. The AND circuit 6 is operative at A time in response to a signal on the IRPT RST line. The AND circuit 5 responds at A time to the combination of ACCEPT, OPFLCH, and NOT SHRD STG BLK. The latch 1 will cause the setting of a bipolar latch 7 to reflect the setting of the latch 1 at not LC time, so as to generate a signal on the OPF LCH line.

(11.8.13) GSR AND PSW LENGTH GATES (FIG. 230)

Figure 230:
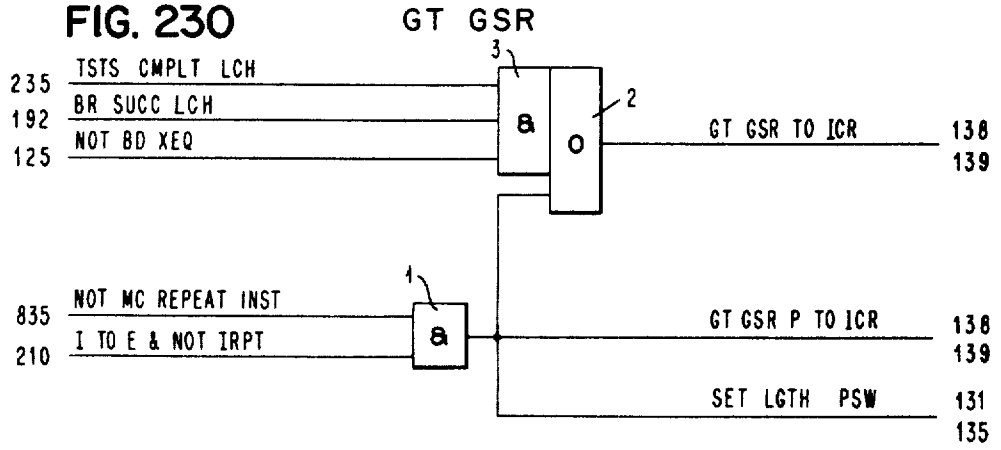

In FIG. 230, an AND circuit 1 is operative except during repeat instruction operations to respond to the I to E transfer when there is no interruption to gate the GSR together with its parity bit to the ICR, and to set the length field (bits 32 and 33) of the PSW register. The AND circuit 1 is responsive to signals on the NOT MC REPEAT INST line and on the I TO E XFER & NOT IRPT line. The AND circuit 1 generates signals on the SET LGTH PSW line and on the GT GSR P TC ICR line as well as causing an OR circuit 2 to generate a signal on the GT GSR TO ICR line. The OR circuit 2 is also responsive to an AND circuit 3 which will cause the OR circuit 2 to provide a gating signal only for the numerical portion of the GSR by providing a signal on a GT GSR TO ICR line. The AND circuit 3 is responsive to the complete testing of a successful branch provided that an execute operation is not involved, as manifested by signals on the following lines: TSTS CMPLT LCH, BR SUCC LCH, and NOT BD XEQ. Thus, when the tests are complete for successful branch, the GSR numerical portions is transferred to the ICR; this portion along with the parity bit of the ICR and the length for the PSW are all gated at I to E transfer by the AND circuit 1.

(11.8.14) IC HIGH ORDER ADVANCE LATCH (FIG. 187)

Figure 187:
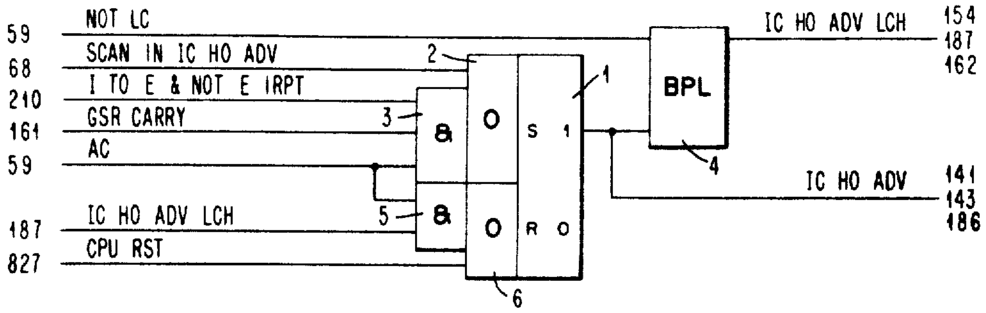
Figure 188:
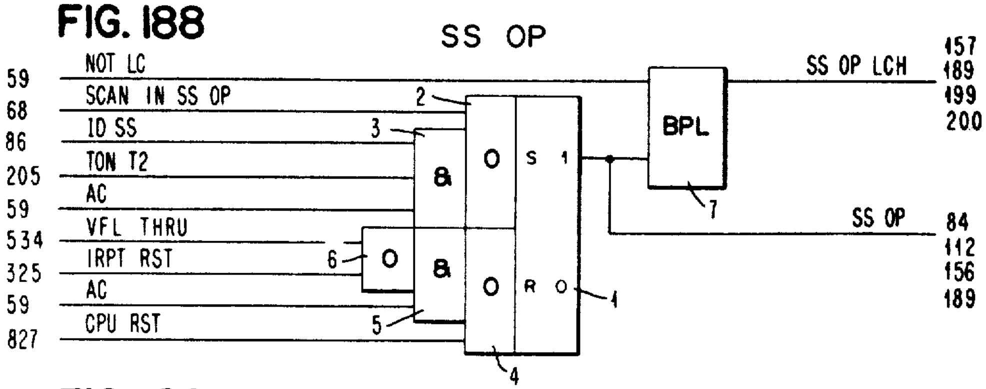
Figure 189:
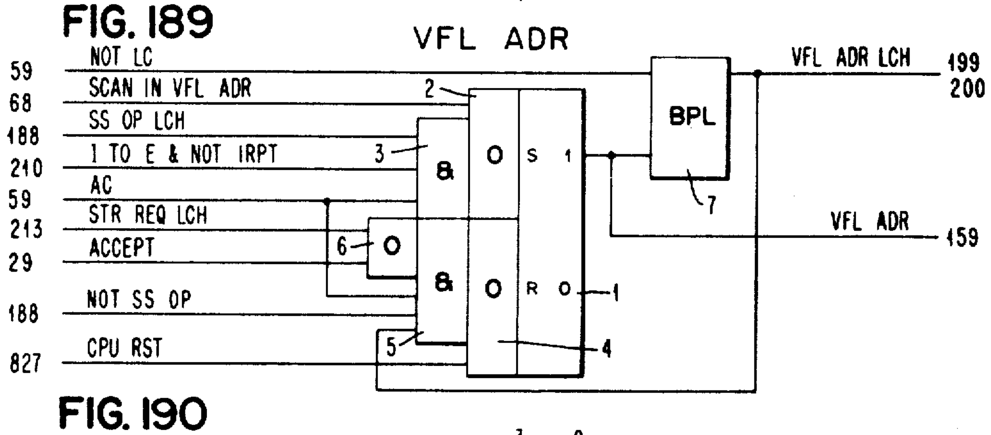
Figure 190:
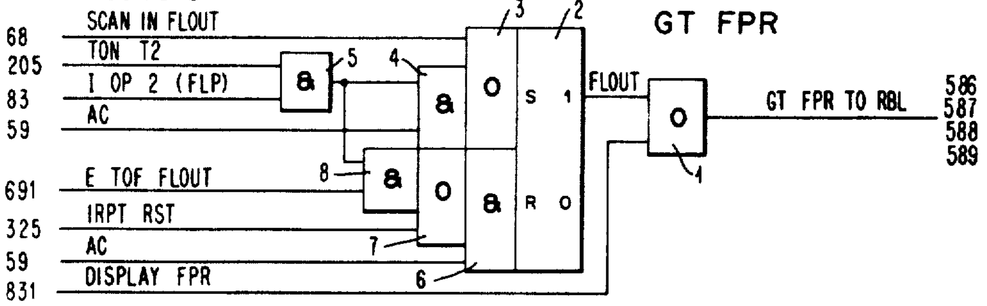

In FIG. 187, a signal indicating that a high order instruction counter advance is required is generated on an IC HO ADV line by a latch 1 which is set by an OR circuit 2 in response to a scanning signal on the SCAN IN IC HO ADV line or in response to an AND circuit 3. The AND circuit 3 is operative at A time due to the appearance of a controlled A clock signal on the AC line during I to E transfers without an interrupt provided there is a carry from the gate select mechanism. The AND circuit 3 therefore responds to signals on the I TO E & NOT E IRPT line and on the GSR CARRY line. When the latch 1 is set, it will cause a bipolar latch 4 to be set at NOT LC time so as to generate a signal on a IC HO ABV LCH line, this signal is used by an AND circuit 5 to cause an OR circuit 6 to reset latch 1 at A time. The OR circuit 6 may also respond to a signal on the CPU RST line to cause a resetting of the latch 1.

(11.8.15) BLOCKING OF IC FETCHES (BLK ICM LCH) (FIG. 208)

Figure 208:
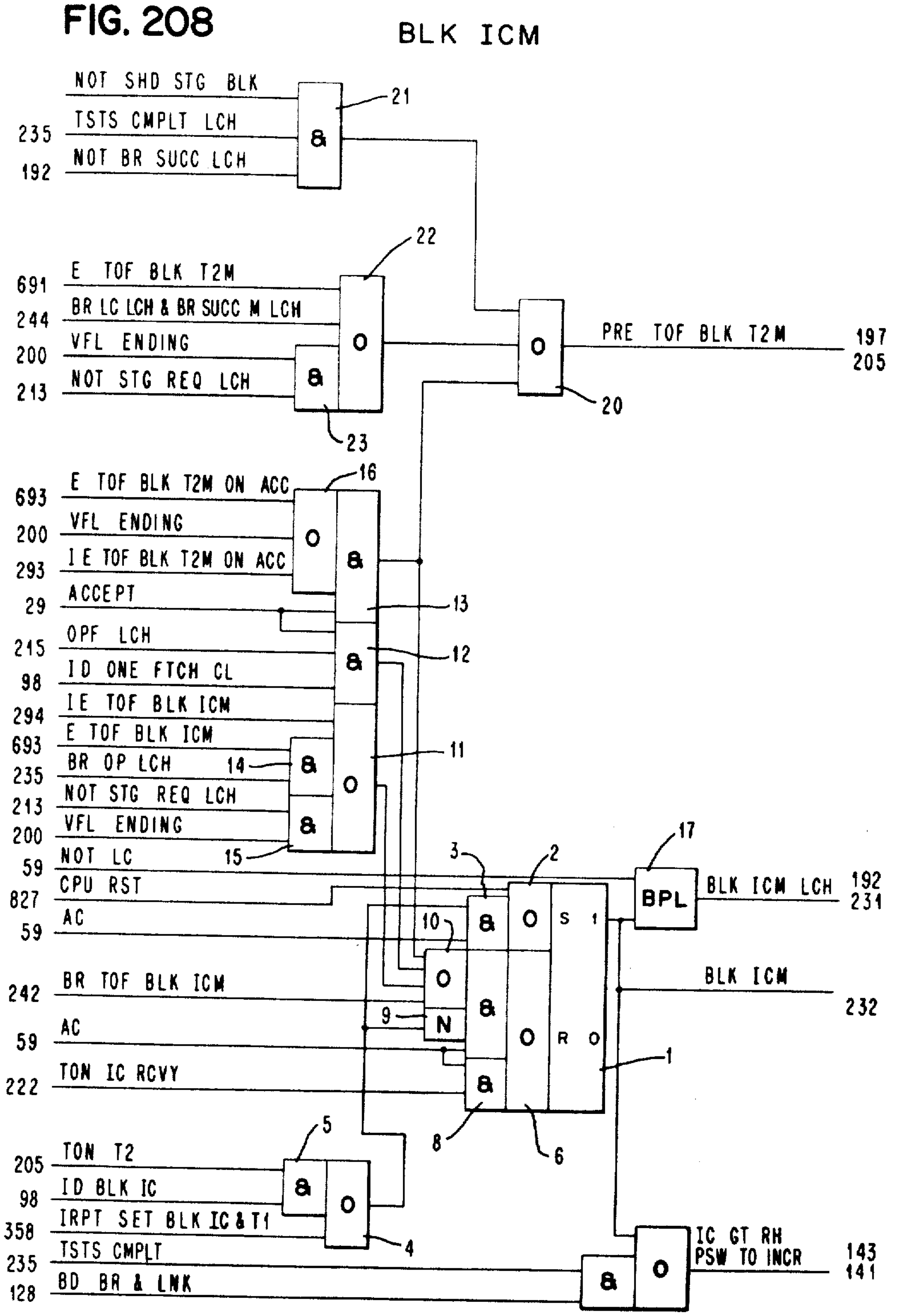

At the bottom of FIG. 208, a signal which absolutely prevents making instruction counter fetches is generated on a BLK ICM line by a latch 1 which is set by an OR circuit 2 in response to a CPU reset signal on a CPU RST line or in response to an AND circuit 3 which in turn is operative at A time provided there is an output of an OR circuit 4. The OR circuit 4 responds either to a signal on the IRPT SET BLK IC & T1 line or in response to an AND circuit 5 which is energized with the turn on of T2 if there is a signal on the ID BLK IC rule. Thus, if the interrupt controls require the blocking of IC fetches, or if the decoded instruction indicates that operands must be fetched from storage and that therefore blocking of IC fetches must be affected with the turnon of T2, then the OR circuit 4 will cause the AND circuit 3 to set the latch 1 at A time. The latch 1 is reset by an OR circuit 6 in FIG. 208 in response to either one of two AND circuits 7, 8. The AND circuit 8 is operated at A time in response to turning on of IC recovery operations, due to the signal on the AC line and the signal on the TCN IC RCVY. The AND circuit 7 will operate at A time provided there is no signal from the OR circuit 4 due to the effect of an inverter 9 which blocks the AND circuit 7 in the event that the latch 1 is again being set by the OR circuit 4. The AND circuit 7 is also responsive to an OR circuit 10 which can respond directly to a signal on the BR TOF BLK IC line, or to an OR circuit 11, an AND circuit 12 or an AND circuit 13. Each of the inputs to the OR circuit 10 represent the end of a condition for which blocking of IC fetches has been required, thus indicating that IC fetches need no longer be blocked and that therefore the BLK ICM latch 1 is to be reset. The OR circuit 11 actually responds to three different conditions which indicate the end of the necessity for blocking of IC fetches: first of these is manifested by a signal on the IE TOF BLK ICM line, a second is manifested by the inputs to an AND circuit 14 on the E TOF BLK ICM line and the BR OP LCH line. A third input to the OR circuit 11 results when an AND circuit 15 responds to signals present on the NCT STG REQ LCH line concurrently with a signal on the VFL ENDING line.

The AND circuit 12 recognizes that the fetch for a 1 fetch class of instructions has been accepted at the BCU as indicated by a signal on the ACCEPT line concurrently with signals on the OPF LCH and ID one FTCH CL lines. The AND circuit 13 recognizes three different conditions which require a storage reference, when that storage reference has been made. The AND circuit 13 responds to a signal on the ACCEPT line and to an OR circuit 16; the OR circuit 16 is responsive to any one of three different conditions which include: an E unit condition or an IE unit condition which block the turning on of the T2 sequence in the I unit, the condition ending as soon as the accept signal is received; the other condition is the fact that VFL operation is ending, and that an accept signal has been received for the final operation thereof. The OR circuit 16 thus responds to signals on the E TOF BLK T2M ON ACC, IE TOF BLK T2M ON ACC, and VFL ENDING lines. The block ICM signal which is generated by the latch 1 on the BLK ICM line is utilized to set a bipolar latch 17 at not I time so as to generate a signal on the BLK ICM LCH line.

All of the various conditions which are utilized to set and reset the block ICM latch are described in detail with respect to the Block IC Rule in section 5.3.4.7. However, these conditions are not necessarily apparent in FIG. 208 due to the fact that certain of these conditions are utilized to generate specialized lines in other parts of the systems, such as the line E TOF BLK T2M ON ACC, and E TOF BLK ICM, which are generated in the E unit, and other signals of that kind generated in other parts of the system.

(11.8.16) IOP SETTING CONTROL (FIG. 199)

Figure 199:
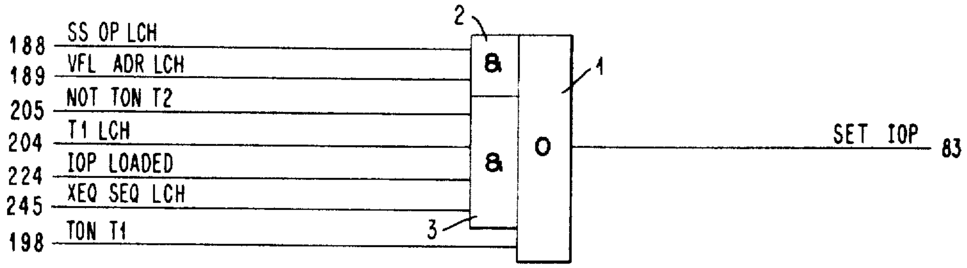
Figure 200:
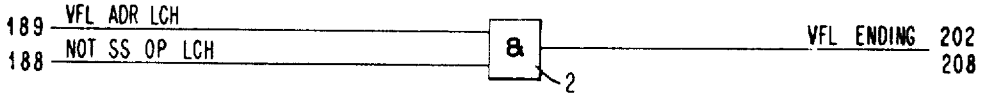
Figure 201:
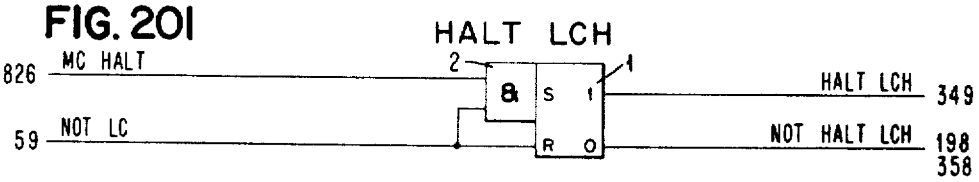
Figure 202:
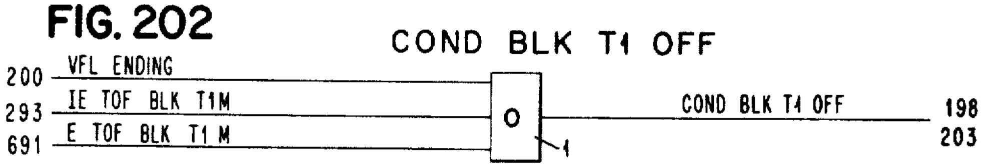
Figure 203:
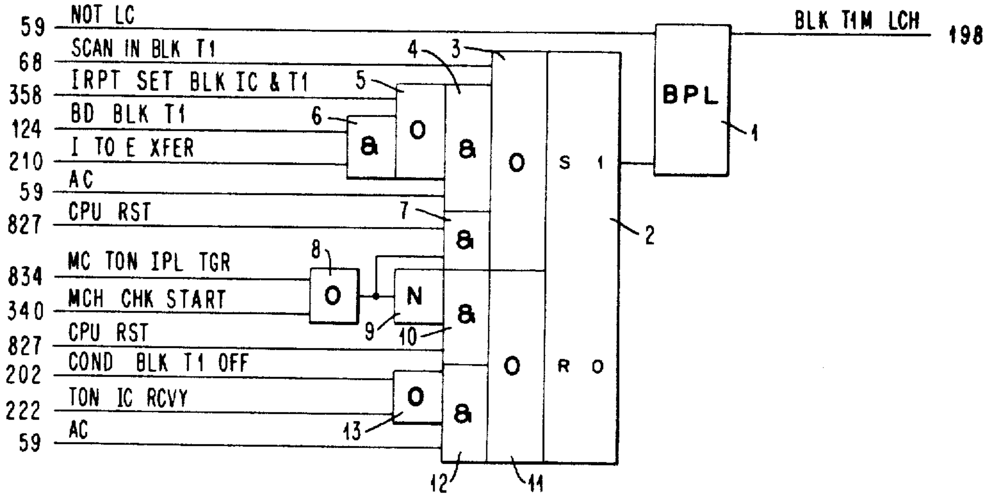

In FIG. 199, a control which causes the setting of the IOP register from the AB registers is generated on a SET IOP line by an OR circuit 1 in response to either one of two AND circuits 2, 3, or in repsonse to a signal on the TON T1 line. Thus, as described in section 5.4.0.0, in relation to instructions sequencing, and in other sections thereunder, the IOP register is set during the first T1 cycle of an instruction sequence, which means that the setting of IOP is the first step in establishing a new instruction handling sequence. The AND circuit 2 is utilized for setting IOP with the second operand addresses, which is required because IOP is only 32 bits in length, and the second operand addresses are contained in a low order syllable of an SS instruction, which means that bits 32 through 47 of the SS instruction must be brought into the IOP register after the bits 0–31 have all been manifested and recognized. Thus, the AND circuit 2 recognizes signals on the SS OP LCH line and on VFL ADR LCH line so as to indicate through the OR circuit 1 by means of the SET IOP signals to cause the remainder of the SS instructions to be brought into the IOP register. The AND circuit 3 relates to the execute instruction, and therefore is operative only when there is a signal on the XEQ SEQ ICH line. The other requirements for loading of IOP as a result of an execute instruction is that a "good" T1 cycle obtained as indicated by signals on the T1 LCH line and on the NOT TON T2 line. Additionally, a complete instruction must be available for loading into IOP as indicated by the signal on the IOP LOADED line.

(11.8.17) ENABLE IC FETCH (FIG. 231)

Figure 231:
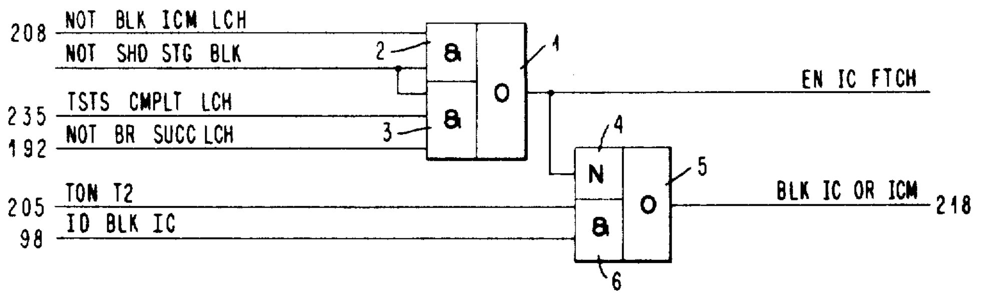
Figure 232:
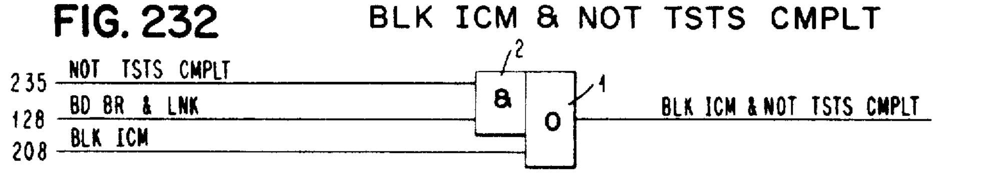
Figure 233:
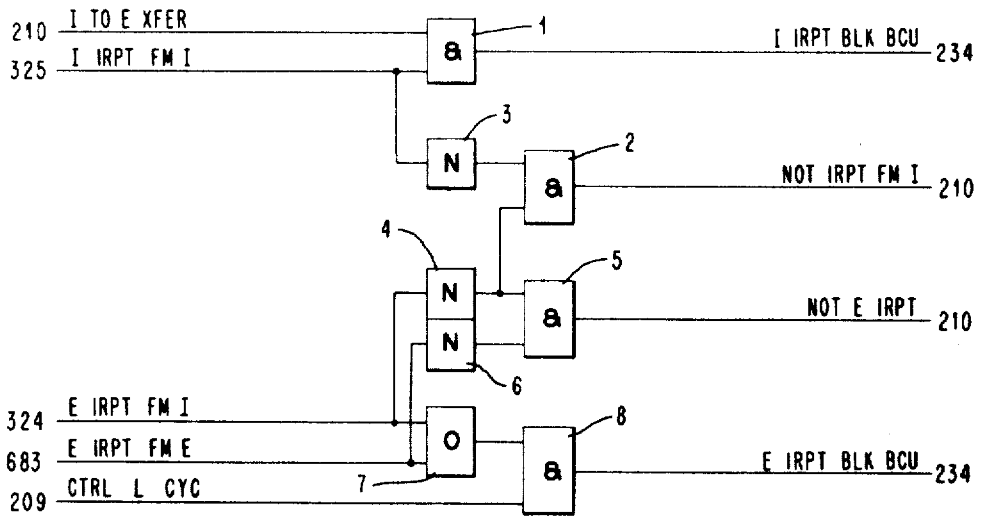
Figure 234:
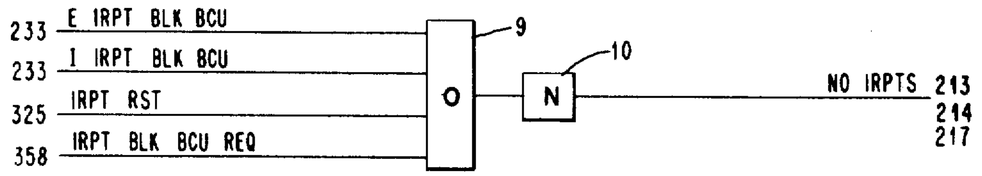

In FIG. 231, a signal which enables IC fetches is generated on a EN IC FTCH line by an OR circuit 1 in response to either one of two AND circuits 2, 3, each of which may operate only if it is not blocked because of shared storage usage (a feature which may be incorporated into a system of this embodiment, but which is not in fact shown in detail; therefore, the NOT SHD STG BLK line is illustrative merely, and can be ignored in this embodiment). The AND circuit 2 will operate the OR circuit 1 whenever the block ICM latch is not on as indicated by a signal on a NOT BLK ICM LCH line. The AND circuit 3 recognizes that a conditional branch operation has been indicated, but that after completion of the tests to determine whether or not the condition has been met, it has been determined that the condition has not been met so that the branch is unsuccessful. This is indicated by signals on the TSTS CMPLT LCH line and on the NOT BR SUCC LCH line. The output of the OR circuit 1 is also applied to an inverter 4 to operate an OR circuit 5 in the event that there is no EN IC FTCH signals. Then the OR circuit 5 will generate a signal on the BLK IC OR ICM line. The OR circuit 5 may also be operated by an AND circuit 6 if, during the turn on of T2, the instruction being decoded indicates that blocking of IC is required as indicated by signals on the TON T2 line and on the ID BLK IC line.

(11.8.18) TURN ON OF PROGRAM STORE

Figure 211:
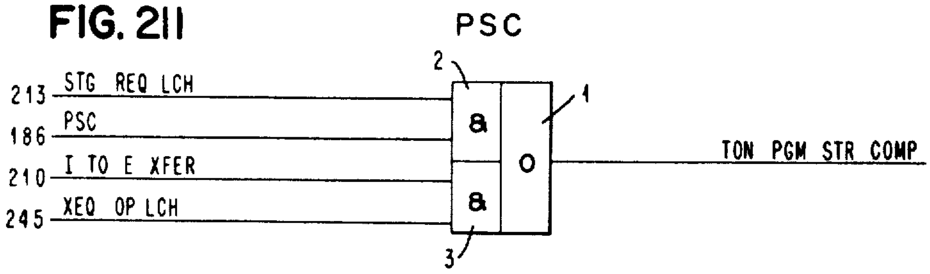

In FIG. 211 a signal is generated on the TON PGM STR COMP line by an OR circuit 1 in response to either one of two AND circuits, 2, 3. The AND circuit 2 recognizes that a storage request has been made and that comparison exists as indicated by a signal on a PSC line concurrently with a signal on a STG REQ LCH line. The AND circuit 3 senses an execute instruction at the I to E transfer as manifested by signals on the XEQ OP LCH line, and on the I to E XFER line.

(11.8.19) AB FETCH LATCH (FIG. 194)

Figure 194:
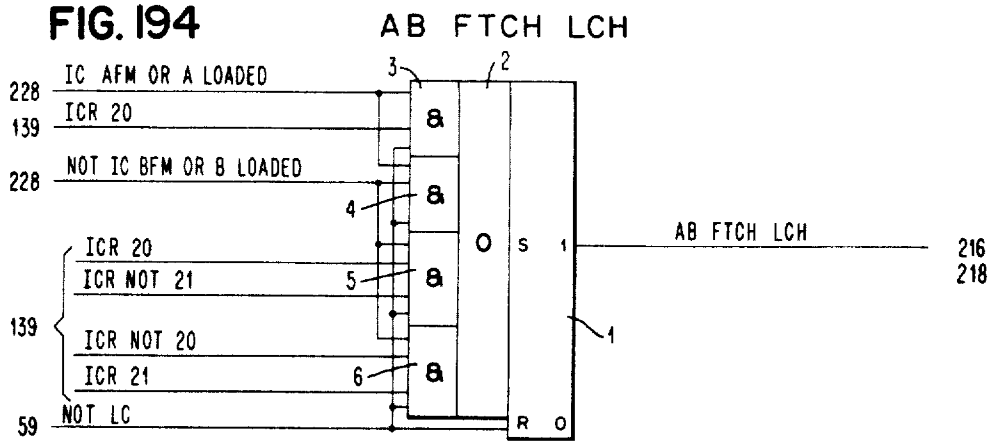

In FIG. 194, a signal indicating the ICR bit 20 status with respect to AB fetches is generated on an AB FTCH LCH line by a latch 1 which is set by an OR circuit 2 in response to any one of four AND circuits 3–6. Whenever fetching is to be to the B register, as if the ICR was bit 20 in a normal fetch, then the latch 1 will be set; at other times, the latch 1 will be reset. A function of the various AND circuits 3–6 is to affect the foregoing purpose. The AND circuit 3 recognizes the case where A does not require a fetch (NOT AE in the chart of section 5.3.4.5 which relates to IC fetch address generation). Whenever the ICR bit 20 is a 1, the NOT AE condition causes fetching to the B address as shown in the chart of section 5.3.4.5. This is sensed by the AND circuit 3. The condition of not AE and BE is sensed by the AND circuit 4, and this always causes fetching to the B register as shown in the chart of section 5.3.4.5. The AND circuit 5 recognizes the BE condition with ICR bit 20 equal to a 1 and ICR bit 21 equal to a 0. These conditions always result in a fetch to B as shown in the second portion, lower half of the chart of section 5.3.4.5. The AND circuit 6 recognizes the BE condition with ICR bit 20 equal to 0 and ICR bit 21 equal to 1; this always causes a fetch to B as indicated by the lowest two lines of the upper half of the two center portions of the chart of section 5.3.4.5. Thus, the AND circuits 3–6 recognize cases within the chart of section 5.3.4.5 which require a fetch to the B register, and any one of these AND circuits will cause the OR circuit 2 to set the latch 1 to thereby call for a fetch to the B address when the latch is set, and a fetch to the A address when the latch is reset.

Sections 12.0 through 22.0 are included in the case relating to said environmental system, which is identified in Section 2 herein.

While the invention has been shown and described with respect to a particular embodiment thereof, it will be apparent to those skilled in the art that various omissions and changes in the form and detail thereof may be made therein without departing from the spirit and scope of the invention.

What is claimed is:

1. In a data processing system, an instruction selection apparatus, comprising:

instruction buffering means for storing instructions to be selected for controlling said system;

instruction operand registering means for storing an instruction selected for system control, said system responsive to conditions in said instruction operand registering means to perform various functions in response thereto, said functions related to the execution of the instruction specified thereby, said instruction operand registering means having a number of stages, said number being equal to or greater than the number of bits in some of said instructions, and being less than the number of bits in others of said instructions; and instruction selection means for selecting instructions from said buffering means for insertion into said instruction operand registering means.

2. The device described in claim 1 additionally comprising:

means for alternately selecting alternative parts of an instruction to be inserted in said instruction operand registering means.

3. The device described in claim 2 additionally comprising:

means for alternately selecting alternative parts of said instruction buffering means from which then manifestations are to be inserted in said instruction operand registering means in cases where the bit length of said instructions exceeds the bit length of said instruction operand registering means.

4. In a data processing system having instruction registering means from which instructions may be selected for performance by said system, said system including an instruction counter and means for incrementing the count in said counter, an instruction selection apparatus, comprising:

a register means for manifesting the output of said incrementing means, whereby an incremented count is available in said register means;

incrementing control means normally operative to cause said incrementing means to increment the count of said counter successively, for each instruction selected;

special control means settable into either one of two states, said special control means when set in a first one of said states permitting said incrementing means to increment the count of said counter, said special control means when set into a second state effective to suppress the incrementing operation of said incrementing means;

means to force said special control means into said second state, said means also responsive to successive periods of machine operation to force a fixed increment to be added into said instruction counter by said incrementing means on alternate periods of system operation;

an instruction operand register means;

determining means responsive to said instruction registering means for determining the bit length of said instructions; and means responsive to said determining means for alternately selecting alternative parts of said instruction registering means from which instruction manifestations are to be inserted in said instruction operand register means in cases where the bit length of the selected one of said instructions exceeds the bit length of said instruction operand registering means.

5. In a data processing system of the type in which successive instructions are handled in successive periods of one or more machine cycles, said system having a plurality of registering locations for storing instruction manifestations, and instruction selection apparatus, comprising:

an instruction counter;

an incrementing means for said counter, said incrementing means controllable to increment the setting of said counter an amount which spans the bit length of an instruction;

an increment register responsive to the output of said incrementing means;

an instruction operand register means;

control means responsive to said instruction operand register means to control the amount of increment of said counter; and selecting means responsive to said increment register for selecting the next instruction in the sequence of instructions following the setting of a prior instruction in said instruction operand register and the attendant incrementing of said instruction counter setting; and means for alternately selecting alternative parts of said registering locations from which then manifestations are to be inserted in said instruction operand register means in cases where the bit length of said instructions exceeds the bit length of said instruction operand registering means.

6. In a data processing system having instruction registering means from which instructions may be selected for performance by said system, said system including an instruction counter and means for incrementing the count in said counter, an instruction selection apparatus, comprising:

a register means for manifesting the output of said incrementing means, whereby an incremented count is available in said registering means;

incrementing control means normally operative to cause said incrementing means to increment the count of said counter successively, for each instruction selected;

special control means settable into either one of two states, said special control means when set in a first one of said states permitting said incrementing means to increment the count of said counter, said means when set into a second state effective to suppress the incrementing operation of said incrementer;

an instruction operand register means; and means for alternately selecting alternative parts of said instruction registering means from which then manifestations are to be inserted in said instruction operand register means in cases where the bit length of said instructions exceeds the bit length of said instruction operand registering means.

References Cited

UNITED STATES PATENTS

| | | | |
|---|---|---|---|
| 3,266,022 | 8/1966 | Minnick | 340—172.5 |
| 3,267,433 | 8/1966 | Falkoff | 340—172.5 |
| 3,268,871 | 8/1966 | Handler | 340—172.5 |
| 3,270,325 | 8/1966 | Carter | 340—172.5 |
| 3,287,705 | 11/1966 | Rosenblatt | 340—172.5 |
| 3,297,997 | 1/1967 | Grady | 340—172.5 |
| 3,297,998 | 1/1967 | Klein | 340—172.5 |
| 3,299,261 | 1/1967 | Steigerwalt | 235—175 |

PAUL J. HENON, *Primary Examiner.*

I. S. KAVRUKOV, *Assistant Examiner.*